(12) United States Patent
Maeda et al.

(10) Patent No.: US 12,477,237 B2
(45) Date of Patent: Nov. 18, 2025

(54) LENSLESS NEAR-CONTACT IMAGING SYSTEM FOR MICRO ASSEMBLY

(71) Applicant: Palo Alto Research Center Incorporated, Palo Alto, CA (US)

(72) Inventors: Patrick Yasuo Maeda, San Jose, CA (US); Jeng Ping Lu, Freemont, CA (US); Eugene Chow, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/529,416

(22) Filed: Dec. 5, 2023

(65) Prior Publication Data

US 2025/0184623 A1    Jun. 5, 2025

(51) Int. Cl.
| | |
|---|---|
| *H04N 23/955* | (2023.01) |
| *B81C 99/00* | (2010.01) |
| *G06T 7/00* | (2017.01) |
| *G06V 10/44* | (2022.01) |
| *H04N 23/13* | (2023.01) |
| *H04N 23/56* | (2023.01) |
| *H04N 23/695* | (2023.01) |

(52) U.S. Cl.
CPC ......... *H04N 23/955* (2023.01); *B81C 99/002* (2013.01); *G06T 7/97* (2017.01); *G06V 10/44* (2022.01); *H04N 23/13* (2023.01); *H04N 23/56* (2023.01); *H04N 23/695* (2023.01); *B81C 2203/051* (2013.01); *G06T 2207/20221* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 10,900,877 B1 * | 1/2021 | Pandey | ................. G01N 1/286 |
| 11,148,941 B2 | 10/2021 | Plochowietz et al. | |
| 11,203,525 B2 | 12/2021 | Plochowietz et al. | |
| 11,242,244 B2 | 2/2022 | Plochowietz et al. | |

(Continued)

FOREIGN PATENT DOCUMENTS

ES     2972214 T3 *    6/2024    ....... A61B 1/000095

OTHER PUBLICATIONS

English translation of ES-2972214-T3, Bernstein, 2024 (Year: 2024).*

(Continued)

*Primary Examiner* — James M Hannett
(74) *Attorney, Agent, or Firm* — Fleit Intellectual Property Law; Jose Gutman

(57) ABSTRACT

A machine vision system and method use lensless near-contact imaging with coherent illumination, or incoherent illumination, and high pixel count large format sensors (e.g., equivalent to at least 20 to 65 mega-pixels) to produce diffraction patterns of the micro-objects or the gray scale images of the micro-objects over a large overall field-of-view of the machine vision system. The machine vision system provides feedback to a microassembler system to position, orient, and assemble microscale devices like micro-LEDs over large working areas. The effective resolution of the machine vision system can be further improved through the use of gray scale and super-resolution image processing techniques.

20 Claims, 37 Drawing Sheets

(56) References Cited

U.S. PATENT DOCUMENTS 11,948,302 B2 * 4/2024 Grier .................. G01N 15/1434

OTHER PUBLICATIONS

Boominathan, et al., "Recent advances in lensless imaging", Optica, vol. 9, Issue 1, pp. 1-16, 2022, https://doi.org/10.1364/OPTICA.431361.

Amann, S., Witzleben, M.v. & Breuer, S. 3D-printable portable open-source platform for low-cost lens-less holographic cellular imaging. Sci Rep 9, 11260 (2019). https://doi.org/10.1038/s41598-019-47689-1.

Moritex MTL Series, https://multipix.com/product/moritex-mtl-series-2/, Captured Nov. 14, 2023.

Beam shifting Overview, https://www.optotune.com/beam-shifting, Captured Nov. 14, 2023.

4K DLP projectors Is it real 4K? (XPR technology explanation) https://projectorjunkies.com/4k-dlp-projectors-is-it-real-4k-xpr-technology-explanation/, Captured Nov. 14, 2023.

* cited by examiner

LENSLESS NEAR-CONTACT IMAGING SYSTEM FOR MICRO ASSEMBLY

CROSS-REFERENCE TO RELATED APPLICATIONS

This application is related to the following two patent applications filed on even date herewith, 1) U.S. patent application Ser. No. 18/529,338, entitled "VISION SYSTEM FOR MICROASSEMBLER"; and 2) U.S. patent application Ser. No. 18/529,372, entitled "HETEROGENEOUS CHIPLET ID USING PHOTOLUMINESCENCE IN MICROASSEMBLER SYSTEM". These two patent applications, including the entirety of their written description and drawings, are collectively hereby incorporated by reference into the present patent application.

TECHNICAL FIELD

The present disclosure generally relates to machine vision systems, devices, and methods, and more specifically to a machine vision system for use with a microassembler system for inspection of the assembly of micro-objects and/or micro-scale devices on a planar working surface.

BACKGROUND

Current machine vision systems either have high optical resolution over a small field of view or have a large field of view with low optical resolution. Regrettably, there has been no machine vision system that can provide high resolution over a large field of view to efficiently inspect micro-objects and/or microscale devices like micro-LEDs over a large planar surface area.

These systems are constrained by the optics used to focus the micro-object onto a pixelated sensor. They limit the space-bandwidth product of the system because the large area and solid angle over which the optics must perform is limited by the aberrations of the lenses. As a result, there is a fundamental tradeoff between resolution, which is determined by the numerical aperture of the optics, and the field-of-view.

As microassembler backplanes continue to increase in size (e.g., for a large display screen of a HD, Ultra HD, 4K, or 8K, display monitor with continuously increasing pixel count), a microassembler system can be required to perform a micro-assembly process over the increasing size of the microassembler backplane. A machine vision system, which provides feedback to guide the microassembler system in a micro-assembly process, is required to have high optical resolution to support micro-assembly of an increasingly large number of micro-objects and/or micro-scale devices closely spaced together. However, a high-resolution image capture using a small field of view over small increments of an increasingly large overall working area can significantly increase the overall amount of time required for a micro-assembly process.

This can detrimentally impact a manufacturing process reducing its commercial viability.

BRIEF SUMMARY

According to various embodiments of the invention, a machine vision system and a method therefore uses high pixel count large format sensors, e.g., with a high-resolution pixel count equivalent to at least 20 to 65 megapixels, to capture images of diffraction patterns of micro-objects disposed on a planar working surface in a large working field-of-view region of the machine vision system. The machine vision system provides feedback to a microassembler system to position, orient, and assemble microscale devices like micro-LEDs on a planar working surface in the large working field-of-view region. The effective resolution of images captured by the machine vision system can be further improved through the use of gray scale and super-resolution image processing techniques.

According to various embodiments, a machine vision system provides high resolution captured images of diffraction patterns of the micro-objects, or gray scale images of the micro-objects, over a large working field-of-view (FOV) region of the machine visions system, using lensless near-contact image-capture modules (LNCIM) including high pixel count large format sensors, e.g., equivalent to 20 to 65 megapixels. The overall working FOV region of the machine vision system can be large enough relative to the optics to enable side-by-side, feathered, or staggered stitching of the LNCIM-captured images from individual lensless near-contact image-capture modules to produce an overall machine vision system working FOV region greater than or equal to 12 inches in width.

Certain examples of the disclosure increase the space-bandwidth product beyond conventional imaging systems by using various optical and image processing methods and techniques to increase the effective resolution over the large overall machine vision system working field-of-view of the planar working surface. The effective resolution of the overall working FOV of the machine vision system can be further improved by using an image processing tool such as grayscale imaging, super-resolution imaging, or a combination thereof.

Certain embodiments, for example, include up to 2" format 20 MP to 65 MP image sensors with 2-micron to 4-micron pixel pitch value that create images that can be stitched in side-by-side, feathered or staggered geometries, to form the overall field-of-view of the machine vision system.

In some embodiments, a plurality of individual LNCIM's with individual LNCIM field-of-views (FOVs), capture a respective plurality of images that can be staggered and stitched together in geometry, e.g., by using a step-and-repeat image assembly process that can achieve an efficiency of $n/(2(p+n))$, where n is the number of FOV rows in the overall stitched image and p is the pitch of the staggered geometry.

According to some embodiments, the machine vision system can use grayscale image processing in low-resolution images captured by the individual LNCIM's to detect the centroid, position, and rotation, of micro-objects and/or microscale devices such as micro-LED chips. The machine vision system, for example, can use grayscale imaging and provide the captured image information to a microassembler system enabling the microassember system to perform rough alignment of the micro-objects and microscale devices on a planar working surface, such as for a micro-assembly process.

According to some embodiments, the machine vision system can use super-resolution image processing in low-resolution images based on captured by the individual LNCIM's, such as for a micro-assembly process.

Features and advantages of the above-described machine vision system and method suitable for use with a microassembler system will become readily apparent from the following description and accompanying drawings.

All references, publications, patents, and patent applications, cited herein and/or cited in any accompanying Information Disclosure Statement (IDS), are hereby incorporated herein by reference in their entirety for all purposes.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to illustrate various examples and to explain various principles and advantages all in accordance with the present disclosure, in which.

DETAILED DESCRIPTION

Figure 1:
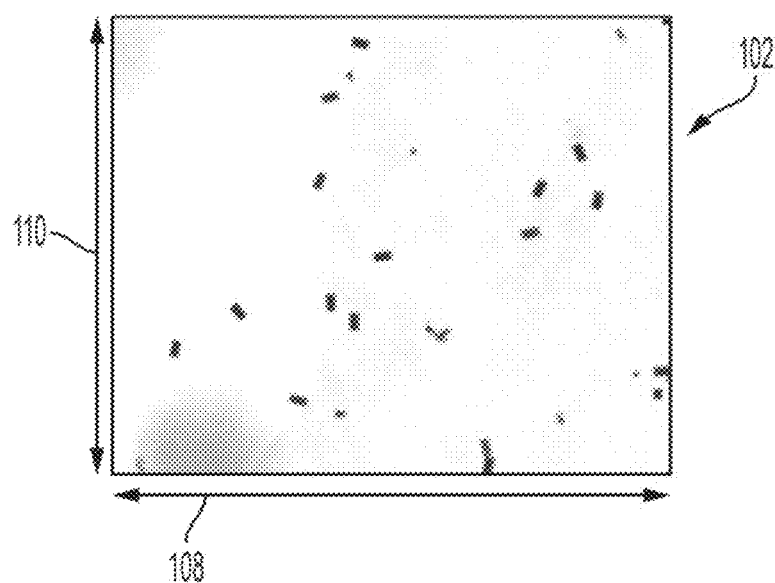
FIG. 1 is an illustration of an example machine vision system view of a working optical inspection region on a planar working surface viewed from above and showing a plurality of micro-objects and/or micro-LEDs located directly on the planar working surface, according to various examples of the present disclosure.

As required, detailed embodiments are disclosed herein; however, it is to be understood that the disclosed embodiments are merely examples and that the devices, systems, and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

Non-Limiting Definitions

The terms "microassembler system" or "microassembler", and the like, are intended to mean herein any configuration of equipment that is configured to process or perform any operation, e.g., a manufacturing operation, associated with assembling micro-objects and/or micro-scale devices in a working area on a generally planar working surface.

The term "micro-object" is intended to mean herein a small object or particle that may be used for various purposes in the manufacture and construction of various devices. Some assembly processes place a number of micro-objects into particular locations in a working area on a generally planar working surface.

The term "micro-scale device" is intended to mean herein a micro-object that comprises a small device sized in a critical dimension generally at a micron level; and where such small device can be used for various purposes in the manufacture and construction of various devices.

Some micro-assembly processes place a number of micro-scale devices into particular locations in a working area on a generally planar working surface. A non-limiting example of a micro-scale device is a micro-LED that can be assembled with other micro-objects and micro-scale devices in various locations in a working area on a generally planar working surface, such as to manufacture a display screen.

The term "target location" is intended to mean herein a location in a working area on a generally planar working surface into which a micro-object and/or micro-scale device is located, or intended to be placed, as part of a micro-assembly process.

The term "working area" is intended to mean herein an area on a generally planar working surface in which a microassembler system manipulates and/or places a micro-object and/or a micro-scale device as part of a micro-assembly process. This working area is also associated with a machine visions system that provides captured-image data to the microassembler system to support a micro-assembly process.

The terms "manipulate", "manipulating", and the like, are intended to mean herein a microassembler in a micro-assembly process imparting movement to a micro-object and/or micro-scale device in a working area on a generally planar working surface; such movement can include, but is not limited to, adjusting the position of, rotation of, alignment of, performing right-side-up verification of, at least one micro-object and/or micro-scale device in the working area.

The term "LNCIM" is intended to mean herein a lensless near-contact imaging module which includes at least one LNCIM sensor.

The terms "LNCIM sensor", "micro-object sensor", "optical module sensor", "sensor", and the like, are intended to mean herein any sensor device or apparatus that is configured to detect micro-objects and/or micro-scale devices within its range or its field-of-view. In general, an LNCIM sensor is able to use any technique to detect and/or determine any one or more of identification of a type, a physical location, a horizontal orientation, or a vertical orientation, of one or more micro-objects and/or micro-scale devices within its range and/or its field-of-view.

The terms "LNCIM-captured image", "module-captured image", "image from a micro-object sensor", "captured image", "image", "MI", and the like, are intended to mean herein in the context of a machine vision system any dataset based on an image captured with a LNCIM sensor and that includes information indicating any one or more of an identification, a physical location, a horizontal orientation, or a vertical orientation, of one or more micro-objects and/or micro-scale devices without regard to any methods and technologies used to obtain that information, to the format of that information, or how the information is indicated.

The terms "LNCIM FOV region", "module field-of-view region", "module FOV region", and the like, are intended to mean herein a region on a planar working surface, where such region is associated with a field of view of an LNCIM sensor.

The terms "working field-of-view region", "working FOV region", "overall working field-of-view region", "overall working FOV region", "working optical inspection region", and the like, are intended to mean herein an overall region on a planar working surface, comprising a plurality of optical module field of view regions. The terms generally represent a machine visions system's working area on a planar working surface, which is associated with a machine vision system field-of-view of the working area. See also the definition of "working area".

The terms "infrared light", "infrared illumination", and the like, are intended to mean herein electromagnetic radiation (EMR) with wavelengths longer than the visible light spectrum and shorter than the radio wave spectrum.

The terms "near-infrared light", "near-infrared illumination", and the like, are intended to mean herein electromagnetic radiation (EMR) with shorter wavelengths in the infrared spectrum, which typically can be from 0.7 to 4.0 micrometers.

The term "illumination light" is intended to mean herein electromagnetic radiation (EMR) with wavelengths that can range from the visible light spectrum to the infrared spectrum.

The term "transparent substrate" is intended to mean herein a substrate structure that is permeable to electromagnetic radiation (EMR) of a specified wavelength range, e.g., in the near-infrared wavelength range.

The term "microassembler backplane" is intended to mean herein a device that has a surface adapted for use in a micro-assembly process performed by a microassembler coupled to a machine vision system incorporating the herein described systems and methods. A microassembler backplane, according to various embodiments, is configured as a transparent substrate. A transparent substrate does not necessarily have to be transparent to all electromagnetic radiation wavelength ranges. For example, and not for limitation, it can be transparent to certain specified wavelength range(s), e.g., an infrared wavelength range, while being opaque to another wavelength range, e.g., certain visible light wavelength range(s). The transparent microassembler backplane may, but not necessarily, have microcircuitry embedded or attached to its substrate. The microcircuitry could produce diffraction or shadow patterns depending on the type of illumination used. These patterns will be fixed and can therefore be treated as fixed background pattern during the image processing involved in the microassembly process.

As used herein, "vertical" refers to a direction perpendicular to a surface of a substrate structure, such as perpendicular to a planar working surface of a microassembler backplane. As used herein, "horizontal" refers to a direction parallel to a surface of a substrate structure, such as horizontal to a planar working surface of a microassembler backplane.

The term "vertical orientation" is intended to mean herein, when referring to a micro-object and/or a micro-scale device such as a micro-LED, whether the micro-object and/or micro-scale device is oriented right-side-up or oriented up-side-down.

The term "horizontal orientation" is intended to mean herein, when referring to a micro-object and/or a micro-scale device such as a micro-LED, the orientation of the micro-object and/or micro-scale device along a direction parallel to a surface of a substrate structure, such as an orientation that is lateral along a planar working surface of a microassembler backplane.

INTRODUCTION

A machine vision system, according to various embodiments, provides image data feedback suitable for a microassembler system to be capable of manipulating, positioning, orienting, and assembling, micro-objects and/or micro-scale devices over a large working area on a generally planar working surface. A large area (e.g., a large working area) for a machine vision system can be at least twelve (12) inches wide, as will be discussed in more detail below. The machine vision system can provide captured-image-based image data feedback with a high resolution and a large overall machine vision system field-of-view (FOV) that can provide the imaging feedback to the microassembler system to manipulate, position, orient, and assemble, the micro-objects and micro-scale devices over a large working area.

Micro-assemblers in some examples are a type of manufacturing equipment that operates to assemble products containing micro-objects by placing one or more micro-objects into defined locations on a surface. Micro-objects in some examples are small objects or particles that may be used for various purposes in the manufacture and construction of various devices. In some examples, a micro-object may be an object that ranges in size from 1 micrometer to 500 micrometers, although other sizes are possible. The micro-objects are typically made up of dielectric materials that are neutral but polarizable. As a result, they experience electrostatic forces and undergo directed movement when they are subjected to a non-uniform electric field due to the interaction of the particle's dipole and spatial gradient of the electric field. This phenomenon is called dielectrophoresis. The micro-objects in other examples can also be charge encoded micro-objects or magnetic field pattern encoded micro-objects. For example, a micro-object may have a positive charge, may be charged with a specific pattern, may be encoded with a particular charge or magnetic field pattern, or combinations of these. The movement of charged micro-objects or particles under the influence of an electric field is called electrophoresis.

In the following description, a device that has a surface adapted for use in a micro-assembly process performed by a microassembler coupled to a machine vision system incorporating the herein described systems and methods can be referred to as a microassembler backplane. In some of the below described examples, micro-objects are manipulated on a surface of a microassembler backplane upon which they are to be placed by electrical potentials induced by conductive elements (e.g., electrodes) that are placed on or in proximity to the microassembler backplane. In various examples, these conductive elements are coupled to an optical switch with a storage capacitor arranged in a manner similar to pixels across a display, i.e., in an array across the generally planar working surface onto which micro-objects are to be placed. In various examples, such arrangements are able to be uniform or, irregular, or a combination of both.

These conductive elements are able to be selectively activated by any suitable technique that creates an electric field on the surface of a micro-assembler backplane on which the micro-objects are placed. In an example, an electrical potential is able to be placed on an electrode in the micro-assembler backplane by activating a light activated switch, such as a phototransistor, that charges a storage capacitor whose output terminal provides a voltage source to that electrode. In an example, a microassembler backplane is able to have a configurable, time varying, electrical potential field applied across its array of electrodes by controlling a corresponding array of phototransistors and storage capacitors that connect each electrode to a voltage source. In an example, this array of phototransistors is able to be arranged on or in proximity to the microassembler backplane, such as on a surface that is opposite the surface onto which micro-objects are placed. Selective activation of electrodes in such an example is able to be achieved by illuminating the array of phototransistors with a variable light pattern that varies with time to illuminate selected phototransistors to cause a corresponding time varying electric field to be generated on the surface of the micro-assembler backplane on which micro-objects are placed. This configurable and time varying electrical potential allows micro-objects to be moved and placed along the surface of the micro-assembler backplane by selectively projecting variable light patterns that are optical image control patterns.

A selected set of phototransistors, when exposed to light, are able to be used to switch one or more of a positive voltage, a negative voltage, and an AC voltage, to charge selected electrodes on or in close proximity to the surface of the microassembler backplane. In an example, each of those electrodes contain a conductive element that is able to generate one or more of dielectrophoretic (DEP) and electrophoretic (EP) forces on the surface onto which micro-objects are to be placed. The DEP and EP forces may be used to manipulate single micro-objects or groups of micro-objects that may comprise functionally identical or distinct micro-objects.

Using a variable light pattern containing a control pattern to illuminate selected phototransistors allows the micro-assembler to precisely and quickly manipulate micro-objects and place them or orient them in specific locations, shapes, or patterns. Control patterns which are able to be formed by an optical image that is projected onto the phototransistor array may be used to control the phototransistors or other devices that are able to control or generate an electric field (e.g., electrodes, transistors, phototransistors, capacitors, etc.). Control patterns contained in the variable light pattern in some examples indicate a voltage pattern that is to be formed across at least a portion of the microassembler backplane surface. Utilizing a light emitting device to generate optical image control patterns or voltage patterns allows a computing device to automatically form or place micro-objects into shapes or patterns. A camera and/or other micro-object location sensor is able to be used to determine the position and orientation of micro-objects on a microassembler backplane surface, such as by processing an image captured of that surface by a camera and/or by an image sensor. In further examples, other devices may be used to detect the positions and orientations of micro-objects on the micro-assembler surface.

Various Examples of Machine Vision Systems And Methods

Referring to FIG. 1, an example machine vision system is viewing a working optical inspection region 102 (e.g., a working FOV region which can also be referred to as a working area) on a planar working surface showing a plurality of micro-objects and/or micro-LEDs 104 located directly on the planar working surface, according to various examples of the present disclosure. The working optical inspection region 102, which may also be referred to as a machine vision system working area, and the like, includes a plurality of micro-objects and/or micro-LEDs 104 located at various locations distributed over the working area 102 as shown. The working area 102 has a defined width 108 and a defined height 110 as shown. In this example, the micro-LED device 104 can be a 50 µm×25 µm image element.

Figure 2:
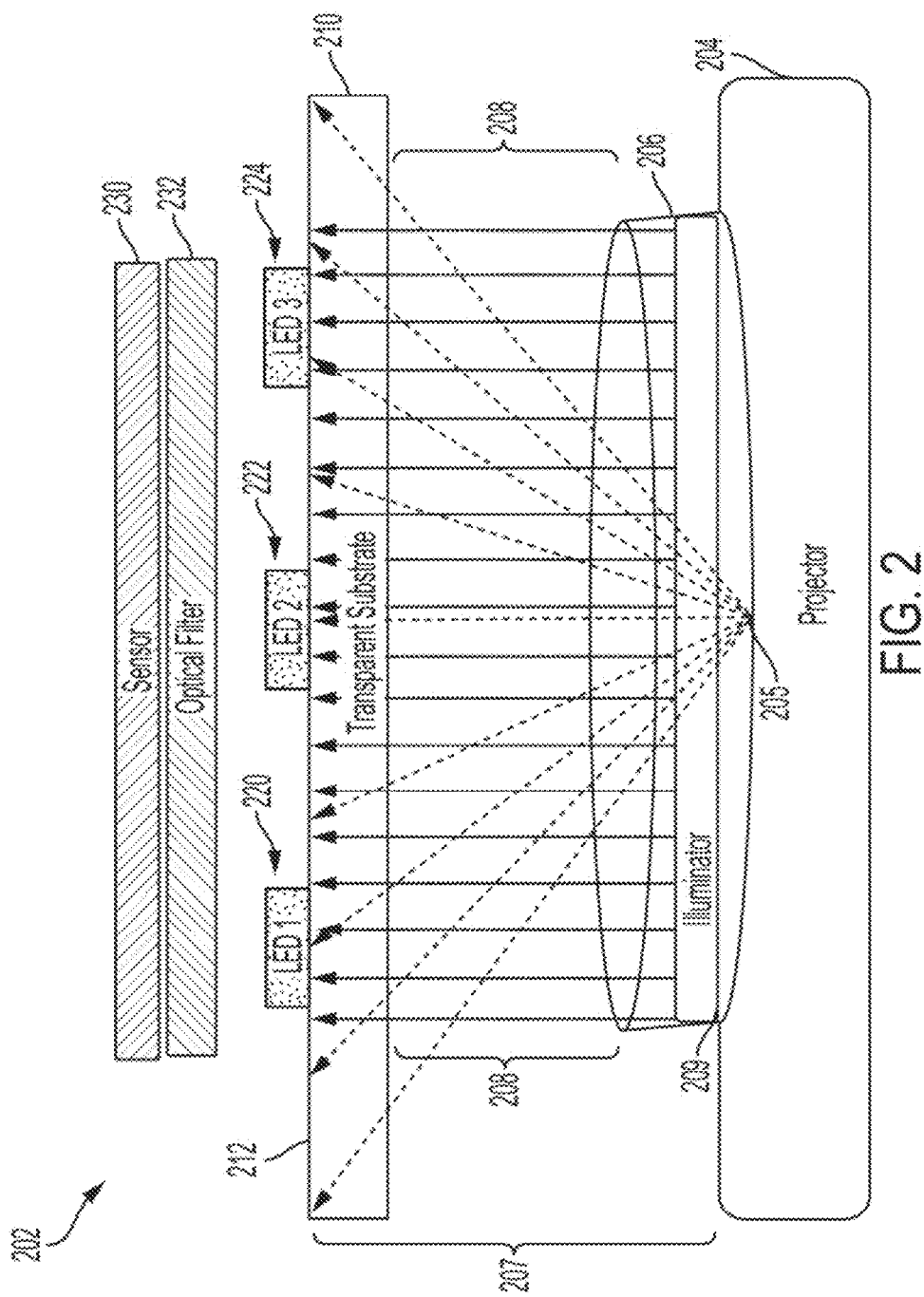
FIG. 2 is an illustration of an example lensless near-contact vision system architecture, where an optical module includes a sensor located above and facing downward toward a planar working surface of a transparent substrate on which is a working optical inspection region such as shown in FIG. 1.

Referring to FIG. 2, a machine vision system includes an example lensless near-contact vision system architecture 202, where an LNCIM includes an LNCIM sensor 230 located above and facing downward toward a planar working surface 212 of a transparent substrate 210 on which is a working FOV region 102. In the example, three micro-LEDs 220, 222, 224, are disposed on the planar working surface 212 in the working FOV region 102.

A projector 204, according to the example, is located below the transparent substrate 210. The projector 204 produces dynamic image patterns, in a wavelength band in the visible spectrum, optionally focused via a source optical train 206 on or near the upper surface 212 of the transparent substrate 210 that are used to manipulate micro-objects on the planar working surface 212. For example, and not for limitation, the projector 204 can project 207 blue light or green light 205 to produce the dynamic image patterns. A microassembler 3632 in a micro-assembly process, for example, can impart movement to a micro-object and/or micro-scale device in a working area on a generally planar working surface 212 by causing the projector 204 to project 207 light signals and dynamic image patterns on or near the planar working surface 212. The machine vision system also includes an illumination light source (illuminator) 209 optically coupled to a source optical train 206 that passes and directs emitted illumination light 208 in a defined wavelength range, e.g., in the near-infrared wavelength range, from the source optical train 206 to illuminate an LNCIM field-of-view (FOV) region on the planar working surface 212 of the transparent substrate 210. The transparent substrate 210, according to various embodiments, can also be referred to herein as a microassembler backplane 210. While the projector 204 and the illumination light source 209 are shown in FIG. 2 being optically coupled to a single source optical train 206, in various embodiments the illumination light source 209 can be optically coupled to the source optical train 206 to emit the illumination light 208, while the projector 204 can be optically coupled to a separate source optical train (not shown) to project 207 the blue light or green light 205 to produce the dynamic image patterns.

An optical filter 232 can be interposed between the face of the image sensor 230 and the planar working surface 212. This optical filter 232 reduces (attenuates) an amount of light 205 from the projector outside of a specified wavelength range that can be incident on the face of the image sensor 230. In the example, the image sensor 230 with the optical filter 232 interposed between the image sensor 230 and the transparent substrate 210, are located on one side of the transparent substrate 210, and the projector 204 and the illuminator 209 are located on an opposite side of the transparent substrate 210, as shown in FIG. 2. The image sensor 230, the optical filter 232, the projector 204, and the illuminator 209, are therefore associated with each other in the example lensless near-contact vision system architecture 202. The optical filter 232 filters light from the projector 204, to pass to the face of the image sensor 230 only wavelengths in a specified wavelength range, e.g., in an infrared light wavelength range. This optical filter 232 reduces (attenuates) an amount of light 205 from the projector outside of the specified wavelength range that can be incident on the face of the image sensor 230. In the discussions herein of various example embodiments, unless it is clearly understood from the context of a particular discussion, a reference to a particular image sensor 230 will be understood to include its optical filter 232 interposed between the face of the particular image sensor and the transparent substrate 210. One example in which use of an optical filter 232 would be optional is when a particular example lensless near-contact vision system architecture 202 does not use a projector 204 to project 207, for example, the blue light or green light 205 to produce the dynamic image patterns to manipulate micro-objects 220, 222, 224, on the planar working surface 212.

Figure 3:
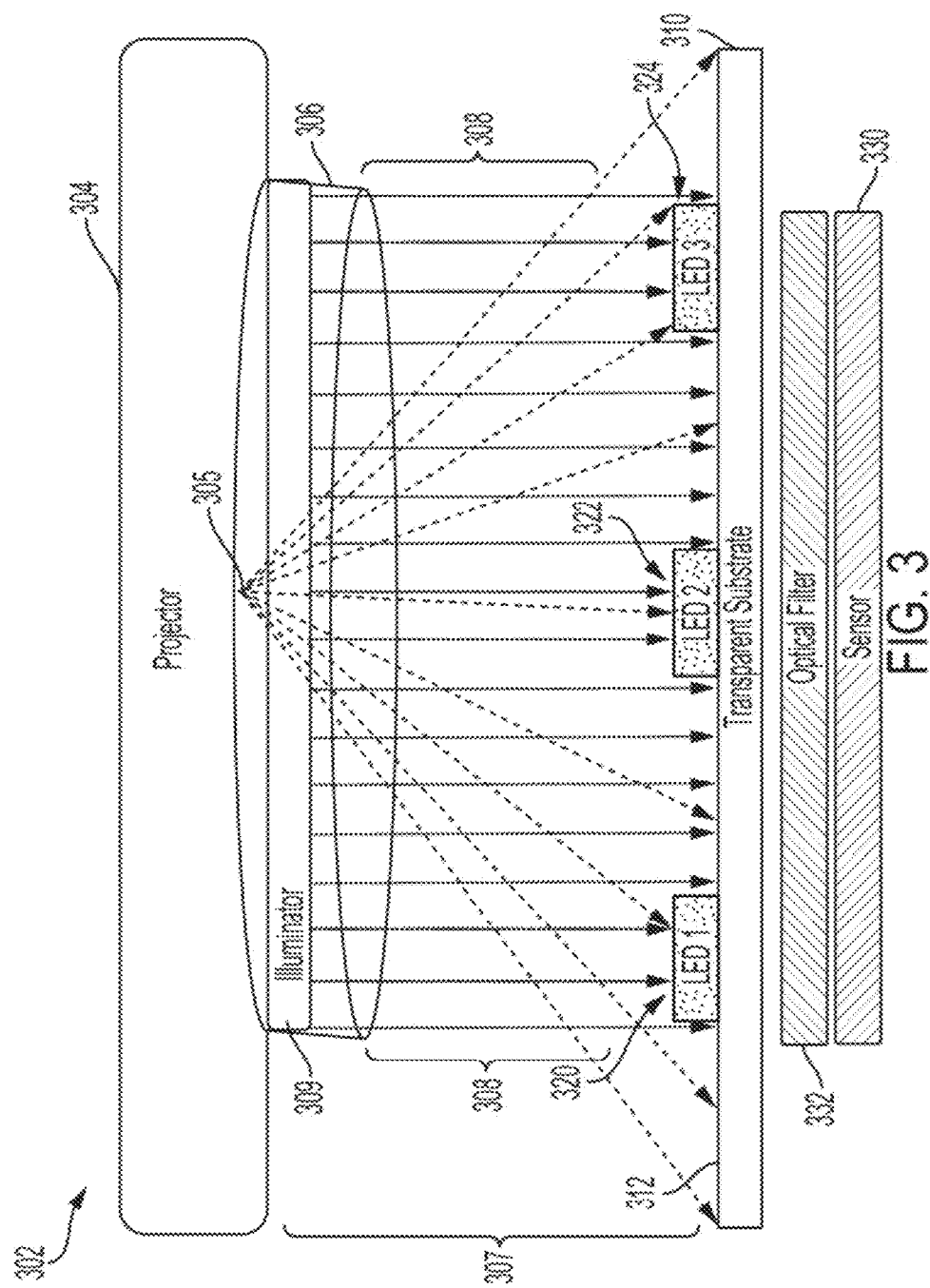
FIG. 3 is an illustration of an example lensless near-contact vision system architecture, where an optical module includes a sensor 230 located below and facing upward toward a transparent substrate on which is a working optical inspection region on a planar working surface of the transparent substrate.

Referring to FIG. 3, a machine vision system includes an example lensless near-contact vision system architecture 302, where an optical module includes an image sensor 330 located below and facing upward toward a planar working surface 312 of a transparent substrate 310 on which is a working FOV region 102. In the example, three micro-LEDs 320, 322, 324, are disposed on the planar working surface 312 in the working FOV region 102.

A projector 304, according to the example, is located above the transparent substrate 310. The projector 304 produces dynamic image patterns, in a wavelength band in the visible spectrum, focused via a source optical train 306 on or near the upper surface 312 of the transparent substrate 310 that are used to manipulate micro-objects on the planar working surface 312. For example, and not for limitation, the projector 304 can project 307 blue light or green light 305 to produce the dynamic image patterns on or about the planar working surface 312. A microassembler 3632 in a micro-assembly process, for example, can impart movement to a micro-object and/or micro-scale device in a working area on a generally planar working surface 312 by causing the projector 304 to project 307 light signals and dynamic image patterns on the planar working surface 312. The machine vision system also includes an illumination light source (illuminator) 309 optically coupled to a source optical train 306 that passes and directs emitted illumination light 308 in a defined wavelength range, e.g., in the near-infrared wavelength range, from the source optical train 306 to illuminate a module field-of-view (FOV) region on the planar working surface 312 of the transparent substrate 310. The transparent substrate 310, according to various embodiments, can also be referred to herein as a microassembler backplane 310. While the projector 304 and the illumination light source 309 are shown in FIG. 3 being optically coupled to a single source optical train 306, in various embodiments the illumination light source 309 can be optically coupled to the source optical train 306 to emit the illumination light 308, while the projector 304 can be optically coupled to a separate source optical train (not shown) to project 307 the blue light or green light 305 to produce the dynamic image patterns.

An optical filter 332 can be interposed between the face of the image sensor 330 and the planar working surface 312. This optical filter 232 reduces (attenuates) an intensity of the light 205 projected from the projector outside of a define wavelength range that can be incident on the face of the image sensor 230. In the example, the image sensor 330 with the optical filter 332 interposed between the image sensor 330 and the transparent substrate 310, are located on one side of the transparent substrate 310, and the projector 304 and the illuminator 309 are located on an opposite side of the transparent substrate 310, as shown in FIG. 3. The image sensor 330, the optical filter 332, the projector 304, and the illuminator 309, are therefore associated with each other in the example lensless near-contact vision system architecture 302. The optical filter 332 filters light from the projector 304 allowing to pass to the face of the image sensor 330 only wavelengths in a specified wavelength range, e.g., in an infrared light wavelength range. This optical filter 332 reduces (attenuates) an amount of light 305 from the projector outside of the specified wavelength range that can be incident on the face of the image sensor 330. In the discussions herein of various example embodiments, unless it is clearly understood from the context of a particular discussion, a reference to a particular image sensor 330 will be understood to include its optical filter 332 interposed between the face of the particular image sensor 330 and the transparent substrate 310. One example in which use of an optical filter 332 would be optional is when a particular example lensless near-contact vision system architecture 302 does not use a projector 304 to project, for example, the blue light or green light 305 to produce the dynamic image patterns to manipulate micro-objects 320, 322, 324, on the planar working surface 312.

Figure 4:
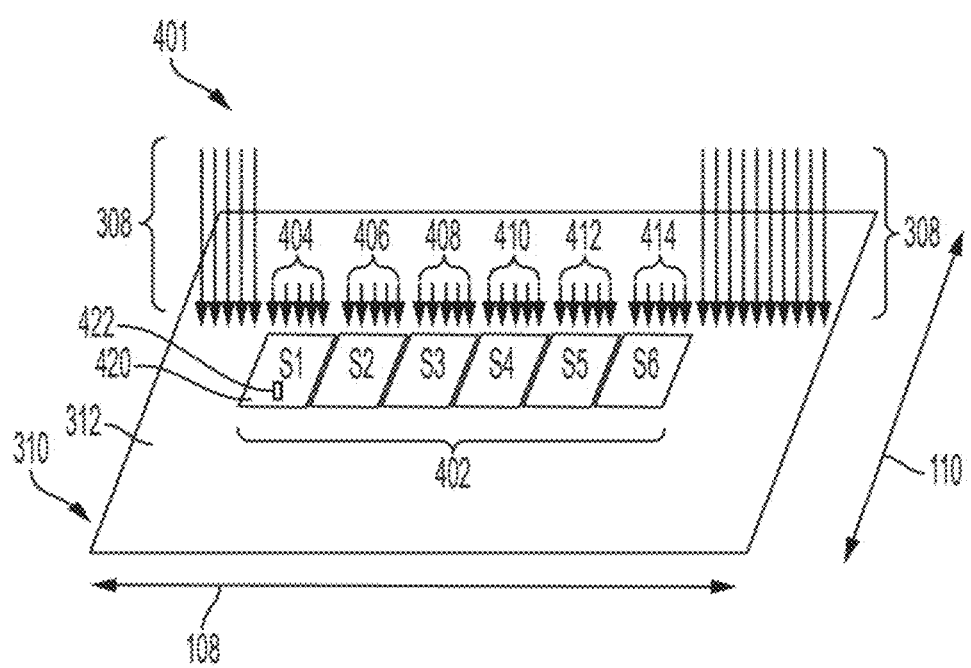
FIG. 4 is an illustration of an example lensless near-contact vision system architecture, where an array of optical modules including respective sensors is located below and facing upward toward a transparent substrate on which is a working optical inspection region on a planar working surface of the transparent substrate.

FIG. 4 illustrates an example architecture 401 array 402 of six individual LNCIM (also referred to as "optical modules", "individual modules", "IM", and the like), of a machine vision system. The six LNCIM are arranged side-by-side in a feathered field-of-view (FOV) optical module array 402 (also referred to as an LNCIM array 402) viewing from below the working optical inspection region 102 on the planar working surface 312 of the transparent substrate 310. For example, a first LNCIM image sensor 420, 330 is viewing, from under the transparent substrate 310, a first LNCIM FOV region associated with the first LNCIM image sensor S1 420, 330. A micro-LED 422 is disposed in the first LNCIM FOV region on the planar working surface 312 of the transparent substrate 310.

Illumination light 308 is directed from an illumination light source (e.g., an illuminator 309) and source optical train 306, which in the example are located above the transparent substrate 310, down toward the planar working surface 312. A first portion 404 of the illumination light 308 is incident on the first LNCIM FOV region on the planar working surface 312. A second portion 406 of the illumination light 308 is incident on the second LNCIM FOV region on the planar working surface 312, which is associated with a second LNCIM image sensor S2 in the LNCIM array 402. A third portion 408 of the illumination light 308 is incident on the third LNCIM FOV region on the planar working surface 312, which is associated with a third LNCIM image sensor S3 in the LNCIM array 402. A fourth portion 410 of the illumination light 308 is incident on the fourth LNCIM FOV region on the planar working surface 312, which is associated with a fourth LNCIM image sensor S4 in the array 402. Similarly, a fifth portion 412 of the illumination light 308 is incident on the fifth LNCIM FOV region associated with a fifth LNCIM image sensor S5 in the LNCIM array 402. In similar fashion, a sixth portion 414 of the illumination light 308 is incident on the sixth LNCIM FOV region associated with a sixth LNCIM image sensor S6 in the array.

Figure 5:
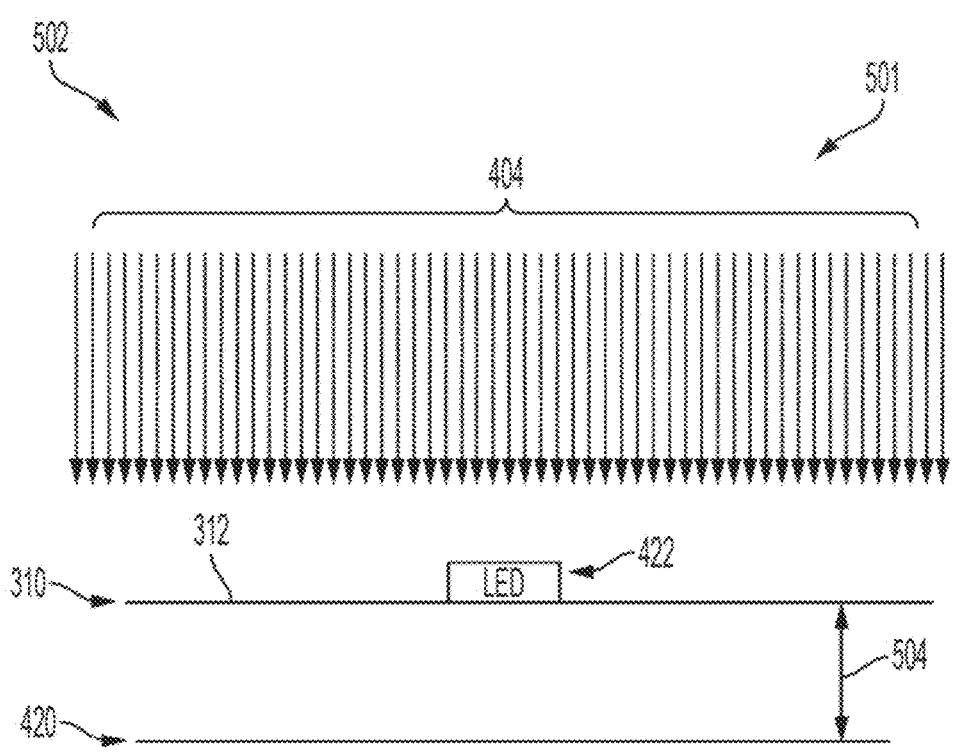
FIG. 5 is a side view of a first optical module sensor in the array shown in FIG. 4, located below and facing upward toward the transparent substrate on which is the working optical inspection region on the planar working surface of the transparent substrate.

FIG. 5 is a side view of the first LNCIM image sensor S1 420, 330 in the array 402 shown in FIG. 4, located below and facing upward toward the transparent substrate 310 on which is the working optical inspection region 102 on the planar working surface 312 of the transparent substrate 310. A micro-LED 422 is disposed in the first module FOV region on the planar working surface 312, which is associated with the first LNCIM image sensor S1 330 in the array 402.

In this example, a machine vision system uses an illumination light source (e.g., illuminator 309) optically coupled to a source optical train 306 which passes and directs emitted coherent illumination light 308 in a wavelength range of approximately 1000 nm. One or more lasers (not shown) can be utilized in the illumination light source to emit from the source optical train 306 the coherent illumination light 308 in the wavelength range of approximately 1000 nm. For the example, and not for limitation, the coherent illumination light 308 is in a wavelength range of 980 nm+/−a tolerance of 20 nm.

FIG. 5 shows the first portion 404 of the coherent illumination light 308 which is incident on the first LNCIM FOV region on the planar working surface 312. In the example, the micro-LED 422 is disposed in the first LNCIM FOV region on the planar working surface 312. In the example, a near-contact distance 504 of the first LNCIM image sensor S1 420, 330 to the planar working surface 312 is selected in combination with a specified wavelength range of 980 nm+/−a tolerance of 20 nm, based on the specified size of the micro-LED 422 measured in one or more critical dimensions across the device 422. A circular micro-object (e.g., the micro-LED 422), according to the example, is specified with a diameter of approximately 50 micrometers. A rectangular micro-object (e.g., the micro-LED 422), according to the example, is specified at 50 micrometers by 25 micrometers. The combination of the specified wavelength range of the coherent illumination light 308 and the specified near-contact distance 502 of the image sensor S1 330 to the planar working surface 312 are selected, along with other parameters, to generate a diffraction pattern of the coherent illumination light 308 that is incident on the face of the image sensor S1 330. For example, light signals received from a micro-object disposed in a LNCIM FOV region on the planar working surface 312 can comprise a diffraction pattern received by an image sensor of an LNCIM associated with the LNCIM FOV region. The diffraction pattern of the coherent illumination light 308, according to various embodiment, can be captured by the image sensor S1 330 of the first LNCIM to create a captured image of the diffraction pattern. The captured image can optionally be adjusted using image processing algorithms. The centroid of the diffraction pattern of a micro-object corresponds to both the centroid of the object and the centroid of a conventional image of the object. The rotational orientation of the diffraction pattern of an object corresponds to both the rotational orientation of the object and the rotational orientation of a conventional image of the object. The captured image, optionally after the image processing, can also be analyzed and compared by the machine vision system to various features of predefined diffraction patterns of possible known micro-objects (e.g., micro-LEDs) expected to be disposed on the planar working surface 312.

The micro-LED 422, according to various embodiments, can be identified by its diffraction pattern detected by the image sensor S1 330 of the first LNCIM. The physical location of the micro-LED 422 on the planar working surface 312 of the working optical inspection region 102 can also be determined by the machine vision system. That is, for example, the machine vision system can determine the physical location of the micro-LED 422 (e.g., of a centroid of the micro-LED) in the first LNCIM FOV region associated with the first LNCIM image sensor S1 330, by determining the location of the diffraction pattern in the captured image.

A horizontal orientation of the micro-LED can be determined based on the detected orientation of the diffraction pattern in the captured image. That is, for example, features of the micro-LED that are optically visible and that affect the diffraction pattern can indicate horizontal orientation for the micro-LED 422. The machine vision system, for example, can also analyze the diffraction pattern in the captured image and compare the diffraction pattern to various features of predefined diffraction patterns of possible known micro-objects (e.g., micro-LEDs) expected to be disposed on the planar working surface 312. In various embodiments, the comparing may include comparing irradiance levels of light signals in the diffraction pattern to irradiance levels of light signals in predefined models of diffraction patterns associated with features of known micro-objects. The models can be stored in an imaging database 3618 (see FIG. 36).

Additionally, a vertical orientation of the micro-LED can be determined based on analysis of the detected diffraction pattern in the captured image. That is, for example, features of the micro-LED that are optically visible and that affect the diffraction pattern can indicate whether the micro-LED 422 is right-side-up or upside-down. The machine vision system, for example, can analyze the diffraction pattern in the captured image and compare the diffraction pattern to various features of predefined diffraction patterns of possible known right-side-up and upside-down vertical orientations of known micro-objects (e.g., micro-LEDs) expected to be disposed on the planar working surface 312. In various embodiments, the comparing includes comparing irradiance levels of light signals in the diffraction pattern to irradiance levels of light signals in predefined models of diffraction patterns. The models can be stored in an imaging database 3618 (see FIG. 36). A match found will indicate a particular vertical orientation for the micro-LED 422.

Optionally, the machine vision system in various embodiments, using computational algorithms and software, can perform image processing on the captured image to convert the diffraction pattern in the captured image to its real space equivalent in a reconstructed image of the micro-LED 422 (e.g., a conventional photographic or rendered image that could be observable by human eye). The machine vision system, according to the various embodiments, can compare the reconstructed real space image associated with the diffraction pattern against predefined real space images to identify the micro-LED 422. The location of the micro-LED 422 in the reconstructed real space image can be analyzed by the machine visions system to determine the physical location of the micro-LED on the planar working surface 312. The horizontal orientation of the micro-LED can be determined by the machine vision system by analyzing the reconstructed real space image. Additionally, the reconstructed real space image can be compared against predefined right-side-up orientation or upside-down orientation of the micro-LED 422 to determine a match which will indicate the micro-LED's vertical orientation.

The above example process of determining various aspects of an individual micro-LED disposed on the working planar surface 312 can similarly be applied to multiple diffraction patterns found in a captured image of a LNCIM FOV region. Additionally, a plurality of optical image capture modules 402, such as shown in the example of FIG. 4, can capture images and be collectively moved by a machine vision system to cover various LNCIM FOV regions on a working area for the machine vision system. In this way, for example, an array of optical image capture modules 402 can progressively capture images of an entire large working area 102 for a machine vision system. Thereby the machine visions system can inspect the entire working area 102. According to certain embodiments, the large working area can be at least twelve (12) inches wide.

Figure 6:
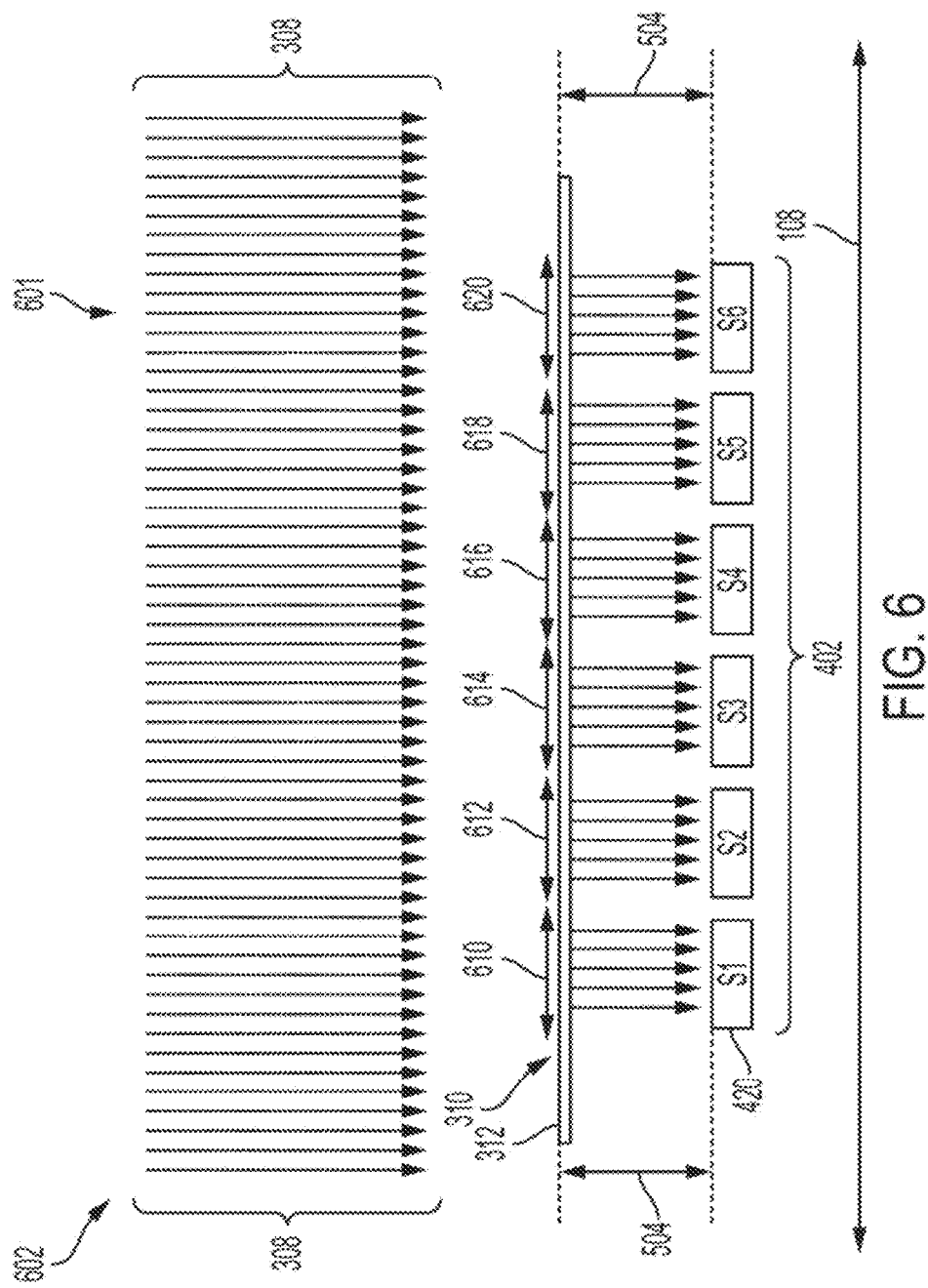
FIG. 6 is a side view of the example array of optical modules shown in FIG. 4, and illustrating module field-of-view (FOV) regions on the planar working surface.

Referring to FIG. 6, for example, a machine visions system 602 can include an architecture 401, 601 comprising an array 402 of six individual optical image capture modules associated with respective six LNCIM image sensors S1, S2, S3, S4, S5, S6. See the example introduced above with reference to FIG. 4. FIG. 6 specifically identifies the six LNCIM FOV regions 610, 612, 614, 616, 618, 620, associated with the six LNCIM image sensors S1, S2, S3, S4, S5, S6. The six LNCIM are arranged side-by-side in a feathered field-of-view (FOV) LNCIM array 402 viewing from below the working optical inspection region 102 on the planar working surface 312 of the transparent substrate 310. All six image sensors S1, S2, S3, S4, S5, S6, are located at the same near-contact distance 502 from the planar working surface 312.

Figure 7:
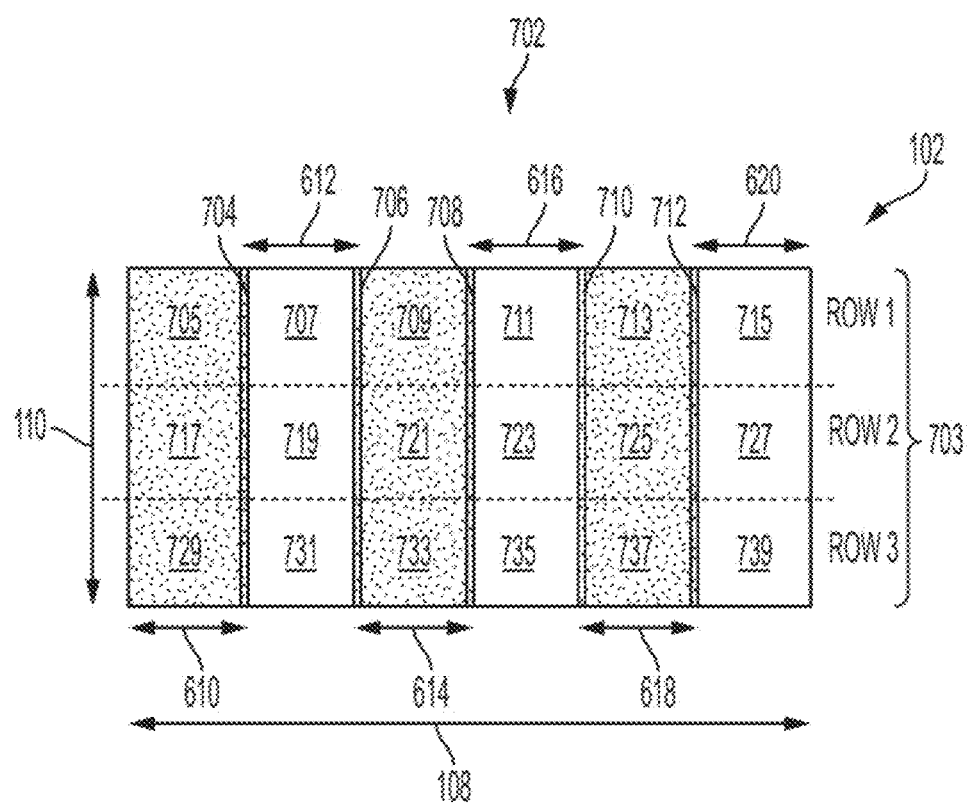
FIG. 7 is a view of an example plurality of module FOV regions arranged in three rows by six columns on a planar working surface, from which to capture images by six individual optical modules arranged in an array such as shown in FIG. 4.

With reference to FIG. 7, the array 402 of six LNCIM image sensors S1, S2, S3, S4, S5, S6, has associated respective six LNCIM-captured images representing the six LNCIM FOV regions 610, 612, 614, 616, 618, 620, associated with the six LNCIM image sensors S1, S2, S3, S4, S5, S6. FIG. 7 shows three rows 703 of six LNCIM-captured images 705, 707, 709, 711, 713, 715, 717, 719, 721, 723, 725, 727, 729, 731, 733, 735, 737, 739. The eighteen images can be captured progressively by capturing six LNCIM-captured images at a time. The LNCIM-captured images, according to various embodiments, can be arranged side-by-side touching or slightly overlapping 704, 706, 708, 710, 712, adjacent LNCIM-captured images (e.g., from adjacent LNCIM FOV regions) thereby forming the three rows 703 of LNCIM-captured images. The machine vision system can stitch together adjacent LNCIM-captured images to form a continuous working FOV captured-image of the working FOV region (working area) 102 for the machine vision system.

It should be noted that, according to various embodiments, a stitched-together staggered geometry of captured side-by-side images might not necessarily form a continuous captured image of a row in the working FOV region on the planar working surface. That is, LNCIM-captured images from adjacent side-by-side LNCIMs may not touch or slightly overlap each other. However, the LNCIM-captured images from adjacent side-by-side LNCIMs can represent relevant areas of the working FOV region 102, in which are located micro-objects and/or microscale devices like micro-LEDs. These views and corresponding LNCIM-captured images in a stitched-together staggered geometry are nonetheless useful feedback to a microassembler system to perform a micro-assembly process.

More specifically, the example of FIG. 7 is a view 702 of six feathered LNCIM FOV regions 610, 612, 614, 616, 618, 620, (see also FIG. 6) arranged side-by-side touching or slightly overlapping adjacent LNCIM-captured images in a row 108 along a width of the working FOV region 102. The six feathered LNCIM-captured images 610, 612, 614, 616, 618, 620, are captured three times by the respective image sensors of the array 402 of six LNCIMs, thereby forming stitched together three rows 703 along the height 110 of the working FOV region 102, by six columns of feathered stitched LNCIM-captured images along the width 108 of the planar working surface 312 in the working optical inspection region 102. As can be seen in FIG. 7, in row one, the adjacent LNCIM-captured images 705, 707, 709, 711, 713, 715, have slight overlap areas 704, 706, 708, 710, 712, as shown.

Figure 8:
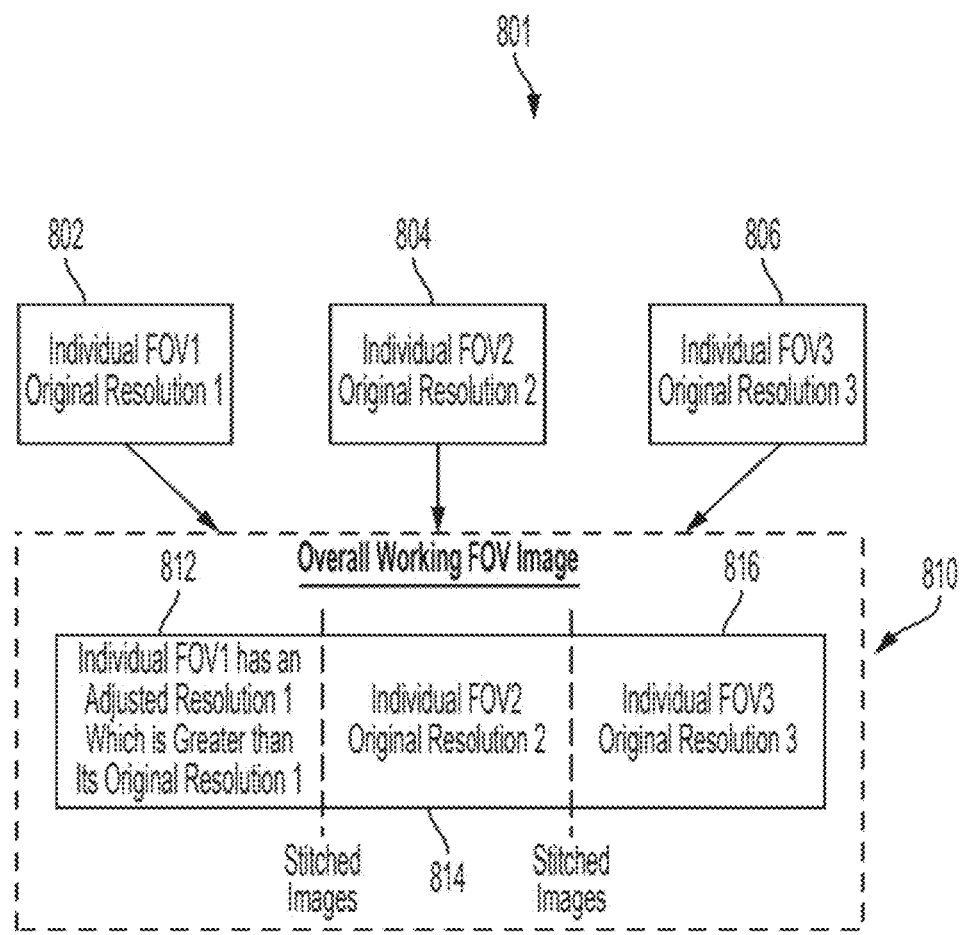
FIG. 8 is a block diagram illustrating an example of image capture, processing, and stitching operations of a machine vision system suitable for use by a microassembler system, according to an example of the present disclosure.

FIG. 8 illustrates an example of image processing operations 801 on three separate LNCIM-captured images 802, 804, 806, captured by the optical image sensors of a set of three individual LNCIMs in a machine vision system (not shown). The machine vision system analyzes the three LNCIM-captured 802, 804, 806. It determines that the first LNCIM-captured image 802 from the first LNCIM has a resolution that is too low for the machine vision system to adequately identify micro-objects and/or microscale devices in the first LNCIM-captured image 802, while the second LNCIM-captured image 804 and the third LNCIM-captured image 806 have original image resolutions that are adequate for the machine vision system to identify micro-objects and micro-scale devices. The machine vision system performs image processing on the first LNCIM-captured image 802 to adjust the LNCIM-captured image resolution to a higher resolution that is adequate for the machine vision system to identify the micro-objects and microscale devices. Examples of image processing to enhance resolution of LNCIM-captured images are discussed below with reference to FIGS. 32 and 33.

The machine vision system then performs further image processing by an image stitching operation in which the adjusted first LNCIM-captured image 812, with its LNCIM-captured image resolution having been adjusted to a higher resolution, is stitched together with the second LNCIM-captured image 814, with its original image resolution, and which is stitched together with the third LNCIM-captured image 816, with its original image resolution. The stitching operation forms an overall working FOV image 810 that is the combination of the three LNCIM-captured images 812, 814, 816, in which the working FOV image resolution for the overall working FOV image 810 is adequate for the machine vision system to identify micro-objects and microscale devices located in the overall working FOV image 810. In certain embodiments, a working FOV image resolution of an overall working FOV image can be at least equal to or greater than the image resolution of each LNCIM-captured image 802, 804, 806, from the plurality of LNCIM FOV regions on the planar working surface. Additionally, in certain embodiments a width of an overall working FOV region on the planar working surface is at least ten times larger than a width of any one LNCIM FOV region in the plurality of LNCIM FOV regions on the planar working surface.

Figure 9:
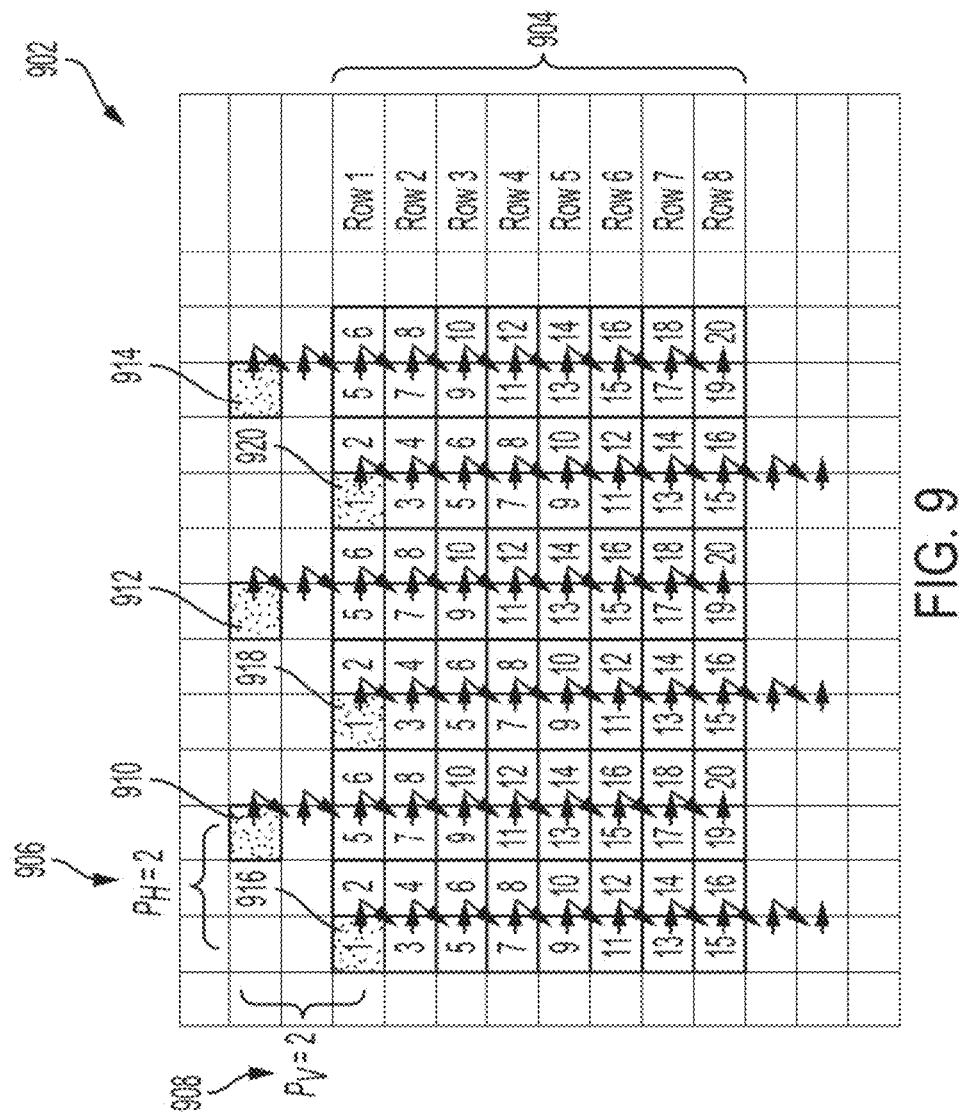
FIG. 9 is a planar view of an example plurality of module FOV regions on a planar working surface, from which to capture images by six individual optical modules in a staggered FOV stitching geometry using a step-and-repeat assembly process in which a horizontal pitch is two and a vertical pitch is two.

FIG. 9 is a top view of a first example plurality of LNCIM FOV regions in a working area on a planar working surface 902, arranged in 8 rows 904 and twelve columns from which to capture images by the respective image sensors of six individual LNCIMs 910, 912, 914, 916, 918, 920. LNCIMs are arranged in a staggered FOV stitching geometry using a step-and-repeat assembly process in which a horizontal pitch 906 is two and a vertical pitch 908 is two.

It should be noted, with reference to FIGS. 3 to 7, that an array 402 of LNCIM's, according to various embodiments, can be arranged located on one side of (e.g., below) the transparent substrate 310, and on an opposite side of (e.g., above) the transparent substrate 310 are located one or more illumination light sources 309, and optionally one or more projectors 304, as has been shown in FIGS. 3 to 7 and discussed above with reference to these figures.

Example System Architecture Including Stationary Illumination Light Sources

According to certain embodiments, the one or more illumination light sources 309, and the optional one or more projectors 304, can be arranged in a stationary lighting fixture arrangement that locates and directs the illumination light sources 309 and the optional projectors 304 to emit and direct illumination light 308 from the illumination light sources 309, and project 307 the blue or green light 305 from the projectors 304, toward the planar working surface 312 of the transparent substrate 310.

Example System Architecture Including Stationary Illumination Light Sources, Stationary Transparent Substrate, and Moving LNCIM Array According to some embodiments, the transparent substrate 310 is held stationary by a fixture arrangement, where the stationary lighting fixture arrangement directs the illumination light 308, and optionally directs the blue or green light 305, toward the stationary planar working surface 312 of the transparent substrate 310. Then, the array 402 of LNCIM's, on the opposite side of (e.g., below) the transparent substrate 310, is arranged in a moving LNCIM array fixture arrangement that can move the array 402 in a plane that is generally parallel to the planar working surface 312 of the transparent substrate 310 to enable the image sensors 330 in the array 402 to capture images of light signals comprising diffraction patterns from the micro-objects 422 located on the planar working surface 312.

Example System Architecture Including Stationary Illumination Light Sources, Stationary LNCIM Array, and Moving Transparent Substrate In some embodiments, the array 402 of LNCIM's, on the opposite side of (e.g., below) the transparent substrate 310, is arranged and held in a stationary fixture arrangement. Then, the transparent substrate 310 is arranged in a moving fixture arrangement that can move the transparent substrate 310 in a plane that is generally parallel to the image sensors 330 in the array 402 to enable the image sensors 330 in the array 402 to capture images of diffraction patterns from micro-objects 422 located on the planar working surface 312 on the moving transparent substrate.

Example System Architecture Including Stationary Transparent Substrate, Moving Illumination Light Sources, and Moving LNCIM Array Alternatively, in some embodiments, the transparent substrate 310, is arranged and held in a stationary fixture arrangement. The one or more illumination light sources 309, and the optional one or more projectors 304, can be arranged in a moving lighting fixture arrangement, on one side of (e.g., above) the stationary transparent substrate 310, and the array 402 of LNCIM's, on the opposite side of (e.g., below) the stationary transparent substrate 310, is arranged in a moving LNCIM array fixture arrangement that is synchronized to the moving lighting fixture arrangement. Then, both the moving lighting fixture arrangement and the moving LNCIM array fixture arrangement move synchronized together relative to the stationary transparent substrate 310. The lighting fixture arrangement directs the illumination light 308, and optionally directs the blue or green light 305, toward the stationary planar working surface 312 of the transparent substrate 310 and the image sensors 330 in the array 402 move in a plane that is generally parallel to the transparent substrate 310 to enable the image sensors 330 in the array 402 to capture images of diffraction patterns from micro-objects 422 located in LNCIM FOV regions on the planar working surface 312 on the stationary transparent substrate 310. That is, the illumination light sources 309, and the optional projectors 304, can be arranged in a moving fixture that is synchronized to track the movement of the array 402 of LNCIM's. In these embodiments, the illumination light sources 309, and the optional projectors 304, are particularly arranged to emit and direct illumination light 308 from the illumination light sources 309, and project 307 the blue or green light 305 from the projectors 304, toward the planar working surface 312 to particularly illuminate the LNCIM FOV regions on the planar working surface 312 that are respectively associated with image sensors 330 of the moving LNCIM array 402. Other regions of the planar working surface 312 that are not currently being imaged by the moving array 402 of image sensors 330 do not require illumination by the illumination light 308 and from the optional projectors 304.

According to certain embodiments, each of the image sensors 330 in the moving array 402 is associated with, and receives light signals from, one of the illumination light sources 309 and one of the optional projectors 304 in the moving lighting fixture arrangement.

Continuing with reference to the example in FIG. 9, three LNCIMs 916, 918, 920, start in row number 1, and three LNCIMs 910, 912, 914, start in a row that is two vertical module FOV positions above row number 1 and outside of the working area. The three LNCIMs 916, 918, 920, in row number 1, immediately capture a LNCIM-captured image at step position number 1, as shown. Then, these same modules move to step position number 2 in row number 1 and capture a LNCIM-captured image at step position number 2. The six individual LNCIMs 910, 912, 914, 916, 918, 920, all move in one synchronized group movement following the numbered step-and-repeat sequence 1 to 16, to capture images from the respective module FOV regions in the working area on the planar working surface 902. After the LNCIMs 916, 918, 920, step from row number 1, to row number 2, and to row number 3, the other three LNCIMs 910, 912, 914, that were initially outside of the working area, reach row number 1 at step position number 5. These LNCIMs 910, 912, 914, start capturing LNCIM-captured images at step position 5, then at step position 6, and then at step position 7, continuing in steps up to step position number 20.

A machine vision system arranges the LNCIM-captured images from the six LNCIMs moving together as one group in a side-by-side LNCIM-captured image assembly process. The machine vision system prepares the LNCIM-captured images for an adjacent image stitching operation, possibly performing image processing on individual LNCIM-captured images. For example, the machine vision system might adjust image resolution for a LNCIM-captured image to meet certain image resolution requirements, such as to enable a microassembler system to detect, identify, and move micro-objects and/or microscale devices located on the planar working surface based on the micro-objects and/or microscale devices being detected and identified in the LNCIM-captured image. See the discussion above with reference to FIG. 8 for an example of image processing to adjust image resolution for a LNCIM-captured image which is stitched together with other LNCIM-captured images to form a working FOV image of a working area on a planar surface.

The above-described first example step-and-repeat capture of LNCIM-captured images and assembly process can be characterized by:

a working FOV region arranged in 8 rows and 12 columns of module FOV regions, where the six individual LNCIMs 910, 912, 914, 916, 918, 920, capture LNCIM-captured images of their respective module FOV regions according to:

a horizontal stagger pitch ($P_H$) of module FOV regions in the same row is two, a vertical stagger pitch ($P_V$) of module FOV regions in separate rows is two, and n is a total number of rows which in this example is eight, and s is the total number of steps, which in this example equals $P_H (P_V+n)=2*(2+8)=20$, and where the step-and-repeat assembly process achieves an efficiency of capturing LNCIM-captured images, and stitching adjacent LNCIM-captured images, based on the formula n/($P_H$ ($P_V$+n)). In this example, the efficiency for the step-and-repeat assembly process is 8/(2*(2+8))=0.4. The efficiency metric can be specified within a tolerance of 0.1 (e.g., one tenth). If a total number of rows is increased to greater than or equal to 1000, the efficiency metric can be specified within a tolerance of 0.01 (e.g., one one-hundredth).

Figure 10:
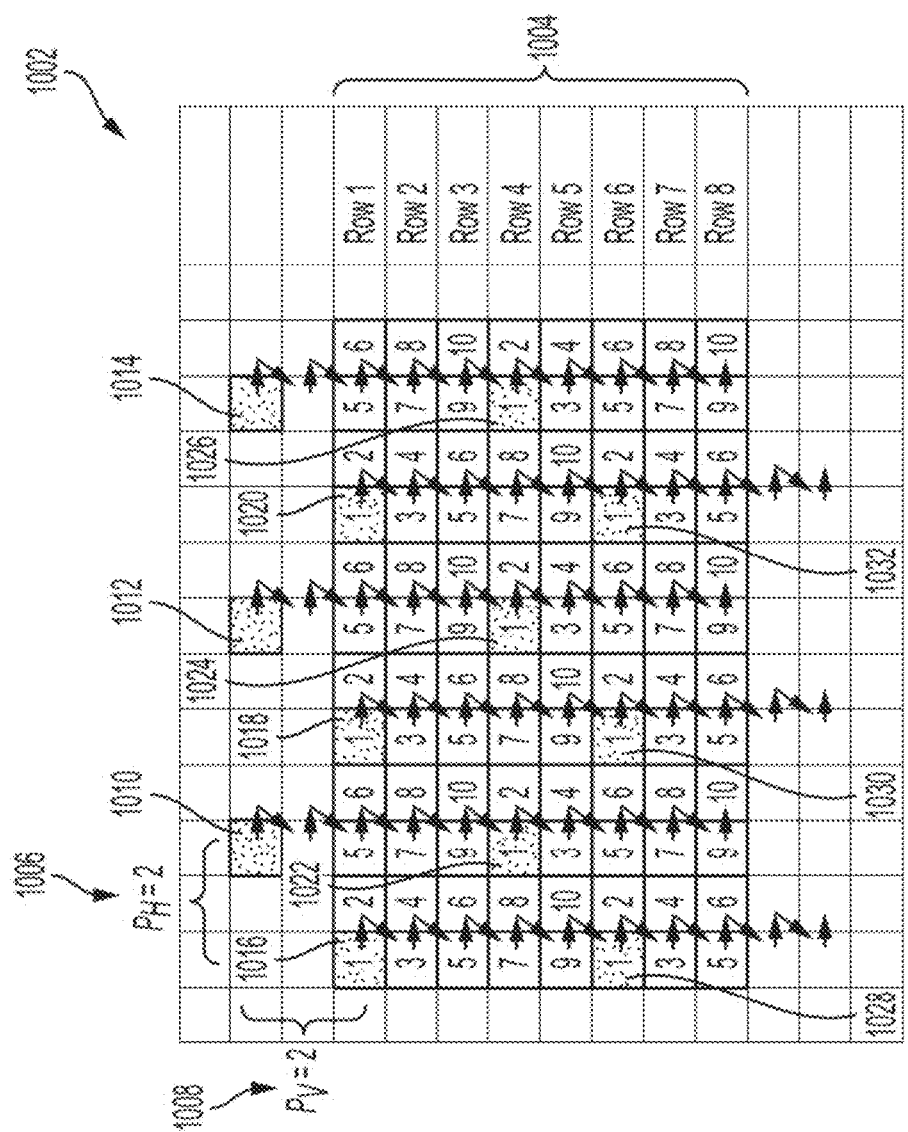
FIG. 10 is a planar view of an example plurality of module FOV regions on a planar working surface, from which to capture images by twelve individual optical modules in a staggered FOV stitching geometry using a step-and-repeat assembly process in which a horizontal pitch is two and a vertical pitch is two.

Referring to FIG. 10, a second example plurality of module FOV regions in a working area on a planar working surface 1002, is shown arranged in eight rows 1004 by twelve columns from which to capture images by twelve individual LNCIMs 1010, 1012, 1014, 1016, 1018, 1020, 1022, 1024, 1026, 1028, 1030, 1032, in a staggered FOV stitching geometry using a step-and-repeat assembly process in which a horizontal pitch 1006 is two and a vertical pitch 1008 is two.

As shown in FIG. 10, three LNCIMs 1016, 1018, 1020, start in row number 1, three LNCIMs 1022, 1024, 1026, start in row number 4, and three LNCIMs 1028, 1030, 1032, start in row number 6, and three LNCIMs 1010, 1012, 1014, start in a row that is two vertical module FOV region positions above row number 1 and outside of the working area.

The three LNCIMs 1016, 1018, 1020, in row number 1, the three LNCIMs 1022, 1024, 1026, in row number 4, and the three LNCIMs 1028, 1030, 1032, in row number 6, immediately capture a LNCIM-captured image at step position number 1, as shown. Then, these same modules move to step position number 2 in respective rows number 1, 4, and 6, and capture a module FOV image at step position number two. The twelve individual LNCIMs 1010, 1012, 1014, 1016, 1018, 1020, 1022, 1024, 1026, 1028, 1030, 1032, all move in one synchronized group movement following the numbered step-and-repeat sequence 1 to 10, to capture images from the respective module FOV regions in the working area on the planar working surface 1002.

After the LNCIMs 1016, 1018, 1020, step from row number 1 to row number 2, and then to row number 3, and contemporaneously the second group of three LNCIMs 1022, 1024, 1026, steps from row number four to row number five and then to row number 6, and the third group of three LNCIMs 1028, 1030, 1032, steps from row number 6 to row number 7 and then to row number 8, the group of three LNCIMs 1010, 1012, 1014, that were initially outside of the working area, reach row number 1 at step position number 5. These LNCIMs 1010, 1012, 1014, start capturing LNCIM-captured images at step position 5, and then at step position 6, and then at step position 7, continuing in steps up to step position number 10.

A machine vision system arranges the LNCIM-captured images from the twelve LNCIMs moving together as one group in a side-by-side LNCIM-captured image assembly process. The system prepares the LNCIM-captured images for an adjacent image stitching operation, possibly performing image processing on individual LNCIM-captured images. For example, the machine vision system might adjust image resolution for a LNCIM-captured image to meet certain image resolution requirements such as to enable a microassembler system to detect, identify, and move micro-objects and/or microscale devices located on the planar working surface based on the micro-objects and/or microscale devices being detected and identified in the LNCIM-captured image. See the discussion above with reference to FIG. 8 for an example of image processing to adjust image resolution for a LNCIM-captured image which is stitched together with other LNCIM-captured images to form a working FOV image of a working area on a planar working surface.

The above-described second example step-and-repeat capture of LNCIM-captured image and assembly process can be characterized by:

a working FOV region arranged in 8 rows and 12 columns of module FOV regions, where the twelve individual LNCIMs 1010, 1012, 1014, 1016, 1018, 1020, 1022, 1024, 1026, 1028, 1030, 1032, capture LNCIM-captured images of their respective module FOV regions according to:

a horizontal stagger pitch ($P_H$) of module FOV regions in the same row is two, a vertical stagger pitch ($P_V$) of module FOV regions in separate rows is two, and n is a total number of rows which in this example is eight, and s is the total number of steps, which in this example equals 10, and where the step-and-repeat assembly process achieves an efficiency of capturing LNCIM-captured images, and stitching adjacent LNCIM-captured images, based on the efficiency formula=number of rows divided by number of steps. =8/10. In this example, the efficiency for the step-and-repeat assembly process is 0.8.

Figure 11:
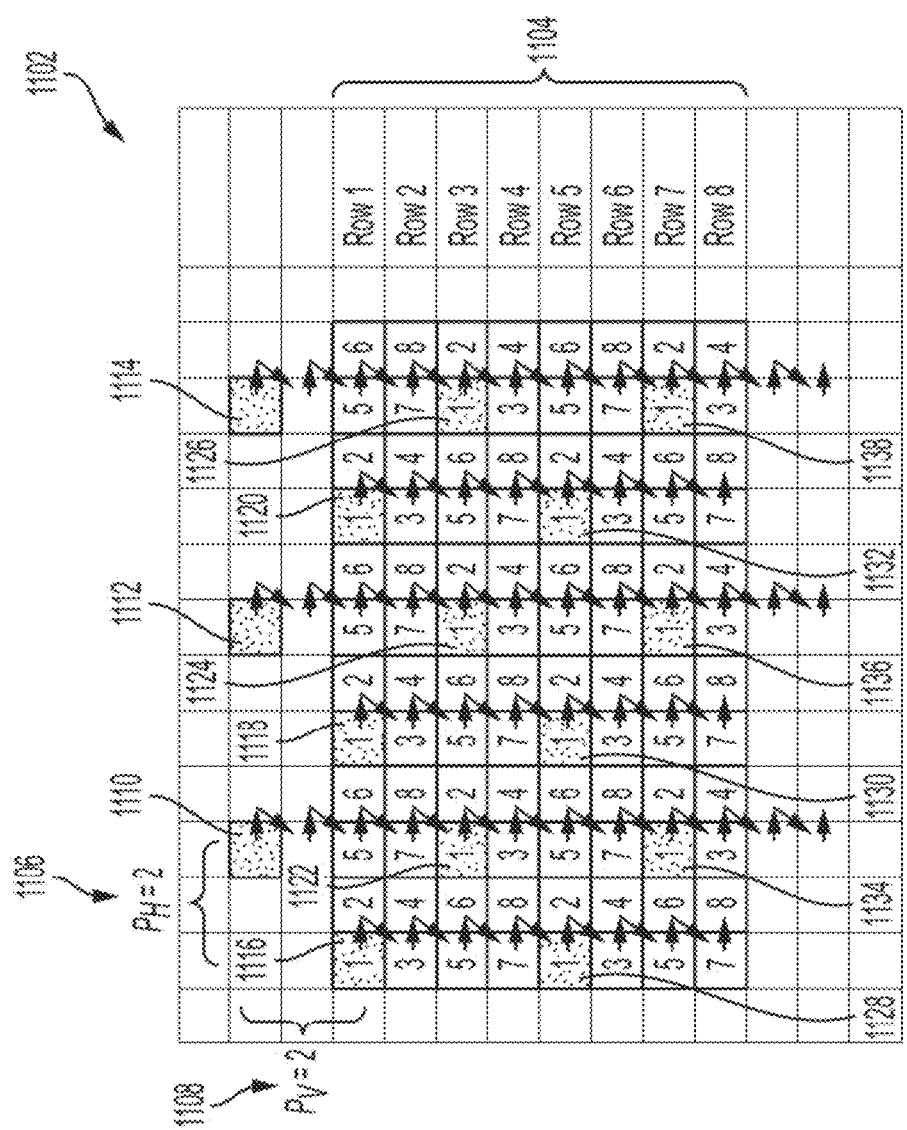
FIG. 11 is a planar view of a plurality of module FOV regions on a planar working surface, from which to capture images by fifteen individual optical modules in a staggered FOV stitching geometry using a step-and-repeat assembly process in which a horizontal pitch is two and a vertical pitch is two.

FIG. 11 illustrates a third example plurality of module FOV regions in a working area on a planar working surface 1102, which is shown arranged in 8 rows 1104 by twelve columns from which to capture images by fifteen individual LNCIMs 1110, 1112, 1114, 1116, 1118, 1120, 1122, 1124, 1126, 1128, 1130, 1132, 1134, 1136, 1138, in a staggered FOV stitching geometry using a step-and-repeat assembly process in which a horizontal pitch 1106 is two and a vertical pitch 1108 is two.

As shown in FIG. 11, three LNCIMs 1116, 1118, 1120, start in row number 1, three LNCIMs 1122, 1124, 1126, start in row number 3, three LNCIMs 1128, 1130, 1132, start in row number 5, and three LNCIMs 1134, 1136, 1138, start in row number 7, and three LNCIMs 1110, 1112, 1114, start in a row that is two vertical module FOV region positions above row number 1 and outside of the working area.

The three LNCIMs 1116, 1118, 1120, in row number 1, the three LNCIMs 1122, 1124, 1126, in row number 3, the three LNCIMs 1128, 1130, 1132, in row number 5, and the three LNCIMs 1134, 1136, 1138, in row number 7, immediately capture a LNCIM-captured image at step position number 1, as shown. Then, these same modules move to step position number 2 in respective rows number 1, 3, 5, and 7, and capture a LNCIM-captured image at step position number 2. The fifteen individual LNCIMs 1110, 1112, 1114, 1116, 1118, 1120, 1122, 1124, 1126, 1128, 1130, 1132, 1134, 1136, 1138, all move in one synchronized group movement following the numbered step-and-repeat sequence 1 to 8, to capture images from the respective module FOV regions in the working area on the planar working surface 1102.

After the LNCIMs 1116, 1118, 1120, step from row number 1 to row number 2, and then to row number 3, and contemporaneously the second group of three LNCIMs 1122, 1124, 1126, steps from row number three to row number four, and then to row number five, and the third group of three LNCIMs 1128, 1130, 1132, steps from row number 5 to row number 6, and then to row number 7, and the fourth group of three LNCIMs 1134, 1136, 1138, steps from row number 7 to row number 8, and then step outside of the working area, the group of three LNCIMs 1110, 1112, 1114, reach row number 1 at position number 5. These LNCIMs 1110, 1112, 1114, start capturing LNCIM-captured images at position 5, and then at position 6, and then at position 7, continuing in steps up to position number 8.

A machine vision system arranges the LNCIM-captured images from the twelve LNCIMs moving together as one group in a side-by-side LNCIM-captured image assembly process. The system prepares the LNCIM-captured images for an adjacent image stitching operation, possibly performing image processing on individual LNCIM-captured images. For example, the machine vision system might adjust image resolution for a LNCIM-captured image to meet certain image resolution requirements such as to enable a microassembler system to detect, identify, and move micro-objects and/or microscale devices located on the planar working surface based on the micro-objects and/or microscale devices being detected and identified in the LNCIM-captured image. See the discussion above with reference to FIG. 8 for an example of image processing to adjust image resolution for a LNCIM-captured image which is stitched together with other LNCIM-captured images to form a working FOV image of a working area on a planar surface.

The above-described third example step-and-repeat capture of LNCIM-captured image and assembly process can be characterized by:

a working FOV region arranged in eight rows and twelve columns of module FOV regions, where the fifteen individual LNCIMs 1110, 1112, 1114, 1116, 1118, 1120, 1122, 1124, 1126, 1128, 1130, 1132, 1134, 1136, 1138, capture LNCIM-captured images of their respective module FOV regions according to:

a horizontal stagger pitch ($P_H$) of module FOV regions in the same row is two, a vertical stagger pitch ($P_V$) of module FOV regions in separate rows is two, and n is a total number of rows which in this example is eight, and s is the total number of steps, which in this example equals 8, and where the step-and-repeat assembly process achieves an efficiency of capturing LNCIM-captured images, and stitching adjacent LNCIM-captured images, based on the efficiency formula=number of rows divided by number of steps. =8/8. In this example, the efficiency for the step-and-repeat assembly process is 1.0, which is the highest efficiency for a step-and-repeat assembly process.

Figure 12:
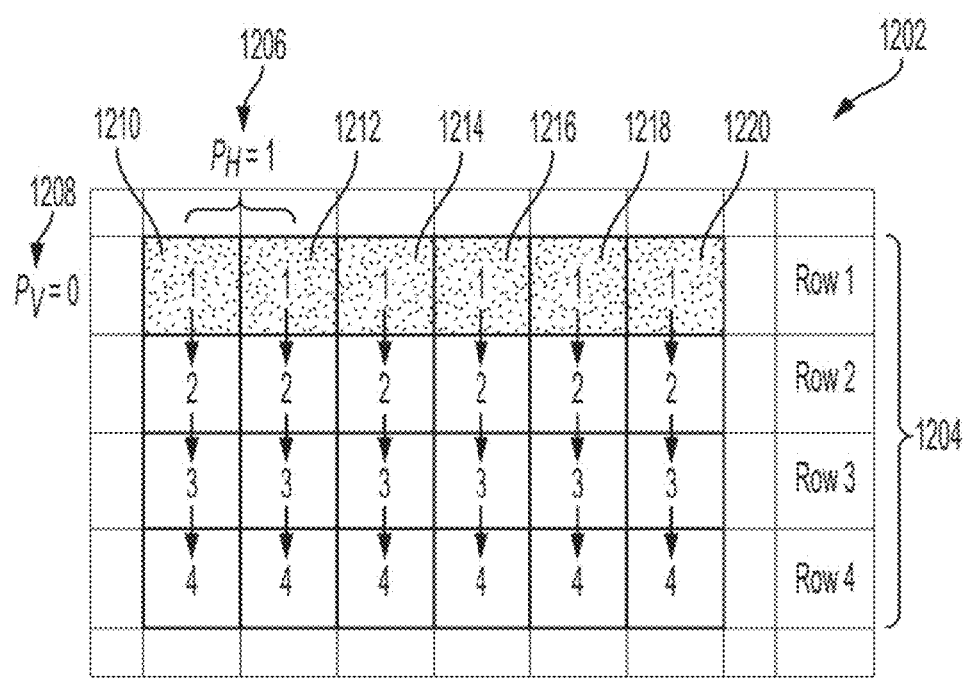
FIG. 12 is a planar view of an example plurality of module FOV regions on a planar working surface, from which to capture images by six individual optical modules in a staggered FOV stitching geometry using a step-and-repeat assembly process in which a horizontal pitch is one and a vertical pitch is zero.

FIG. 12 illustrates a fourth example plurality of module FOV regions in a working area on a planar working surface 1202, which is shown arranged in four rows 1204 by six columns from which to capture images by six individual LNCIMs 1210, 1212, 1214, 1216, 1218, 1220, in a staggered FOV stitching geometry using a step-and-repeat assembly process in which a horizontal pitch 1206 is one and a vertical pitch 1208 is zero.

As shown in FIG. 12, the six LNCIMs 1210, 1212, 1214, 1216, 1218, 1220, start in row number one and immediately capture a LNCIM-captured image at step position number 1, as shown. Then, these same modules move to step position number 2 in row number two and capture a LNCIM-captured image at step position number 2. The six individual LNCIMs 1210, 1212, 1214, 1216, 1218, 1220, all move in one synchronized group movement following the numbered step-and-repeat sequence 1 to 4, to capture images from the respective module FOV regions in the working area on the planar working surface 1202. The six LNCIMs 1210, 1212, 1214, 1216, 1218, 1220, step from row number one to row number two, to row number three, and to row number four.

A machine vision system arranges the captured LNCIM-captured images from the twelve LNCIMs moving together as one group in a side-by-side LNCIM-captured image assembly process. The system prepares the LNCIM-captured images for an adjacent image side-by-side stitching operation, possibly performing image processing on individual LNCIM-captured images. For example, the machine vision system might adjust image resolution for a LNCIM-captured image to meet certain image resolution requirements, such as to enable a microassembler system to detect, identify, and move micro-objects and/or microscale devices located on the planar working surface based on the micro-objects and/or microscale devices being detected and identified in the LNCIM-captured image. See the discussion above with reference to FIG. 8 for an example of image processing to adjust image resolution for a LNCIM-captured image which is stitched together with other LNCIM-captured images to form a working FOV image of a working area on a planar surface.

The above-described fourth example step-and-repeat capture of LNCIM-captured image and assembly process can be characterized by:

a working FOV region arranged in four rows and six columns of module FOV regions, where the six individual LNCIMs 1210, 1212, 1214, 1216, 1218, 1220, capture LNCIM-captured images of their respective module FOV regions according to:

a horizontal stagger pitch ($P_H$) of module FOV regions in the same row is one, a vertical stagger pitch ($P_V$) of module FOV regions in separate rows is zero, and n is a total number of rows which in this example is four, and s is the total number of steps, which in this example equals 4, and where the step-and-repeat assembly process achieves an efficiency of capturing LNCIM-captured images, and stitching adjacent LNCIM-captured images, based on the efficiency formula=number of rows divided by number of steps. =4/4. In this example, the efficiency for the step-and-repeat assembly process is 1.0, which is the highest efficiency for a step-and-repeat assembly process.

Figure 13:
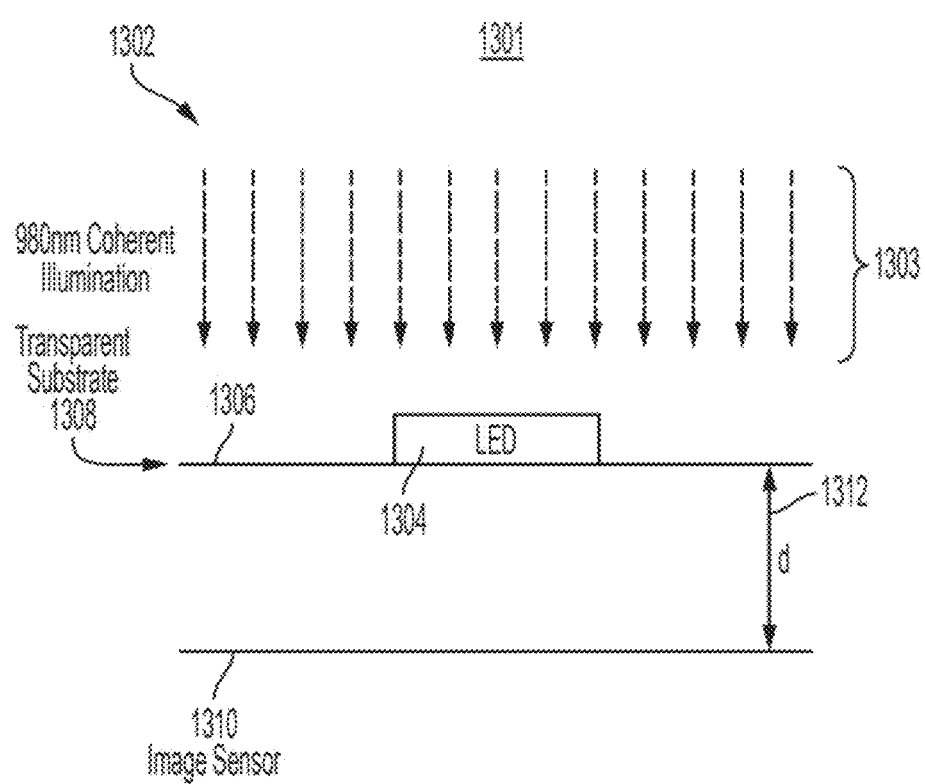
FIG. 13 is a side view of an example optical module including its respective image sensor located below and facing upward toward a transparent substrate on which is disposed a micro-LED on a working optical inspection region on a planar working surface of the transparent substrate.

FIG. 13 is a side view 1301 of an example lensless near-contact vision system architecture 1302. FIG. 13 shows a system architecture 1302 which will be referenced when viewing FIGS. 14 to 28. An image sensor 1310 is located proximate to and at a near-contact distance d 1312 from a planar working surface 1306 of a transparent substrate 1308. A micro-LED 1304 is disposed on the planar working surface 1306. In this example, coherent illumination light 1303 has a wavelength of approximately 980 nm plus or minus a tolerance of 20 nm. The coherent illumination light 1303 is directed downward toward the planar working surface 1308 on the transparent substrate 1306 and is incident on surfaces of the micro-LED 1304. As the coherent illumination light 1303 is incident on the micro-LED 1304 light signals scatter and are received by the image sensor 1310 of an LNCIM as a diffraction pattern.

FIGS. 14 to 28 illustrate a set of five examples of diffraction patterns created and captured by the image sensor 1310 in the system architecture 1302 while viewing the micro-LED 1304. The only parameter that changes is the near-contact distance d 1312, which is made progressively greater distance (doubling the distance) for each subsequent example.

Each example below is presented in two parts. The first part illustrates a diffraction pattern created by a 50 μm diameter circular opaque disk, which is representative of a micro-object on the planar working surface 1306. An irradiance chart shows the varying intensity of light signals in the diffraction pattern measured along a horizontal axis.

The second part illustrates a diffraction pattern created by a 50 μm×25 μm opaque rectangular LED on the planar working surface 1306. The diffraction pattern of the rectangular LED is first shown horizontally oriented on the planar working surface 1306 in a left-side-to-right-side orientation. The diffraction pattern of the rectangular LED is secondly shown horizontally oriented on the planar working surface 1306 at a 90-degree orientation relative to the orientation of the first diffraction pattern. Two irradiance charts show the varying intensity of light signals in the diffraction pattern measured along a first axis (left-side-to-right-side orientation) and along a second axis oriented at 90 degrees relative to the first axis. Besides the wavelength range of the coherent illumination light and the given near contact distance, each example also shows the approximate pixel spacing needed in the image sensor 1310 to be able to capture a high-resolution image of the diffraction pattern in the example.

Figure 14:
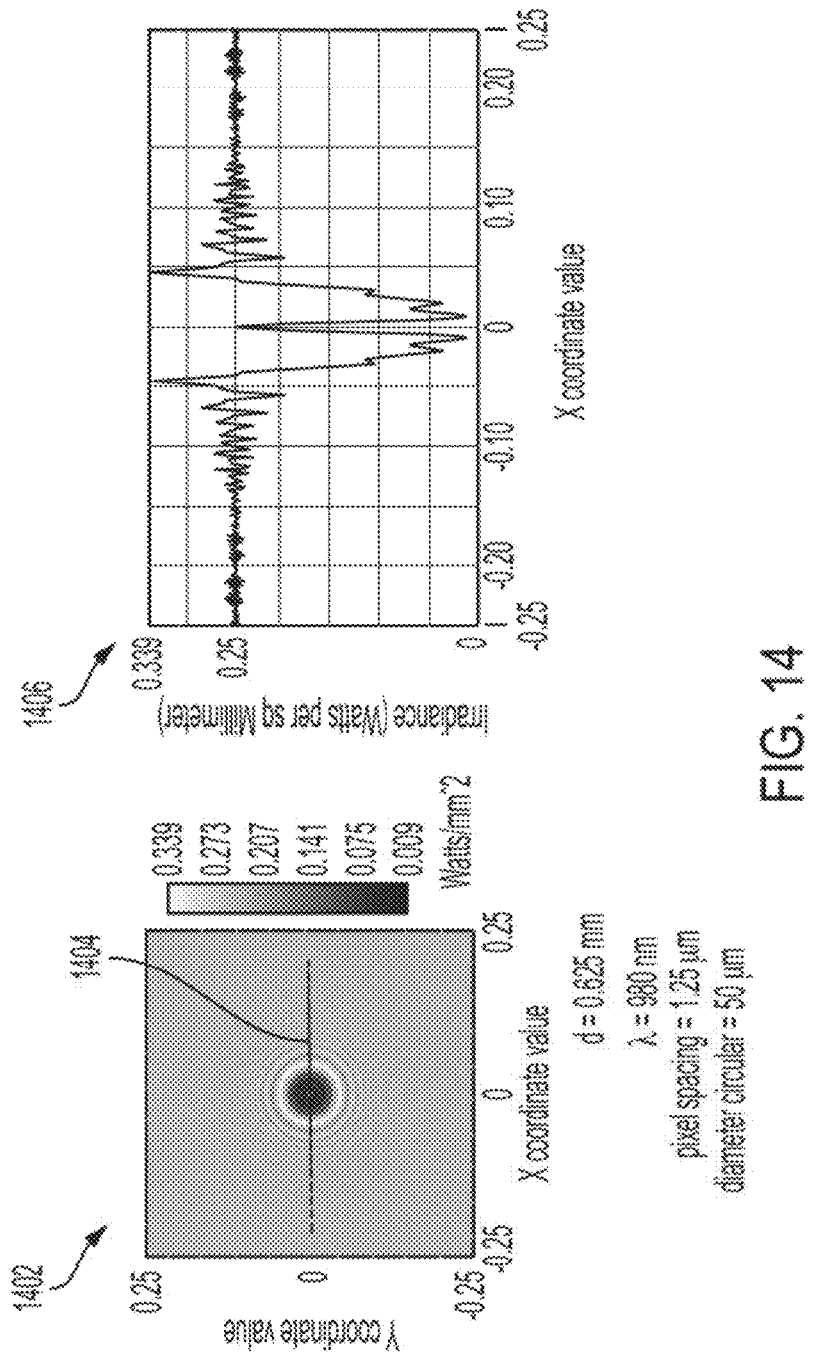
FIG. 14 is an illustration of an example captured image of a diffraction pattern of a circular shaped micro-object (e.g., micro-LED) disposed on a planar working surface, and a sample of the diffraction pattern taken along an axis is also shown as an irradiance pattern in an irradiance chart, wherein a coherent illumination light illuminating the micro-object has a wavelength of approximately 980 nm and the sensor proximity distance to the micro-object is approximately 0.625 mm.
Figure 15:
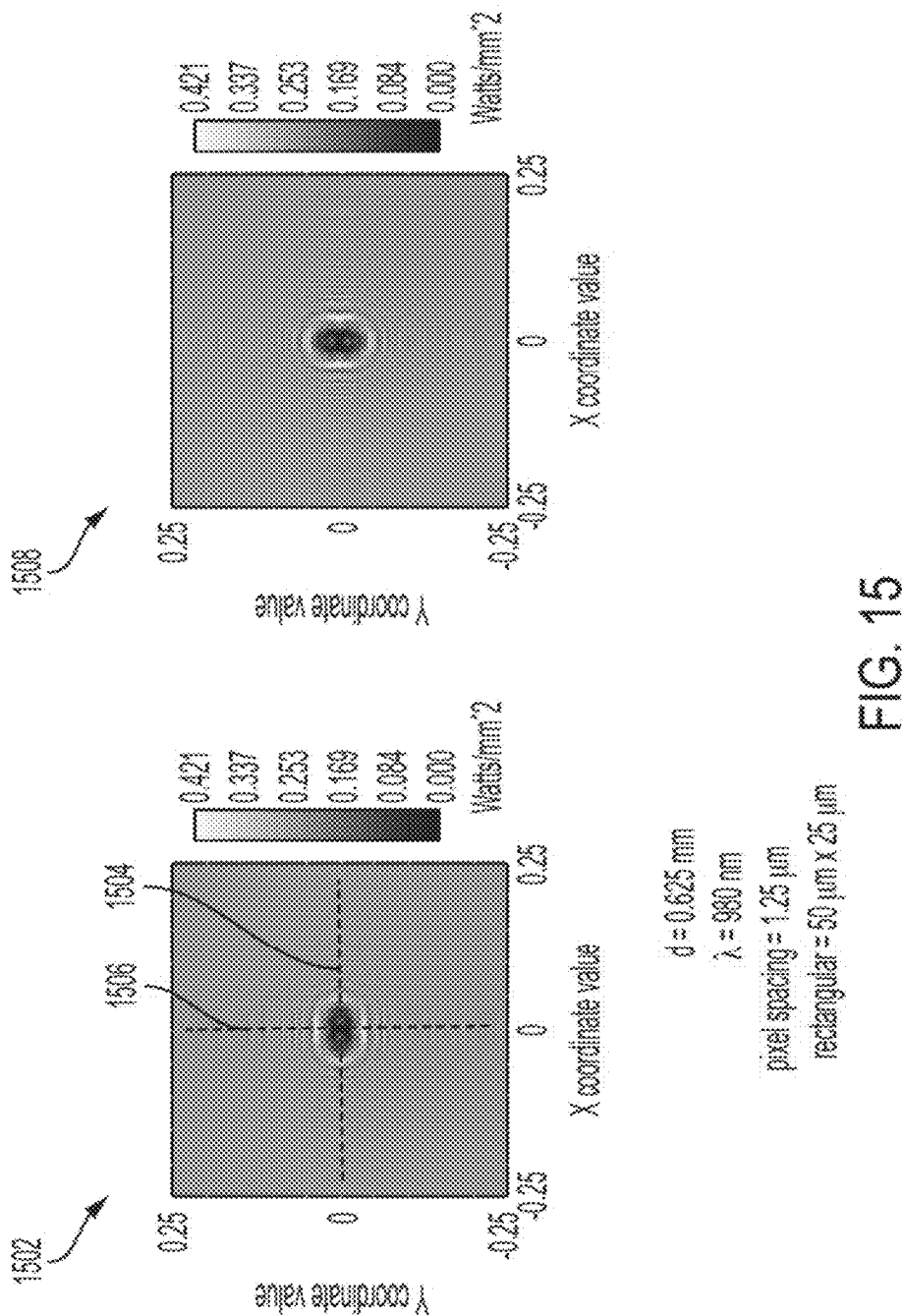
FIG. 15 is an illustration of an example captured image of a diffraction pattern of a rectangular shaped micro-object (e.g., micro-LED) disposed on a planar working surface, and also showing two orthogonal samples of the diffraction pattern taken along two orthogonal axes, wherein a coherent illumination light illuminating the micro-object has a wavelength of approximately 980 nm and the sensor proximity distance to the micro-object is approximately 0.625 mm.
Figure 16:
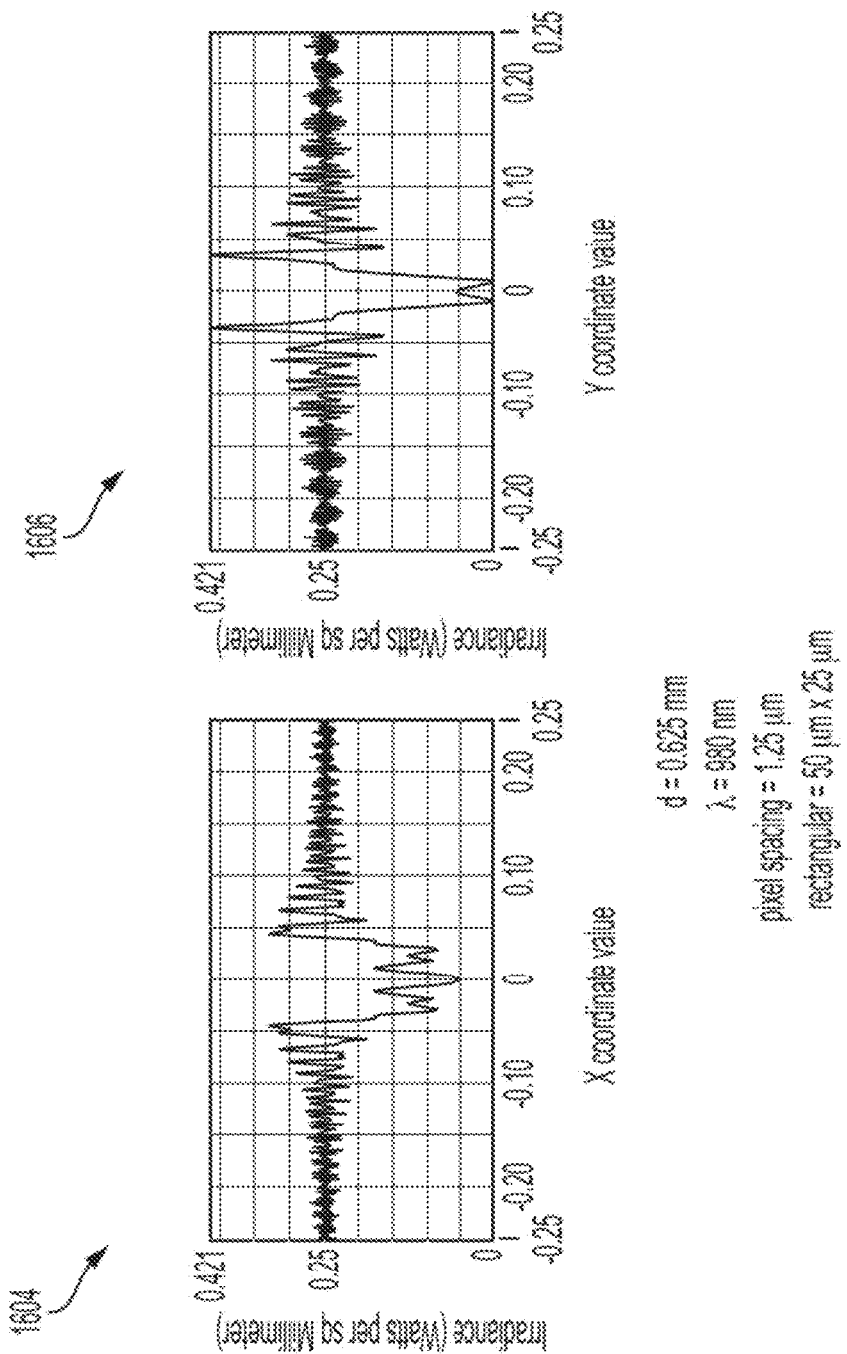
FIG. 16 is an illustration of two irradiance charts showing two irradiance patterns of the two orthogonal samples, taken along two orthogonal axes, of the example diffraction pattern shown in FIG. 15.

The first example is illustrated with FIGS. 14 to 16. The near-contact distance d is set to 0.625 mm. The approximate pixel spacing for the image sensor 1310 in this example is 1.25 μm.

In FIG. 14, the first part of the example shows the diffraction pattern 1402 on the left side of FIG. 14, and the irradiance chart 1406 is shown on the right side of FIG. 14, measured along axis 1404.

The second part of the example shows the diffraction pattern 1502 on the left side of FIG. 15. On the right side of FIG. 15 is shown a 90-degree orientation 1508 of the diffraction pattern 1502. FIG. 16 shows (on the left side) a first irradiance chart 1604 showing the varying intensity of light signals in the diffraction pattern 1502 measured along axis 1504 (left-side-to-right-side orientation) and a second irradiance chart 1606 showing the varying intensity of light signals in the diffraction pattern 1502 measured along axis 1506 (oriented at 90 degrees relative to the first axis).

Figure 17:
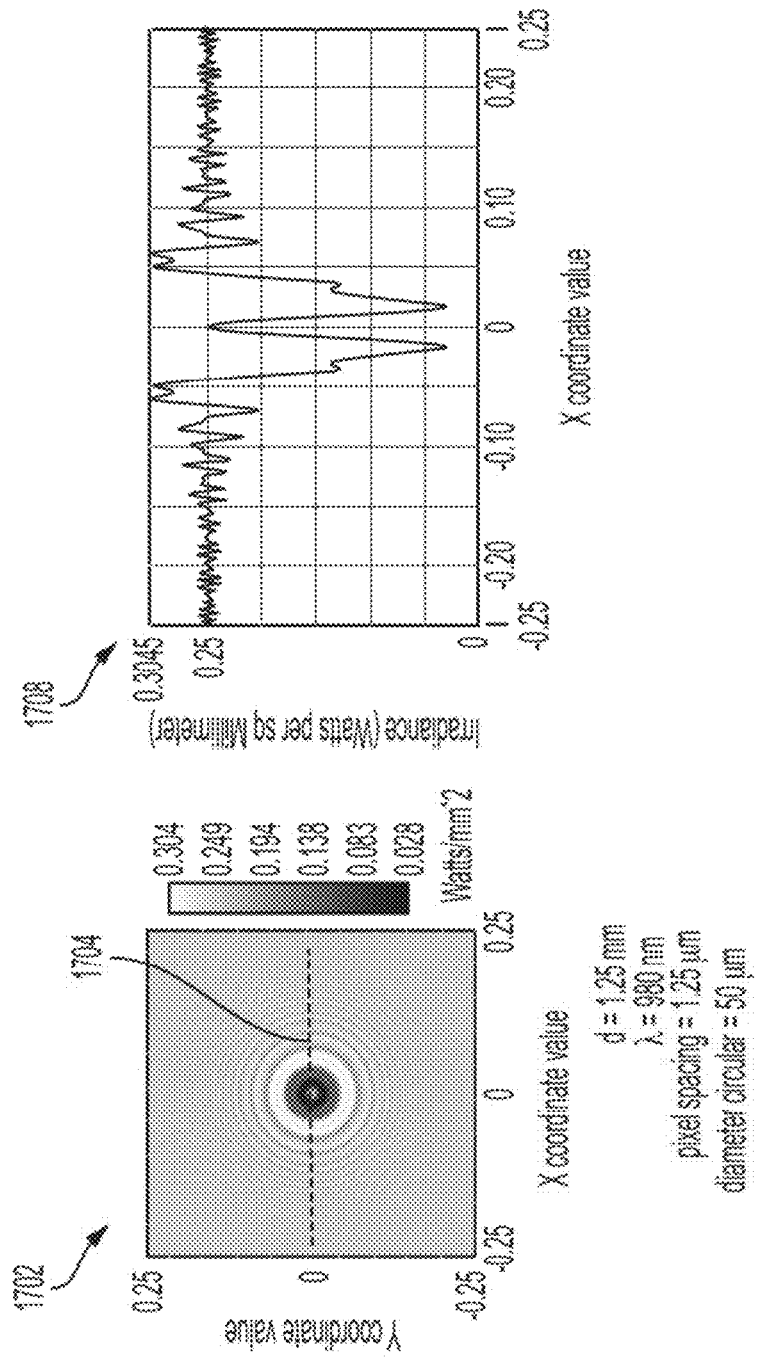
FIG. 17 is an example captured image of a diffraction pattern of a circular shaped micro-object (e.g., micro-LED) similar to FIG. 14, wherein a coherent illumination light illuminating the micro-object has a wavelength of approximately 980 nm and the sensor proximity distance to the micro-object is approximately 1.25 mm.
Figure 18:
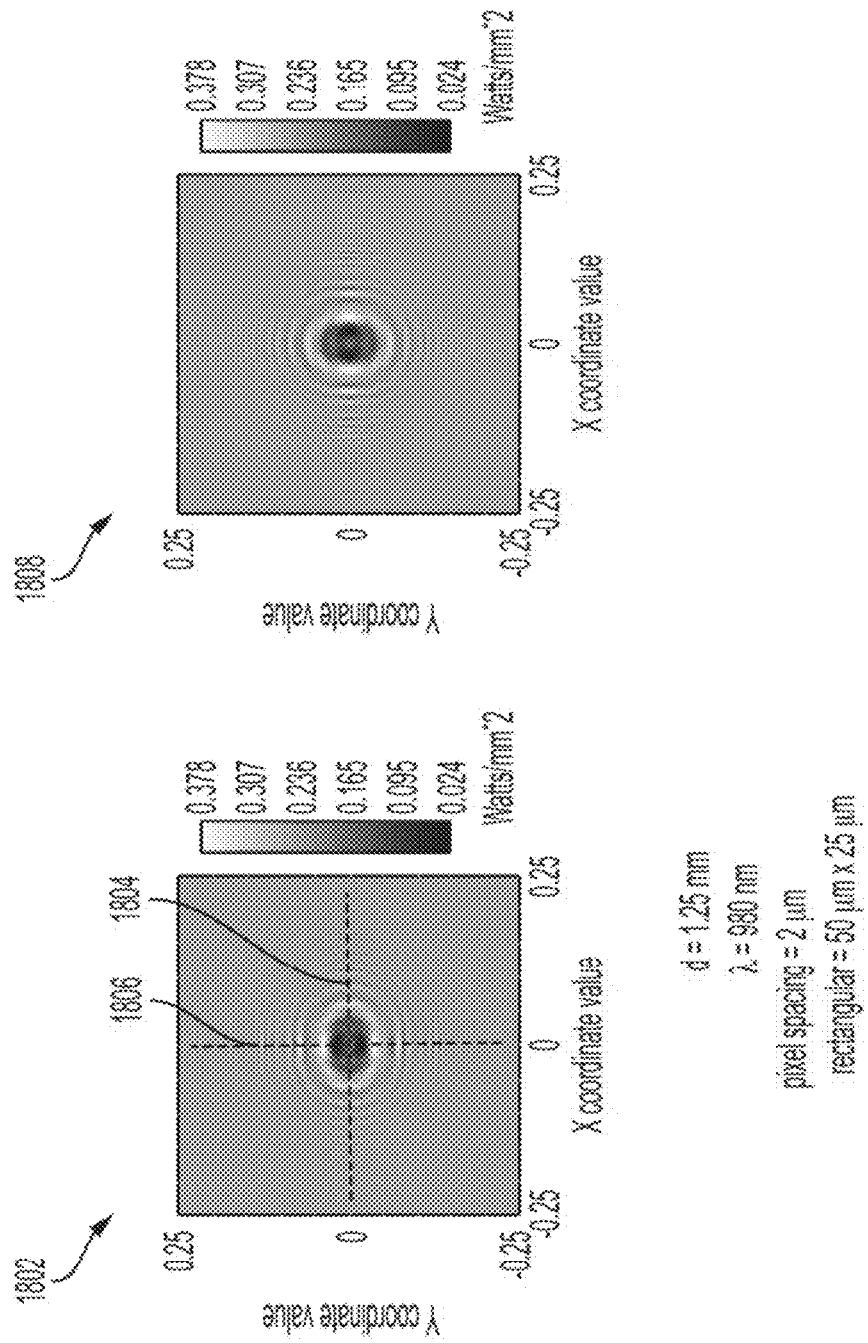
FIG. 18 is an example captured image of a diffraction pattern of a rectangular shaped micro-object (e.g., micro-LED) similar to FIG. 15, wherein a coherent illumination light illuminating the micro-object has a wavelength of approximately 980 nm and the sensor proximity distance to the micro-object is approximately 1.25 mm.
Figure 19:
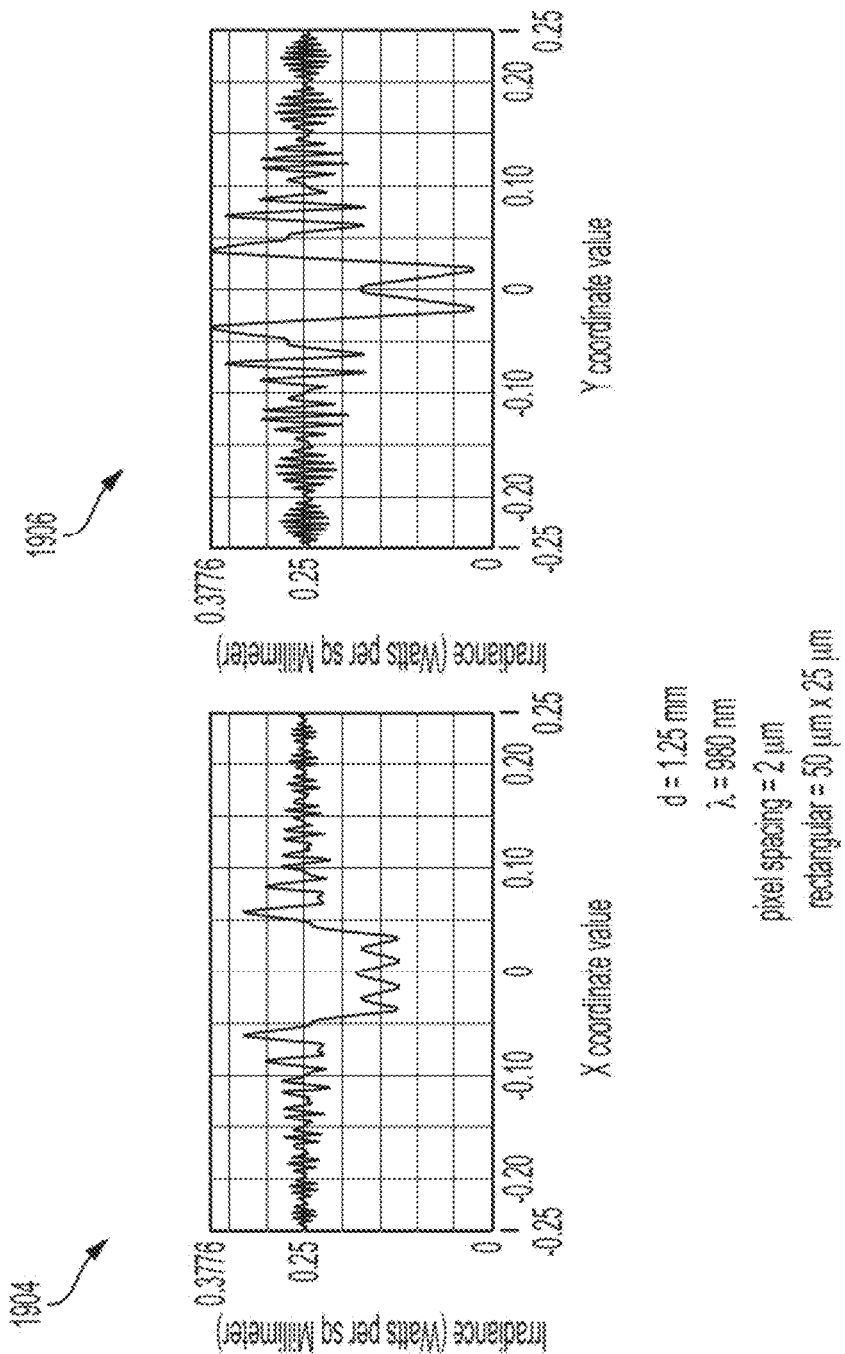
FIG. 19 is an illustration of two irradiance charts showing two irradiance patterns of the two orthogonal samples, taken along two orthogonal axes, of the example diffraction pattern shown in FIG. 18.

A second example is illustrated with FIGS. 17 to 19. The near-contact distance d is set to 1.25 mm. The approximate pixel spacing for the image sensor 1310 in this example is 2 μm.

In FIG. 17, the first part of the example shows the diffraction pattern 1702 on the left side of FIG. 17, and the irradiance chart 1708 is shown on the right side of FIG. 17, measured along axis 1704.

The second part of the example shows the diffraction pattern 1802 on the left side of FIG. 18. On the right side of FIG. 18 is shown a 90-degree orientation 1808 of the diffraction pattern 1802. FIG. 19 shows (on the left side) a first irradiance chart 1904 showing the varying intensity of light signals in the diffraction pattern 1802 measured along axis 1804 (left-side-to-right-side orientation) and a second irradiance chart 1906 showing the varying intensity of light signals in the diffraction pattern 1802 measured along axis 1806 (oriented at 90 degrees relative to the first axis).

Figure 20:
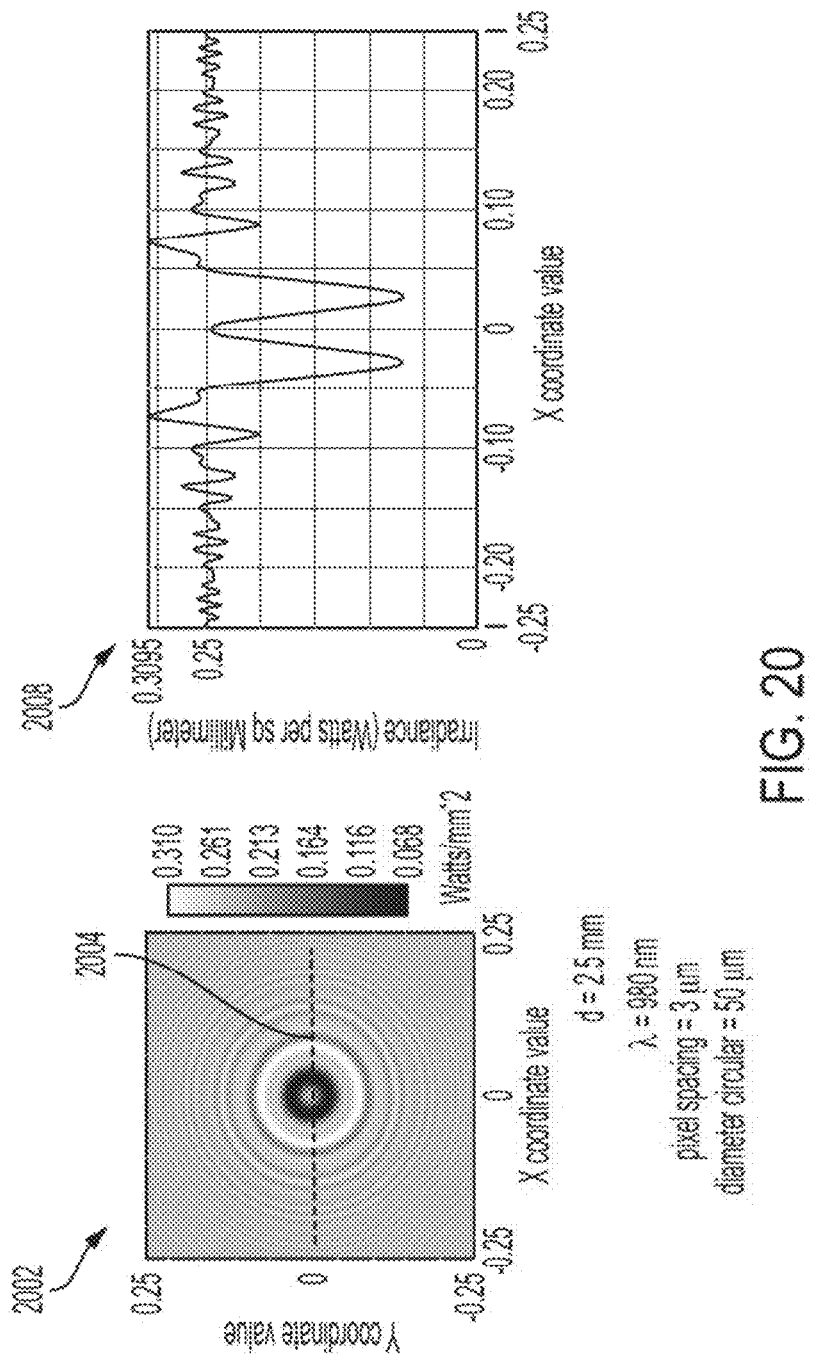
FIGS. 20, 21, and 22, are similar to FIGS. 17, 18, and 19, wherein a coherent illumination light illuminating the micro-object has a wavelength of approximately 980 nm and the sensor proximity distance to the micro-object is approximately 2.5 mm.
Figure 21:
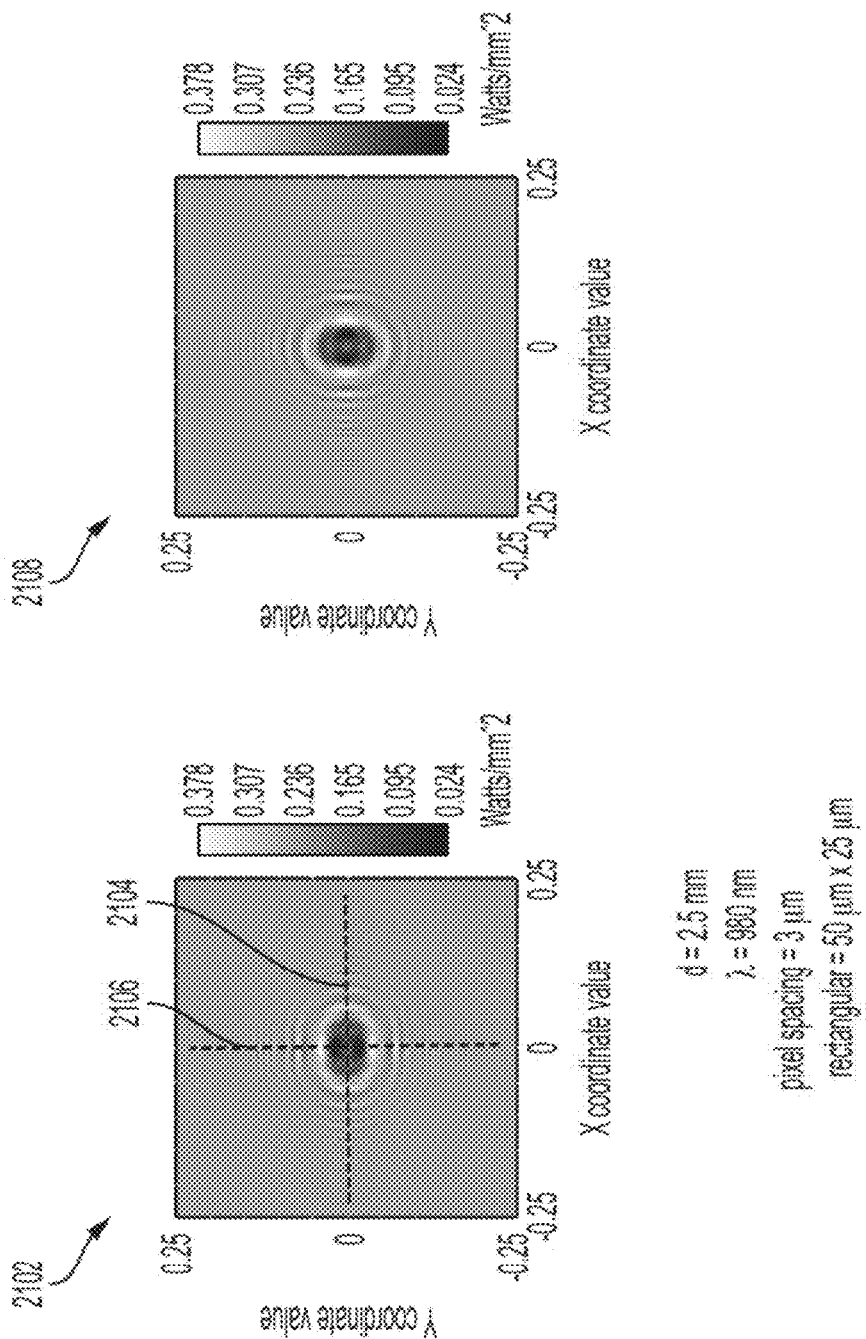
Figure 22:
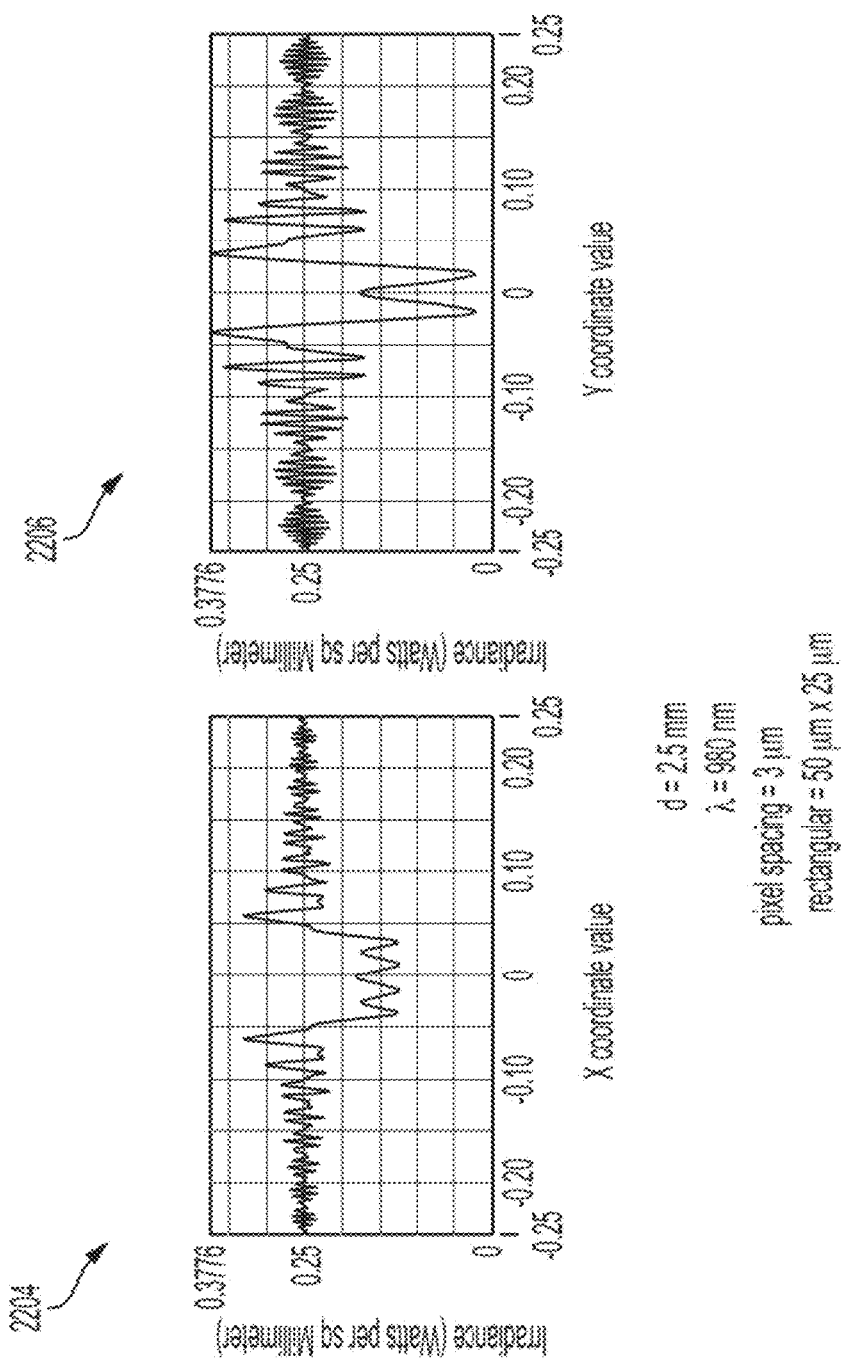

A third example is illustrated with FIGS. 20 to 22. The near-contact distance d is set to 2.5 mm. The approximate pixel spacing for the image sensor 1310 in this example is 3 μm.

In FIG. 20, the first part of the example shows the diffraction pattern 2002 on the left side of FIG. 20, and the irradiance chart 2008 is shown on the right side of FIG. 20, measured along axis 2004.

The second part of the example shows the diffraction pattern 2102 on the left side of FIG. 21. On the right side of FIG. 21 is shown a 90-degree orientation 2108 of the diffraction pattern 2102. FIG. 22 shows (on the left side) a first irradiance chart 2204 showing the varying intensity of light signals in the diffraction pattern 2102 measured along axis 2104 (left-side-to-right-side orientation) and a second irradiance chart 2206 showing the varying intensity of light signals in the diffraction pattern 2102 measured along axis 2106 (oriented at 90 degrees relative to the first axis).

Figure 23:
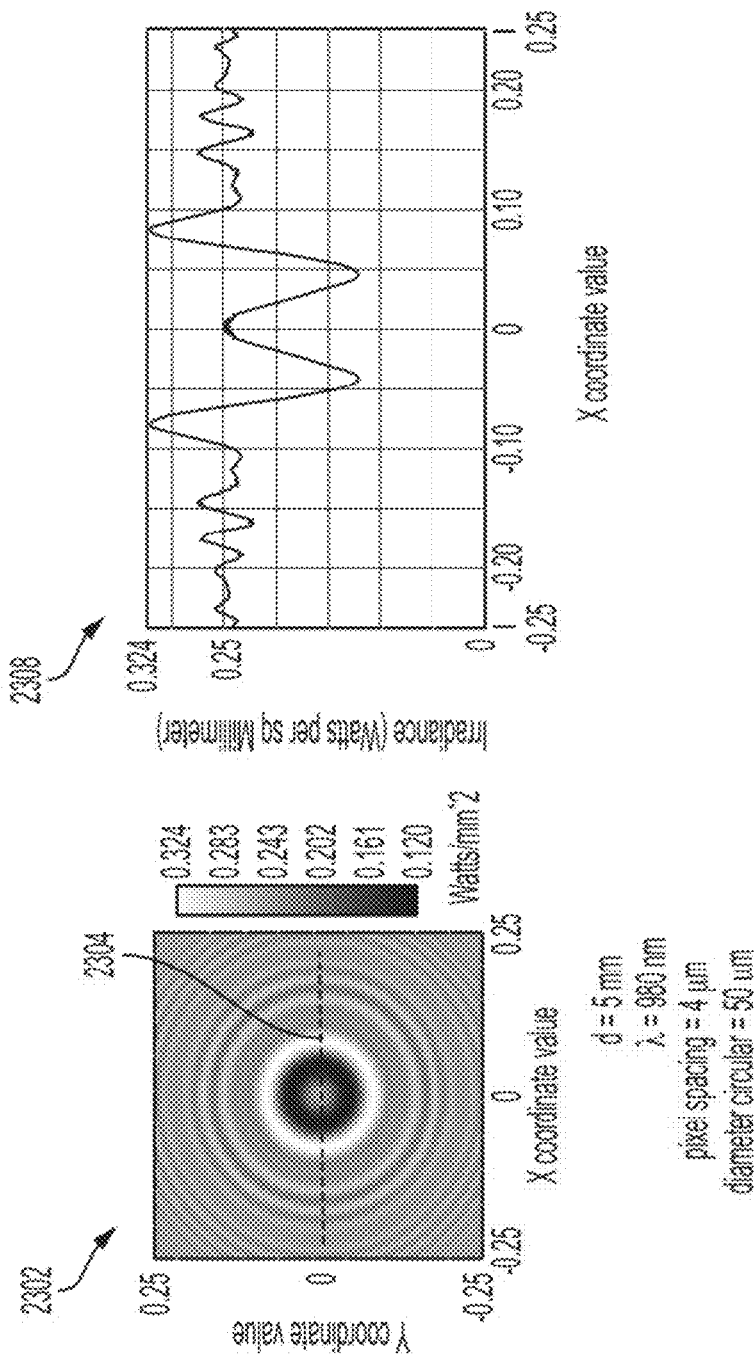
FIGS. 23, 24, and 25, are similar to FIGS. 17, 18, and 19, wherein a coherent illumination light illuminating the micro-object has a wavelength of approximately 980 nm and the sensor proximity distance to the micro-object is approximately 5 mm.
Figure 24:
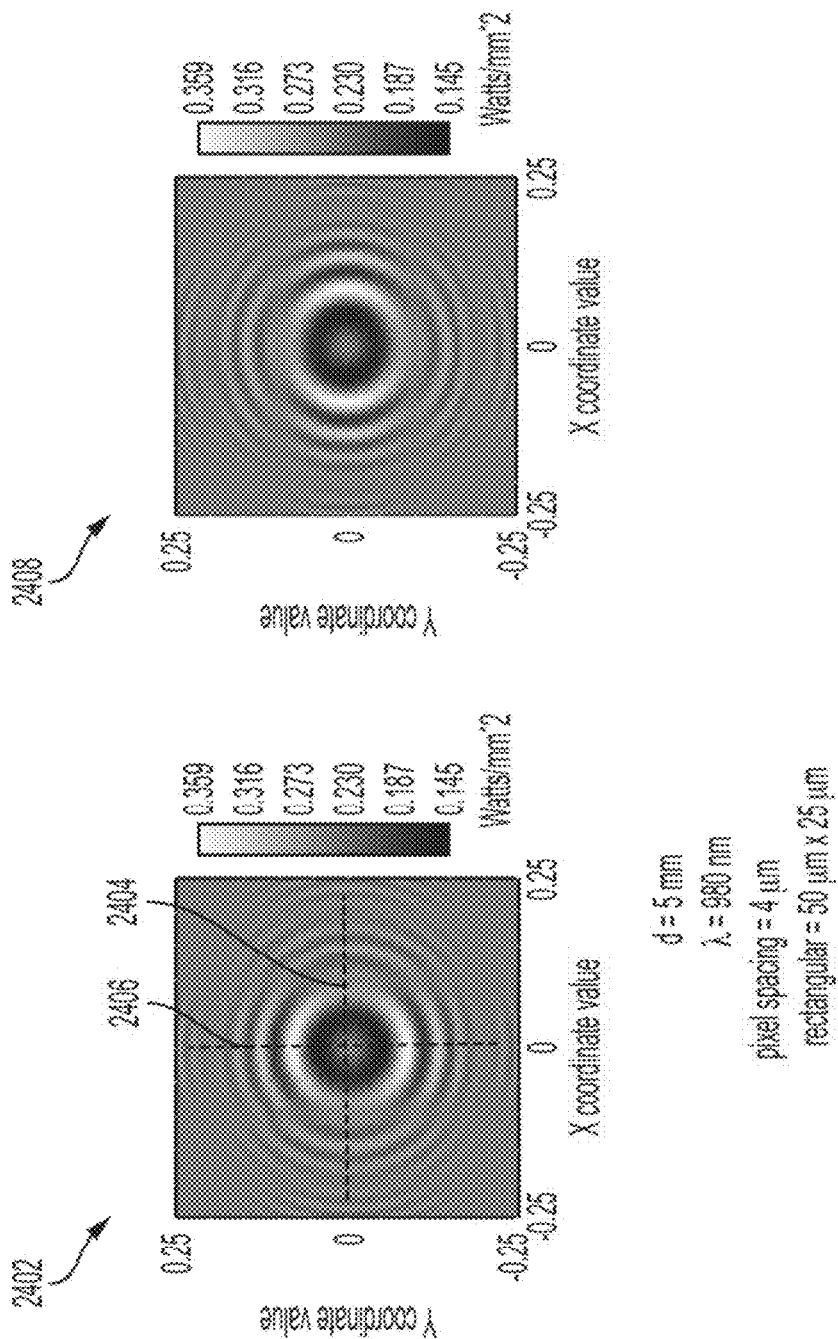
Figure 25:
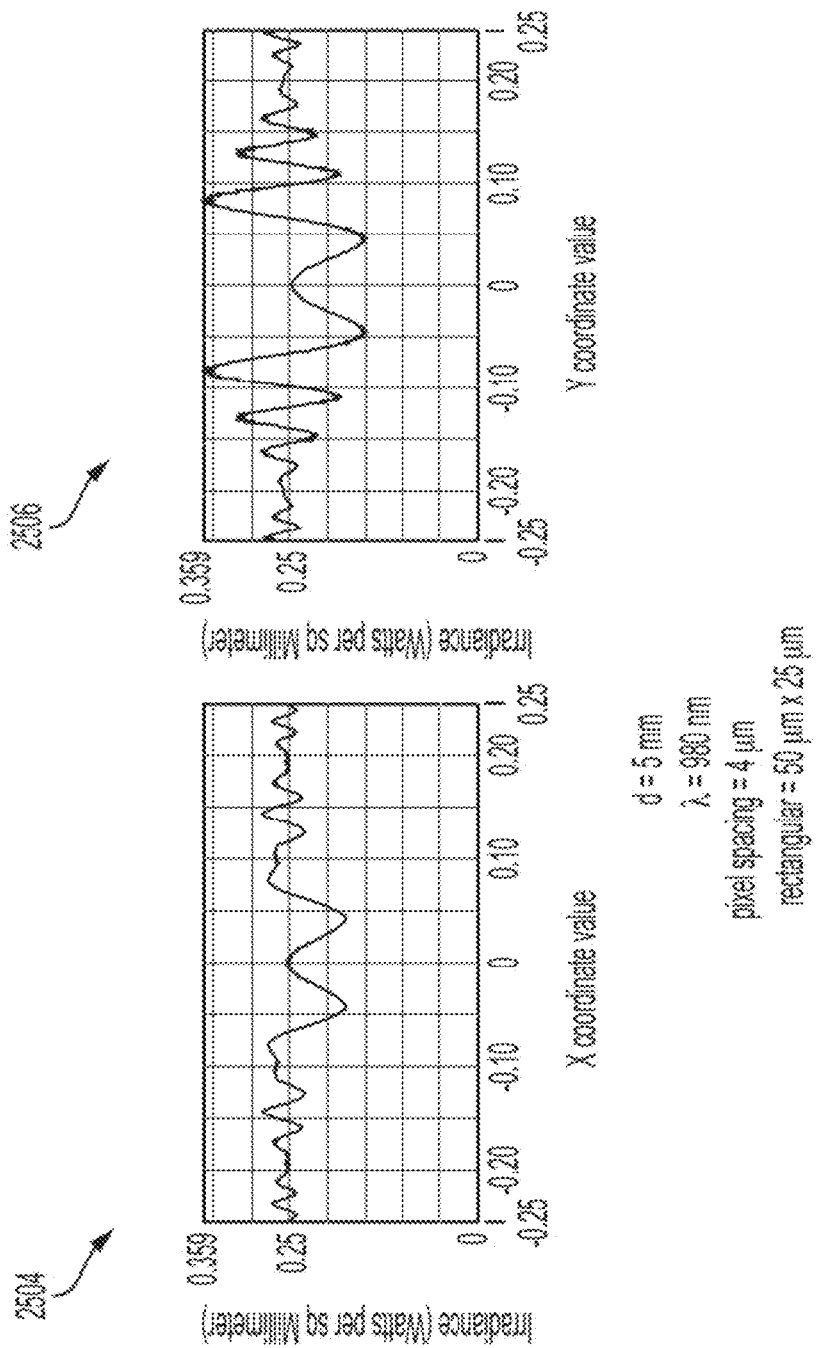

A fourth example is illustrated with FIGS. 23 to 25. The near-contact distance d is set to 5 mm. The approximate pixel spacing for the image sensor 1310 in this example is 4 μm. It should be noted that at a distance of 5 mm, for example, a diffraction pattern of the rectangular-shaped micro-LED 1304, as shown in FIG. 24, appears to have much fewer distinguishing features. Compare the diffraction pattern 2402 to the 90-degree orientation 2408 of the diffraction pattern 2402.

In FIG. 23, the first part of the example shows the diffraction pattern 2302 on the left side of FIG. 23, and the irradiance chart 2308 is shown on the right side of FIG. 23, measured along axis 2304.

The second part of the example shows the diffraction pattern 2402 on the left side of FIG. 24. On the right side of FIG. 24 is shown a 90-degree orientation 2408 of the diffraction pattern 2402. FIG. 25 shows (on the left side) a first irradiance chart 2504 showing the varying intensity of light signals in the diffraction pattern 2402 measured along axis 2404 (left-side-to-right-side orientation) and a second irradiance chart 2506 showing the varying intensity of light signals in the diffraction pattern 2402 measured along axis 2406 (oriented at 90 degrees relative to the first axis).

Figure 26:
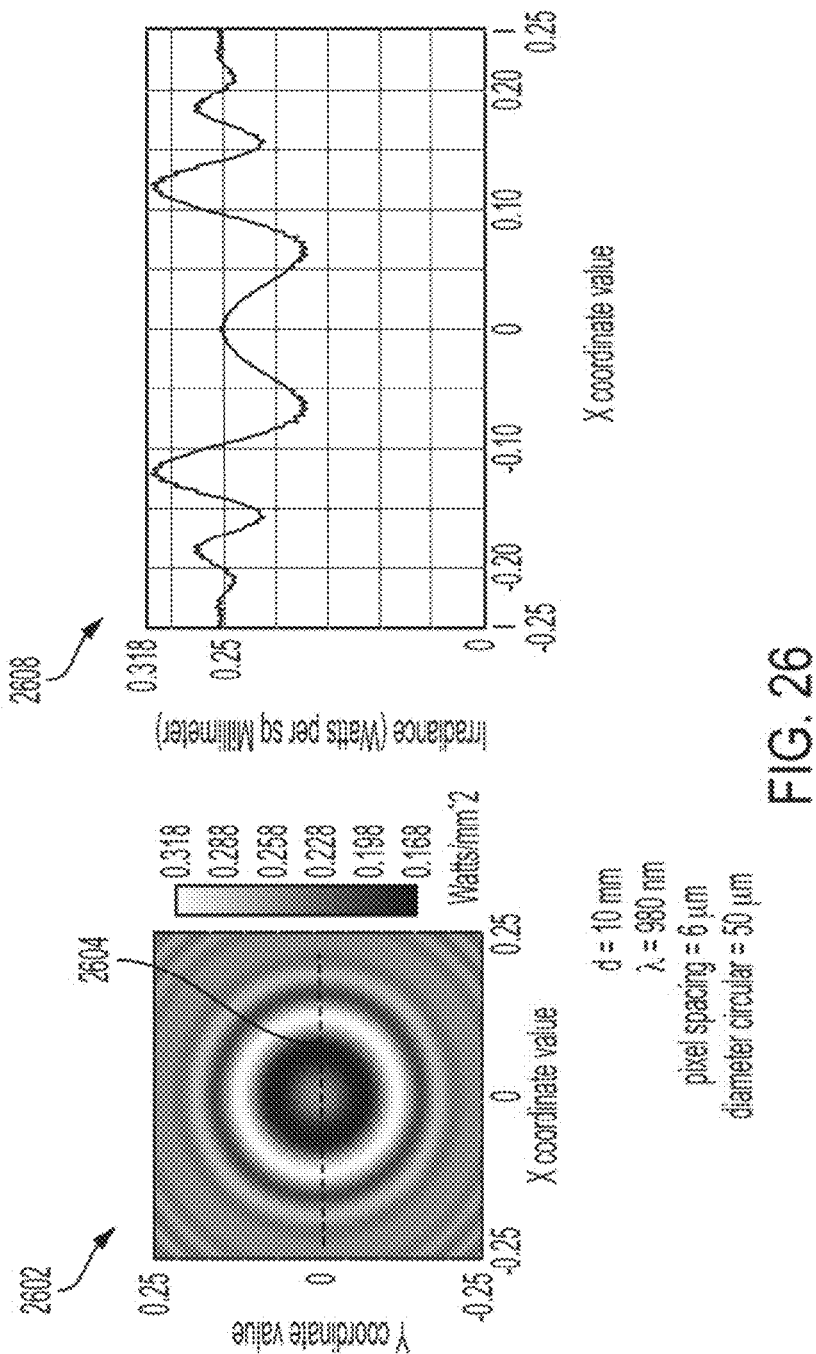
FIGS. 26, 27, and 28, are similar to FIGS. 17, 18, and 19, wherein a coherent illumination light illuminating the micro-object has a wavelength of approximately 980 nm and the sensor proximity distance to the micro-object is approximately 10 mm.
Figure 27:
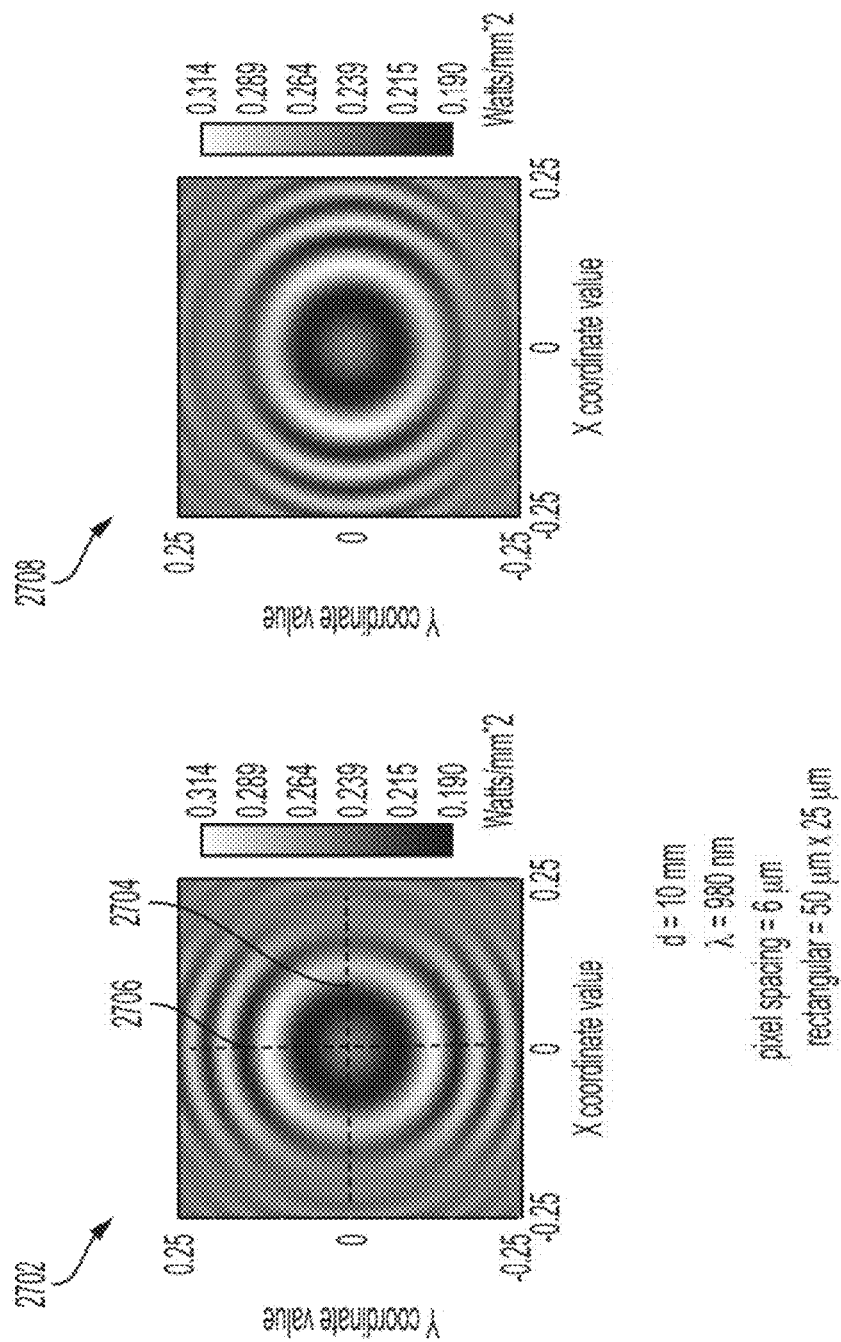
Figure 28:
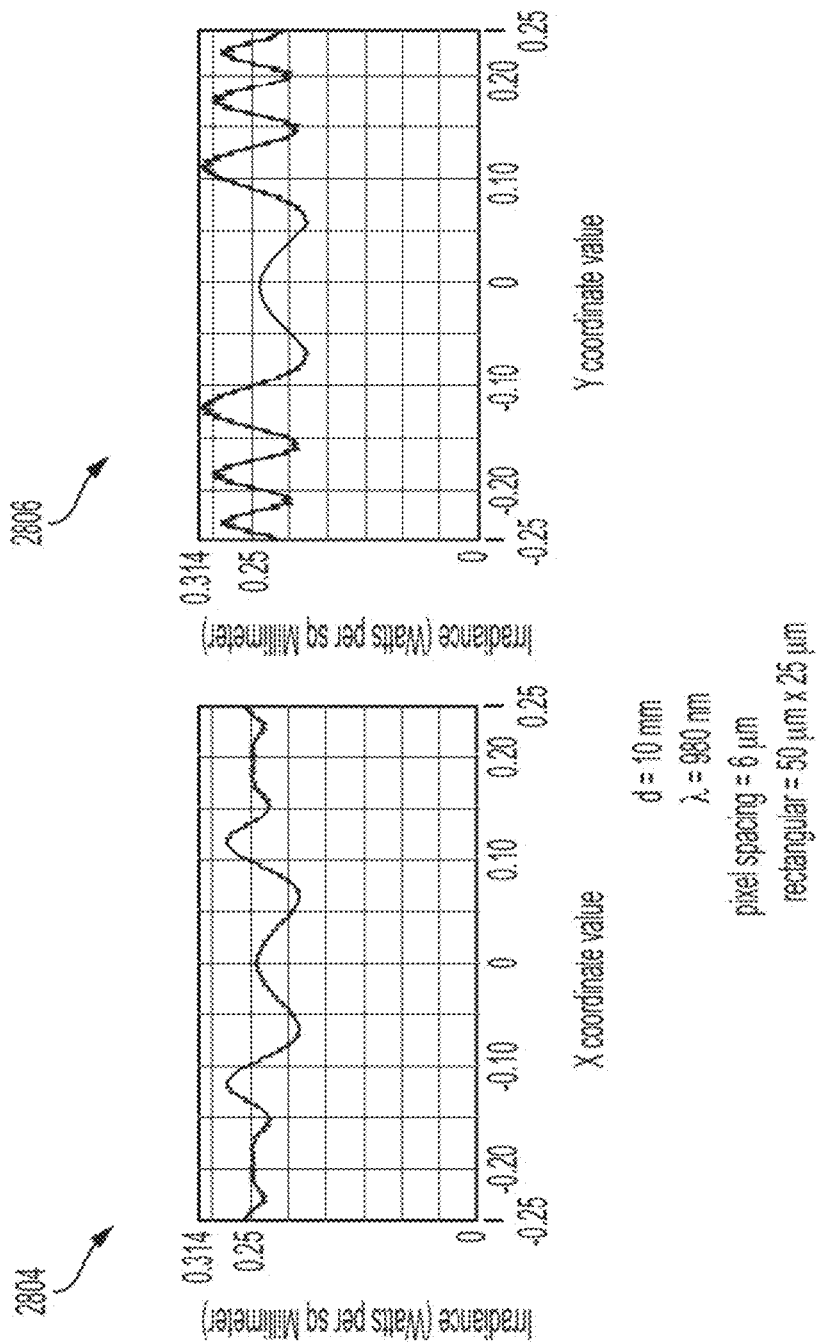

A fifth example is illustrated with FIGS. 26 to 28. The near-contact distance d is set to 10 mm. The approximate pixel spacing for the image sensor 1310 in this example is 6 μm. It should be noted that at a distance of 10 mm, in this example, a diffraction pattern of the rectangular-shaped micro-LED 1304, as shown in FIG. 27, appears to have very significantly fewer distinguishing features. Compare the diffraction pattern 2702 to the 90-degree orientation 2708 of the diffraction pattern 2702.

In FIG. 26, the first part of the example shows the diffraction pattern 2602 on the left side of FIG. 26, and the irradiance chart 2608 is shown on the right side of FIG. 26, measured along axis 2604.

The second part of the example shows the diffraction pattern 2702 on the left side of FIG. 27. On the right side of FIG. 27 is shown a 90-degree orientation 2708 of the diffraction pattern 2702. FIG. 28 shows (on the left side) a first irradiance chart 2804 showing the varying intensity of light signals in the diffraction pattern 2702 measured along axis 2704 (left-side-to-right-side orientation) and a second irradiance chart 2806 showing the varying intensity of light signals in the diffraction pattern 2702 measured along axis 2706 (oriented at 90 degrees relative to the first axis).

As can be seen from the five examples provided above, the smaller the near-contact distance d 1312 is selected, the more distinguishing features will be visible by a higher captured-image resolution (e.g., smaller pixel spacing).

Figure 29:
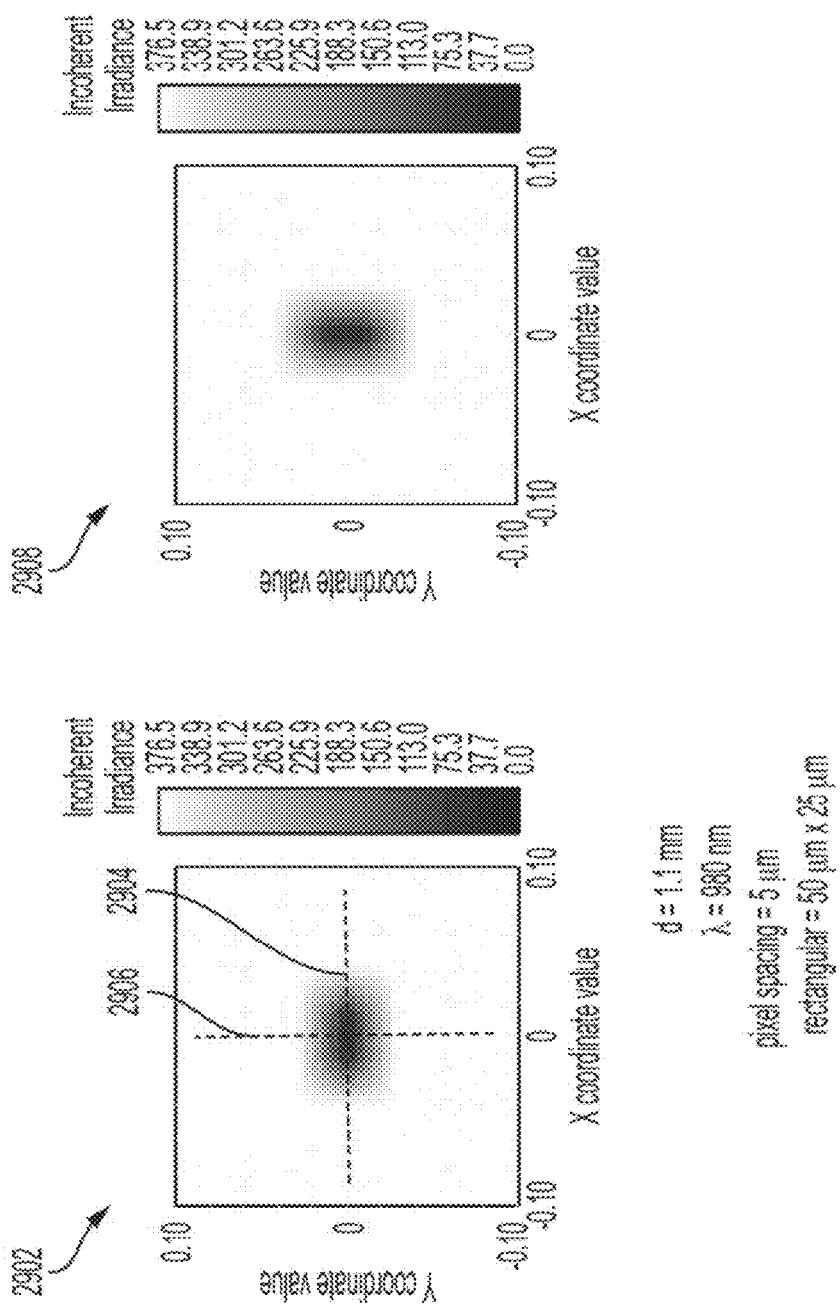
FIG. 29 is an illustration of an example captured image of a diffraction pattern of a rectangular shaped micro-object (e.g., micro-LED) disposed on a planar working surface, and also showing two orthogonal samples of the diffraction pattern taken along two orthogonal axes, wherein an incoherent illumination light illuminating the micro-object has a wavelength of approximately 980 nm and the sensor proximity (near-contact) distance to the micro-object is approximately 1.1 mm.
Figure 30:
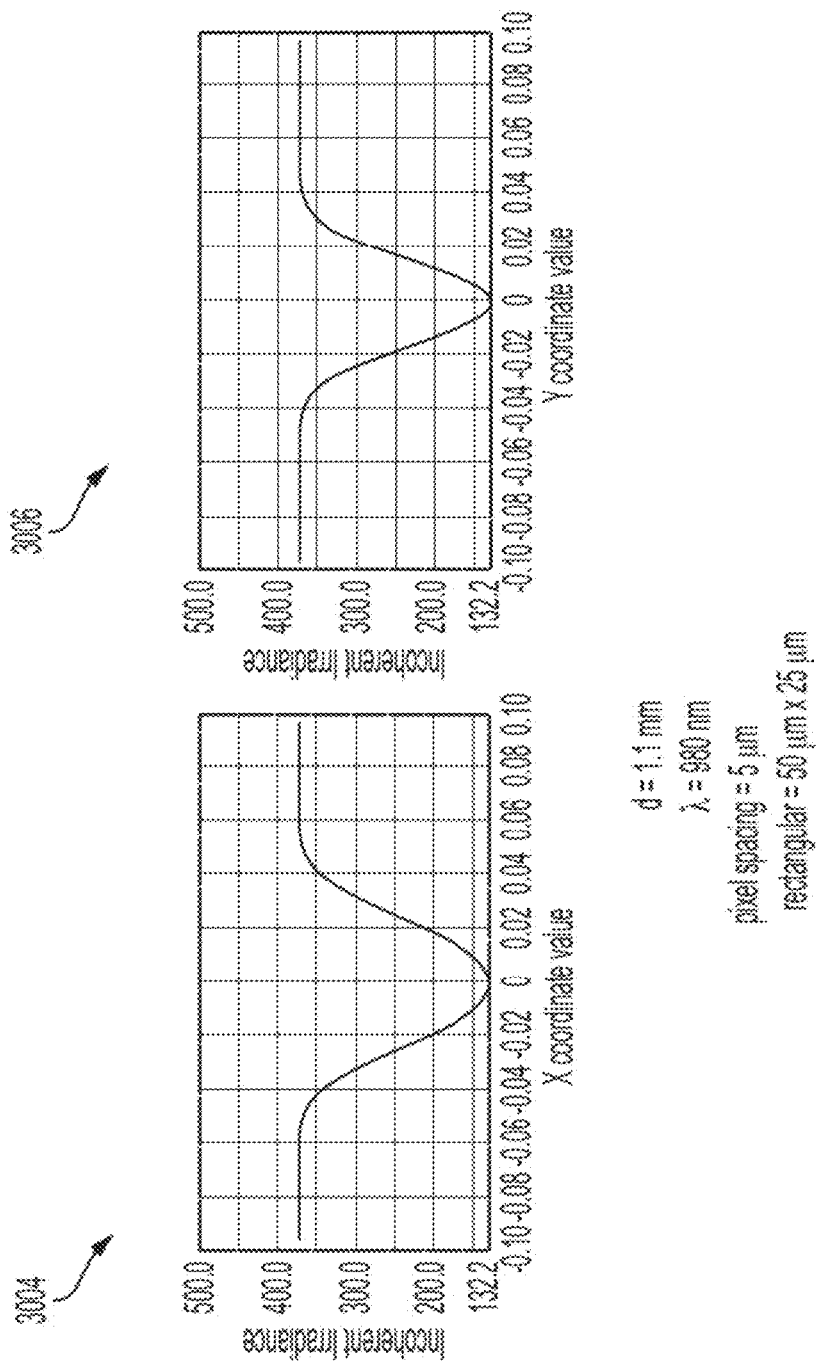
FIG. 30 is an illustration of two irradiance charts showing two irradiance patterns of the two orthogonal samples, taken along two orthogonal axes, of the example diffraction pattern shown in FIG. 29.

FIGS. 29 and 30 illustrate an example of shadow or near-contact patterns captured using incoherent illumination light 1303. For example, one or more LEDs (incoherent light source) can be used in an illumination light source optically coupled to the source optical train 306, which emits and directs incoherent illumination light 1303 downward toward the planar working surface 1306 on which is disposed a rectangular-shaped micro-LED 1304. The rectangular shape is 50 µm×25 µm, like the five examples above. The wavelength of the incoherent illumination light 1303 is approximately 980 nm and the near contact distance d is 1.1 mm. The pixel spacing in this example is 5 µm.

FIG. 29 shows the shadow or near-contact pattern 2902 on the left side of FIG. 29. On the right side of FIG. 29 is shown a 90-degree orientation 2908 of the shadow pattern 2902. FIG. 30 shows (on the left side) a first irradiance chart 3004 showing the varying intensity of light signals in the shadow pattern 2902 measured along axis 2904 (left-side-to-right-side orientation) and a second irradiance chart 3006 showing the varying intensity of light signals in the shadow pattern 2902 measured along axis 2906 (oriented at 90 degrees relative to the first axis).

As can be seen from the incoherent illumination light example provided above, by selecting a small enough near-contact distance d 1312 (e.g., 1.1 mm), sufficient distinguishing features will be visible and captured by the image sensor 1310 even with a pixel spacing of 5 µm. The captured-image resolution based on the pixel spacing of 5 µm can be sufficient to distinguish some features of the shadow pattern 2902. For example, grayscale image processing of a captured image can be used by the machine vision system to determine at least the location of a centroid of the micro-LED 1304. The location of the centroid coincides with the location of the micro-LED. As another example, super-resolution image processing of a captured image can be used by the machine vision system to increase the resolution of a low-resolution captured image. The machine vision system can perform image processing methods to determine identification, a horizontal orientation, and a vertical orientation of the micro-LED 1304 in the working area 102 on the planar working surface 1306. As discussed above, according to various embodiments, a machine vision system can use incoherent illumination light 1303 to illuminate the working area 102, capture images of shadow patterns of micro-objects and micro-scale devices such as micro-LEDs 1304 on the planar working surface 1306, and determine from the captured image a type of micro-object, a location of the micro-object, a horizontal orientation, and a vertical orientation of the micro-object.

Figure 31:
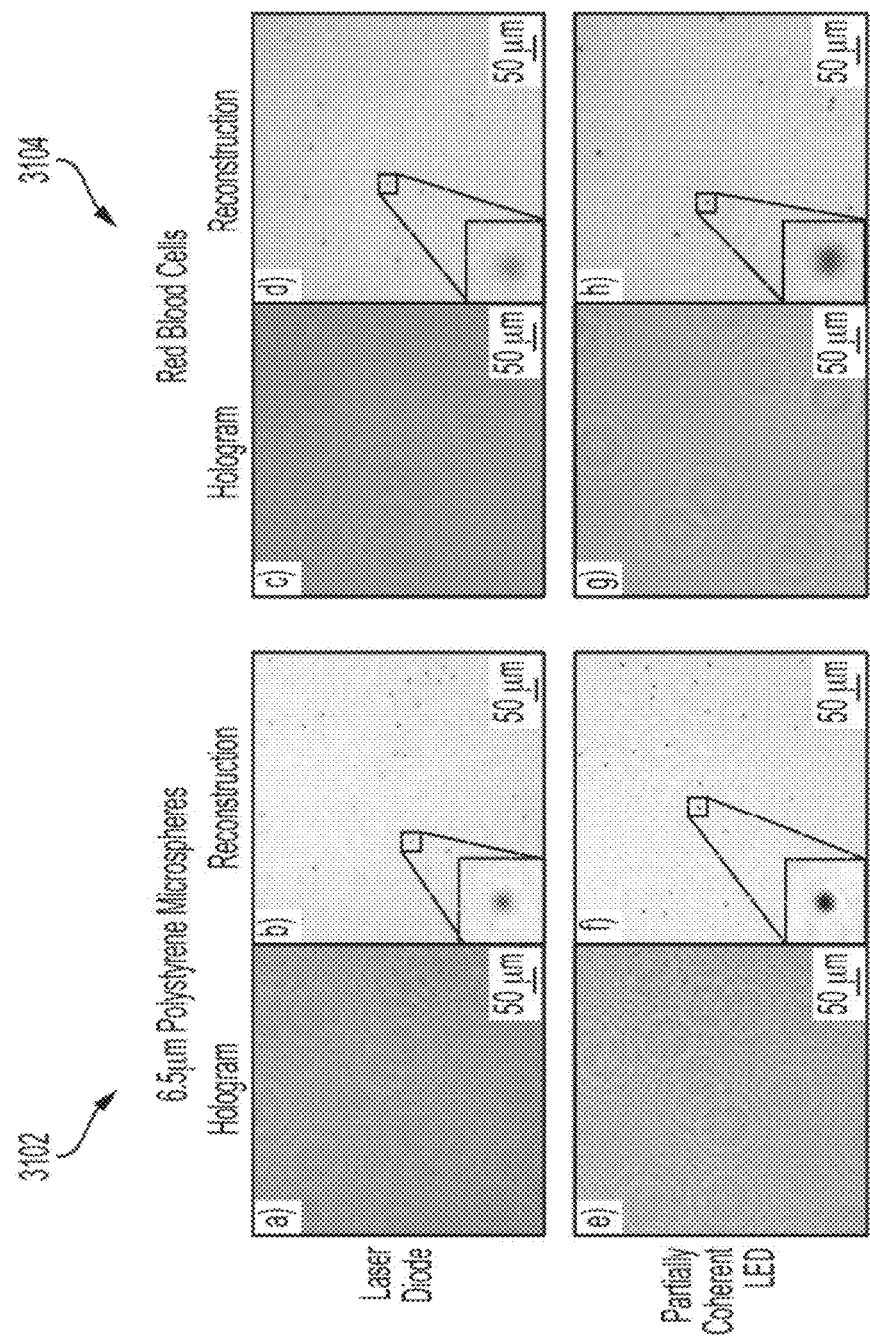
FIG. 31 is an illustration of two rows of captured images of diffraction patterns, in which the first row shows example captured images of diffraction patterns, of several micro-objects on a planar working surface, which are shown side-by-side with example reconstructed images of the respective captured images of the diffraction patterns, wherein a coherent illumination light source was used to illuminate the micro-objects; and the second row shows example captured images of diffraction patterns, of several micro-objects on a planar working surface, which are shown side-by-side with example reconstructed images of the respective captured images of the diffraction patterns, wherein a partially coherent illumination light source was used to illuminate the micro-objects.

FIG. 31 illustrates non-limiting examples of how coherent illumination lighting (e.g., using a laser diode) can be used, or alternatively how partially coherent illumination lighting (e.g., using one or more LEDs coupled with pinholes) can be used, to illuminate module FOV regions in a working area 102 and capture images (e.g., also referred to as holograms) containing diffraction patterns of micro-objects. With the captured images (e.g., holograms), the machine vision system can use image processing methods and techniques (e.g., coherent diffraction imaging) to reconstruct, from the captured images containing the diffraction patterns, real space images of the micro-objects as would be seen by the human eye.

For example, a technique called coherent diffraction imaging (CDI) converts captured images containing diffraction patterns of micro-objects in reciprocal space, into real space images showing the micro-objects as would be seen by the human eye. In CDI the coherent light beam scatters and creates diffraction patterns from a sample which are captured in captured images. Then, using computational algorithms and software a modulus of Fourier transform is measured in the captured images. Thirdly, additional computation algorithms and software are used to retrieve phase information of the captured images which are in reciprocal space. That is, the captured images of diffraction patterns of micro-objects provide only the diffraction patterns and the intensities of light signals (e.g., irradiance levels) in the diffraction patterns in the captured images. The phase information is missing in the captured images in reciprocal space. Applying a simple Fourier transform to information in the captured images, which include only intensities of light signals and the diffraction patterns, is not enough for creating images of micro-objects in real space from the diffraction patterns in captured images in reciprocal space. Iterative computational algorithms can be used to retrieve the phase information. Thereafter, an inverse Fourier transform can be applied to the combined information including the phase information of the diffraction patterns in a captured image, which thereby can recover from the captured image an image showing the micro-objects in real space as would be seen by a human eye.

The first row in FIG. 31 corresponds to coherent illumination lighting of the micro-objects. The second row in FIG. 31 corresponds to partially coherent illumination lighting of micro-objects. The two types of illumination can be used to capture diffraction patterns of micro-objects and to algorithmically reconstruct from the captured image a reconstructed image showing the micro-objects in real space as would be seen by a human eye.

Additionally, the left-side set of images 3102 in FIG. 31 shows the holograms and the reconstructed images of 6.5-micrometer micro-objects (e.g., polystyrene microspheres). The right-side set of images 3104 in FIG. 31 show, for comparison, the holograms and the reconstructed images of red blood cells.

Figure 32:
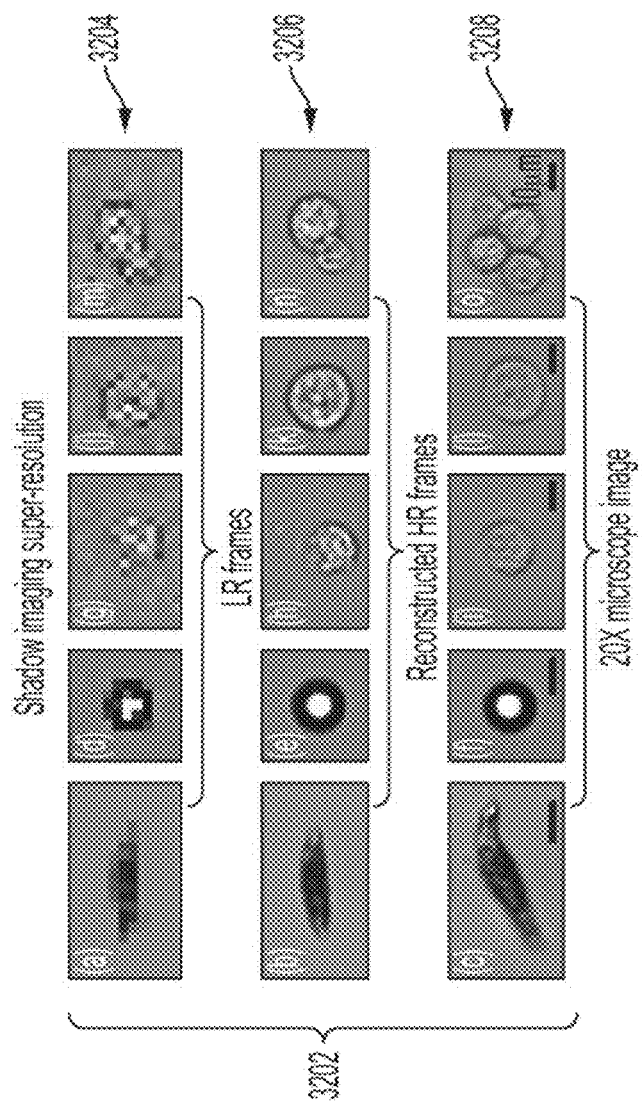
FIG. 32 illustrates an example of super-resolution image processing suitable for use in an example machine vision system of the present disclosure.
Figure 33:
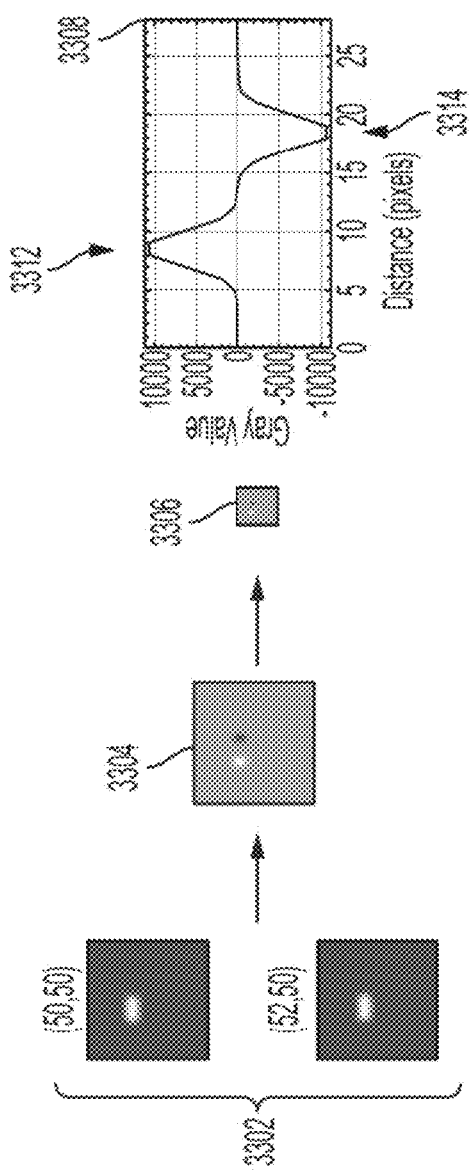
FIG. 33 illustrates an example of grayscale image processing suitable for use in an example machine vision system of the present disclosure.

With reference to FIGS. 32 and 33, certain examples of the disclosure increase the space-bandwidth product beyond conventional imaging systems by using various optical and image processing methods and techniques to increase the effective resolution over the large overall machine vision system working field-of-view of the planar working surface. The effective resolution of the overall FOV of the machine vision system can be further improved by using image processing tools such as grayscale imaging, super-resolution imaging, or a combination thereof.

FIG. 32 shows an example of super-resolution image processing 3202 for use in an example machine vision system to identify micro-objects and/or micro-scale devices in a FOV working FOV area. The machine vision system, for example, can perform super-resolution imaging on sets of sub-pixels in an LNCIM-captured image 3204 to produce a higher resolution image 3206, 3208, of the LNCIM-captured image 3204. This higher resolution image enables the machine visions system to identify and locate the micro-objects and/or micro-scale devices in the working area on the planar surface. This LNCIM-captured image-based information (image data) is provided to a microassembler system, for example, to adjust the position of at least one micro-object on a planar working surface in a micro-assembly process. The process of adjusting the position of the at least one micro-object includes at least one of the following operations: performing fine alignment of at least one micro-object detected and identified in the captured image corresponding to a physical position on the planar working surface in a micro-assembly process; performing alignment verification of at least one micro-object on the planar working surface in a micro-assembly process; or performing right-side-up verification of at least one micro-object on the planar working surface in a micro-assembly process.

A standard super-resolution method involves capturing several to many low-resolution images where each image is shifted in sub-pixel increments. These images can be produced, for example and not for limitation, by using a pixel-shifting method to capture sequential images that are moved in sub-pixel increments. Another method involves sequentially capturing images as the object moves or flows. These sub-pixel shifted low-resolution images are combined to produce a computationally re-constructed single high-resolution image.

FIG. 33 shows an example of grayscale image processing for use in an example machine vision system. The grayscale image processing 3302, 3304, 3306, detects a centroid of each of at least one micro-object in an LNCIM-captured image 3302 and provides the image information 3308, 3312, 3314, to a microassembler system to, for example, adjust the position of at least one micro-object on a planar working surface in a micro-assembly process. The process of adjusting the position of the at least one micro-object can include rotation of the micro-object on the planar working surface in the micro-assembly process. The process of adjusting the position of the at least one micro-object can include performing rough alignment of a plurality of micro-objects to each other in the micro-assembly process. Processing of grayscale images involves standard techniques like image subtraction, thresholding, binarization, edge detection and sharpening, etc., to extract and isolate object features, separate low-resolution images of overlapped or adjacent objects, identify object centroid positions, etc.

Figure 36:
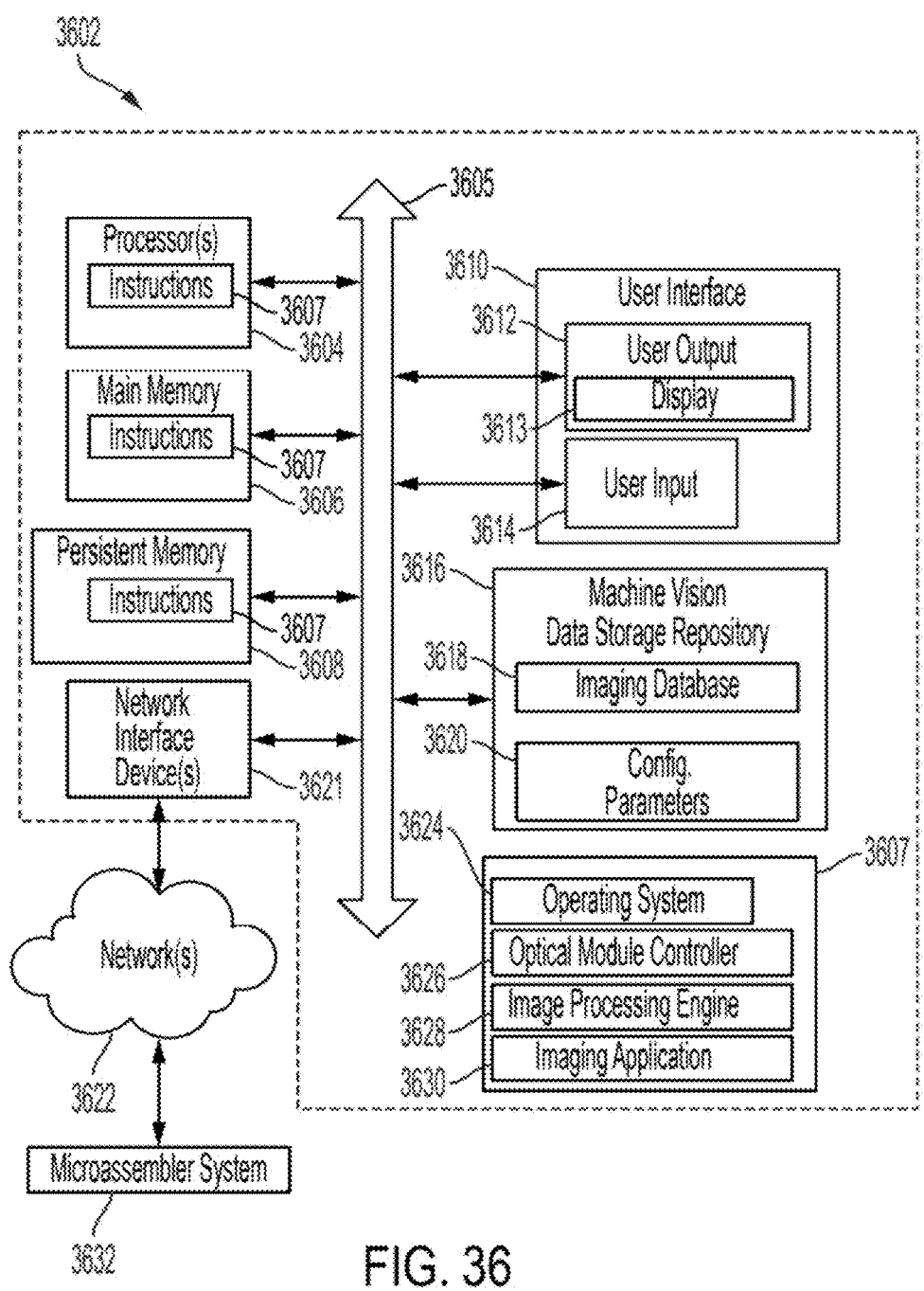
FIG. 36 is a system block diagram illustrating an example machine vision system suitable for use with a microassembler system, according to an example of the present disclosure.

Example of a Machine Vision System Including a Processing System Operating in a Network FIG. 36 illustrates an example of a processing system 3602 (also referred to as a computer system) suitable for use to perform the example methods discussed herein in a machine vision system communicatively coupled with a microassembler system, according to an example of the present disclosure. The processing system 3602 according to the example is communicatively coupled with a communication network 3622 which can comprise a plurality of networks. This simplified example is not intended to suggest any limitation as to the scope of use or function of various example embodiments of the invention described herein.

The example processing system 3602 comprises a computer system/server, which is operational with numerous other general purpose or special purpose computing system environments or configurations. Examples of well-known computing systems, environments, and/or configurations that may be suitable for use with such a computer system/server include, but are not limited to, personal computer systems, server computer systems, thin clients, thick clients, hand-held or laptop devices, multiprocessor systems, microprocessor-based systems, and distributed cloud computing environments that include any of the above systems and/or devices, and the like.

The processing system 3602 may be described in a general context of computer system executable instructions, such as program modules, being executed by a computer system. Generally, program modules may include methods, functions, routines, programs, objects, components, logic, data structures, and so on that perform particular tasks or implement particular abstract data types. A processing system 3602, according to various embodiments, may be practiced in distributed networking environments where tasks are performed by remote processing devices that are linked through a communications network.

Referring more particularly to FIG. 36, the following discussion will describe a more detailed view of an example processing system 3602. According to the example, at least one processor 3604 is communicatively coupled with system main memory 3606 and persistent memory 3608.

A bus architecture 3605 facilitates communicative coupling between the at least one processor 3604 and the various component elements of the processing system 3602. The bus architecture 3605 represents one or more of any of several types of bus structures, including a memory bus, a peripheral bus, an accelerated graphics port, and a processor bus or local bus using any of a variety of bus architectures.

The system main memory 3606, in one example, can include computer system readable media in the form of volatile memory, such as random access memory (RAM) and/or cache memory. By way of example only, a persistent memory storage system 3608 can be provided for reading from and writing to any one or more of: a non-removable, non-volatile magnetic media (not shown and typically called a "hard drive"), or a solid-state drive (SSD) (also not shown), or both. In such instances, each persistent memory storage system 3608 can be connected to the bus architecture 3605 by one or more data media interfaces. As will be further depicted and described below, the at least one processor 3604, the main memory 3606, and the persistent memory 3608, may include a set (e.g., at least one) of program modules 3607 that can be configured to carry out functions and features of various embodiments of the invention.

A program/utility, having a set (at least one) of program modules, may be stored in persistent memory 3608 by way of example, and not limitation, as well as an operating system 3624, one or more application programs or applications 3630, other program modules, and program data. Each of the operating system 3624, one or more application programs 3630, other program modules, and program data, or some combination thereof, may include an implementation of interface software to a networking environment. Program modules generally may carry out the functions and/or methodologies of various embodiments of the invention as described herein.

The at least one processor 3604 is communicatively coupled with one or more network interface devices 3621 via the bus architecture 3605. The network interface device 3621 is communicatively coupled, according to various embodiments, with one or more networks 3622. The network interface device 3621 can communicate with one or more networks 3622 such as a local area network (LAN), a general wide area network (WAN), and/or a public network (e.g., the Internet). The network interface device 3621, according to the example, facilitates communication between the processing system 3602 and other nodes in the network(s) 3622, such as a microassembler system 3632.

For example, the processor 3604, according to various embodiments, can transmit captured image data to the microassembler system 3632 to provide feedback to the microassembler system in support of a micro-assembly process. The captured image data, for example, can include at least one of: a location, a horizontal orientation, a vertical orientation, or a type, of at least one micro-object (e.g., a micro-LED) disposed on the planar working surface of a microassembler backplane.

A user interface 3610 is communicatively coupled with the at least one processor 3604, such as via the bus architecture 3605. The user interface 3610, according to the present example, includes a user output interface 3612 and a user input interface 3614. Examples of elements of the user output interface 3612 can include a display 3613, a speaker, one or more indicator lights, one or more transducers that generate audible indicators, and a haptic signal generator. Examples of elements of the user input interface 3614 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 3604 to receive user input data and commands.

Computer instructions 3607 can be at least partially stored in various locations in the processing system 3602. For example, at least some of the instructions 3607 may be stored in any one or more of the following: in an internal cache memory in the one or more processors 3604, in the main memory 3606, and in the persistent memory 3608.

The instructions 3607, according to the example, can include computer instructions, data, configuration parameters 3620, and other information that can be used by the at least one processor 3604 to perform features and functions of the processing system 3602 and of the machine vision system. According to the present example, the instructions 3607 include an optical module controller 3626 which operates to control one or more optical modules of the machine vision system. The instructions 3607 also include an image processing engine 3628 which operates to process images captured by the respective image sensors of the one or more optical modules of the machine vision system. The instructions 3607 also include an imaging application 3630 which performs features and functions of the machine vision system and how it interoperates with a microassembler system. The instructions 3607 also include a set of configuration parameters that can be used by the optical module controller 3626, the image processing engine 3628, and the imaging application 3630, as further discussed herein. Additionally, the instructions 3607 include configuration data for the processing system 3602.

The at least one processor 3604, according to the example, is communicatively coupled with a Machine Vision Data Storage Repository 3616 (also referred to herein as the MVDR 3616). The MVDR 3616 can store data for use by the image processing engine 3628 and the imaging application 3630, and related methods, which can include an imaging database 3618 that can store at least a portion of one or more captured image data sets, image processing information from the image processing engine 3628, and history information associated with captured image data sets, image processing algorithms, and associated parameter settings. Various functions and features of one or more embodiments of the present invention, as have been discussed above, may be provided with use of the data stored in the MVDR 3616.

Figure 34A:
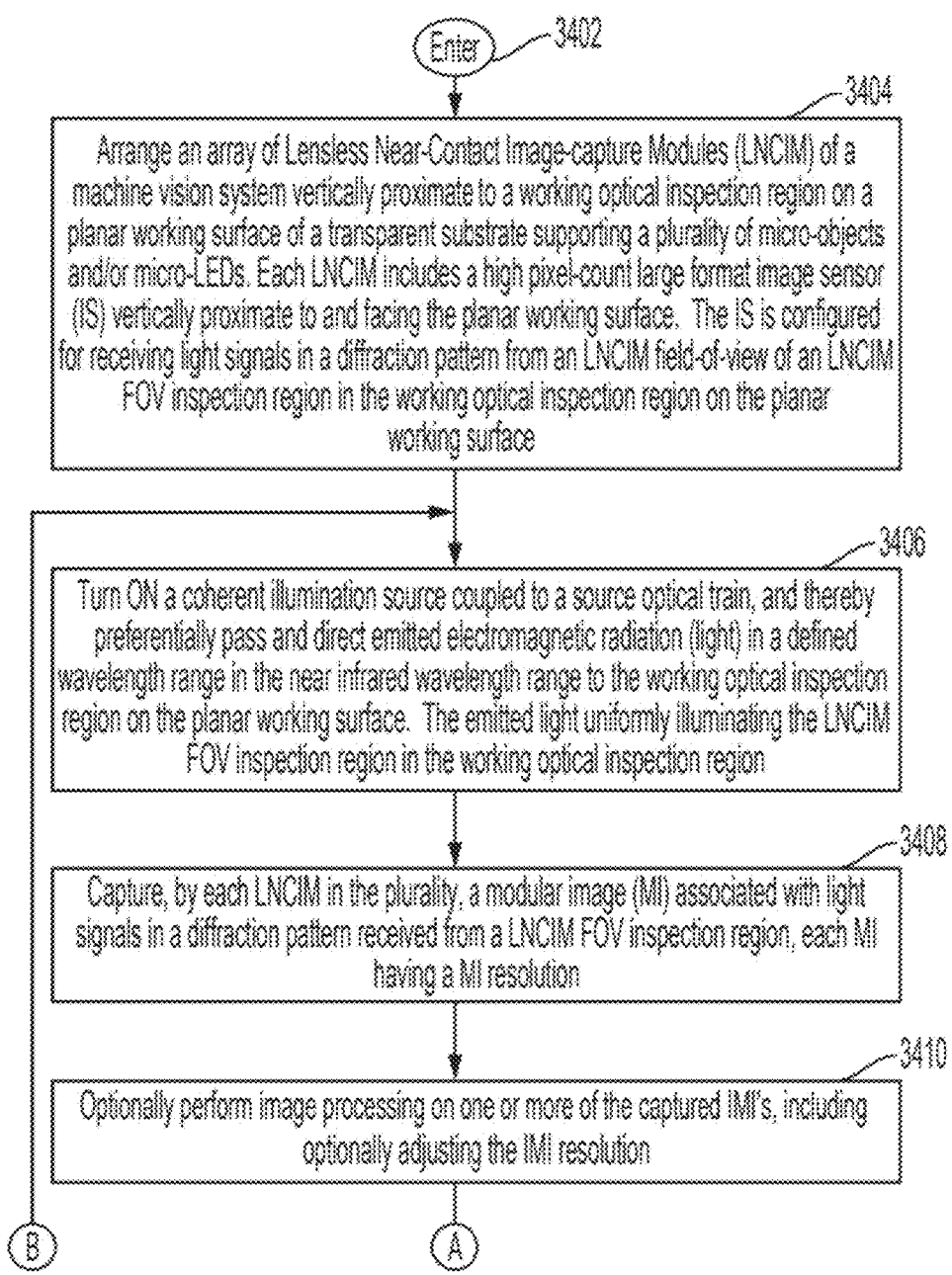
FIGS. 34A, 34B, and 35, are operational flow diagrams illustrating example methods of operation of a machine vision system such as shown in FIG. 36.
Figure 34B:
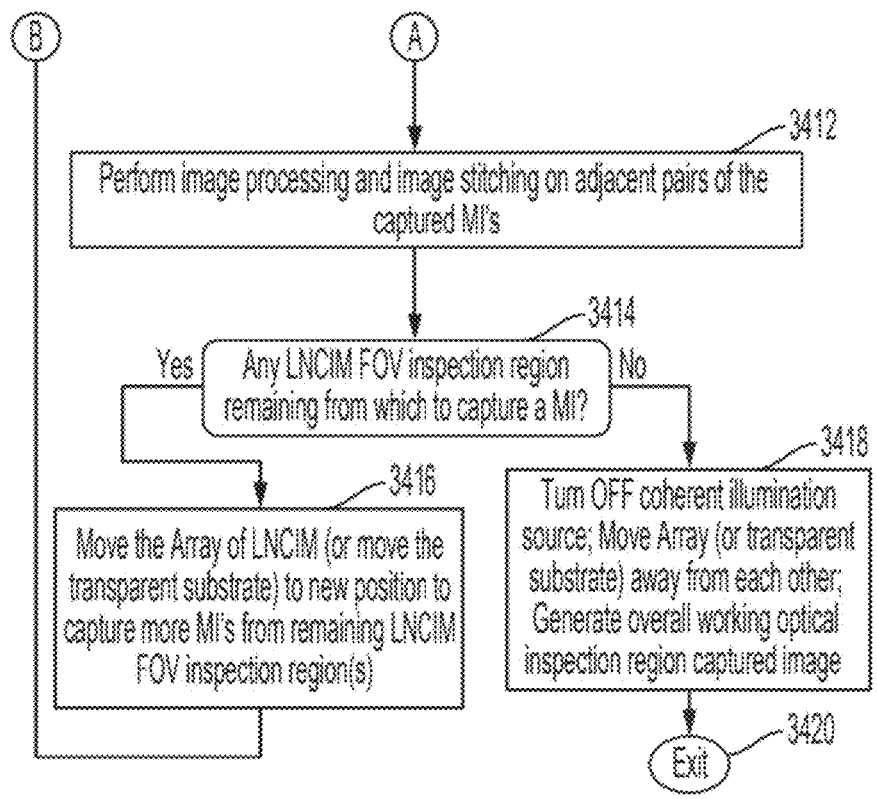

FIGS. 34A and 34B comprise an operational flow diagram illustrating an example method of operation of a machine vision system including a processing system 3602 such as shown in FIG. 36.

The at least one processor 3604 in the processing system 3602 enters the operational sequence shown in FIGS. 34A and 34B, at step 3402, and while interoperating with the optical module controller 3626 proceeds to arrange, at step 3404, a plurality of individual optical image capture modules (also referred to as Lensless Near-Contact Image-capture Modules or LNCIM), and their respective image sensors 330, in an LNCIM array 402 (see FIGS. 4 and 6) vertically proximate and near-contact distance to a working optical inspection region 102 on a planar working surface 312 of a transparent substrate 310. Each LNCIM includes a high pixel-count large format image sensor (IS) vertically proximate to and facing the planar working surface 312. The IS is configured for receiving light signals in a diffraction pattern from an LNCIM field-of-view of an LNCIM FOV inspection region.

A plurality of micro-objects (e.g., micro-LEDs) 422 is disposed on the planar working surface 312 in the working optical inspection region 102. Each LNCIM includes one or more optical image sensors 330 which capture images from an LNCIM field-of-view which is associated with an LNCIM FOV inspection region on the planar working surface 312. The machine vision system has a defined plurality of LNCIM FOV regions and associated respective LNCIM-captured images 705, 707, 709, 711, 713, 715, etc., (see FIG. 7) that cover the overall working optical inspection region 102 on the planar working surface 312 of the transparent substrate 310. For a more detailed discussion, see the discussion above with reference to FIGS. 4, 6, and 7.

The processor 3604 then, at step 3406 interoperating with the imaging application 3630, turns ON a coherent illumination light source 309 coupled to a source optical train 306, which thereby preferentially passes and directs emitted electromagnetic radiation (light) in a defined wavelength range, according to the example, in the near infrared wavelength range to the working optical inspection region 102 on the planar working surface 312. The emitted light 1303 illuminates the LNCIM FOV inspection region in the working optical inspection region.

Then, the processor 3604, at step 3408 interoperating with the optical module controller 3626, captures by the respective image sensor(s) of each LNCIM an individual LNCIM-captured image 705, 707, 709, 711, 713, 715, which has an associated LNCIM-captured image resolution.

Continuing with the example operational sequence, the processor 3604 then, at step 3410 while interoperating with the image processing engine 3628, optionally performs image processing on one or more of the LNCIM-captured images, including optionally adjusting a resolution of at least one LNCIM-captured image 705, 707, 709, 711, 713, 715, of a respective at least one LNCIM in the array 402, to match a target resolution of an overall working FOV optical inspection region image 810 (see FIG. 8) of a working area 102, 108, 110. The target resolution is selected by the machine vision system to allow the machine vision system to view and identify in the respective LNCIM-captured image 705, 707, 709, 711, 713, 715, at least one micro-object 422 located therein on the planar working surface 312.

Then, at step 3412 while interoperating with the image processing engine 3628, the processor 3604 performs image processing and image stitching on adjacent pairs of the LNCIM-captured images 705, 707, 709, 711, 713, 715.

Continuing with the example, at step 3414, the processor 3604 determines whether there remains at least one LNCIM FOV inspection region from which to capture a LNCIM-captured image 705, 707, 709, 711, 713, 715, for the machine vision system to completely view the overall working FOV optical inspection region 102 on the planar working surface 312.

If the processor 3604 determines, at step 3414, that there is at least one more LNCIM FOV region from which to capture a LNCIM-captured image, then the processor 3604, at step 3416 while interoperating with the optical module controller 3626, causes the array 402 to move to a new position to capture more LNCIM-captured images from remaining LNCIM FOV inspection region(s). According to certain embodiments, the LNCIM array 402 is stationary and the processor 3604 causes the moving transparent substrate 310 to move to a new position for the image sensors of the LNCIM array 402 to capture more LNCIM-captured images from remaining LNCIM FOV inspection region(s). The operational sequence then is repeated starting with step 3406 to maintain the coherent illumination light source turned ON and to capture LNCIM-captured image(s) from the remaining at least one more LNCIM FOV inspection region(s).

On the other hand, if the processor 3604 determines, at step 3414, that there is no more LNCIM FOV inspection region from which to capture a LNCIM-captured image, the processor 3604, at step 3418 interoperating with the imaging application 3630, turns OFF the coherent illumination light source 309 and, while interoperating with the optical module controller 3626, moves the respective image sensors of the array of LNCIM 402 away from the working optical inspection region 102. According to certain embodiments, the LNCIM array 402 is stationary and the processor 3604 causes the moving transparent substrate 310 to move away from the LNCIM array 402. The processor 3604 then performs any additional required image processing and image stitching of adjacent pairs of LNCIM-captured images, and generates an overall working optical inspection region captured image 810.

The processor 3604 then exits the operational sequence, at step 3420.

Figure 35:
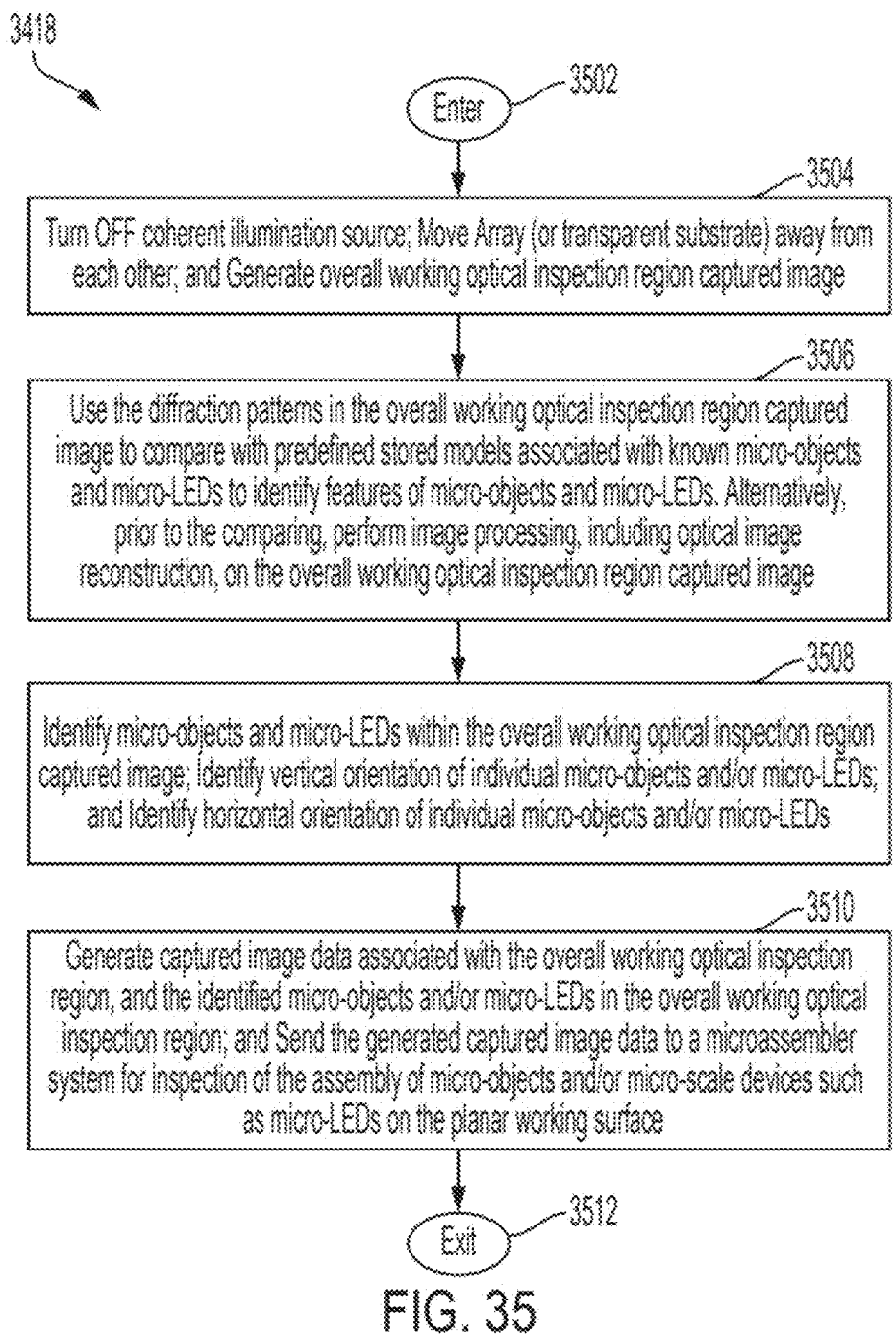

FIG. 35 illustrates an alternative process which can be performed by the processor 3604, and which replaces step 3418 above in FIG. 34B. If the processor 3604 determines, at step 3414, that there is no more LNCIM FOV inspection region from which to capture a LNCIM-captured image, the operational sequence continues in FIG. 35. The processor 3604 enters the operational sequence, at step 3502, and proceeds, at step 3504 while interoperating with the imaging application 3630, to turn OFF the coherent illumination light source 309. The processor 3604, while interoperating with the optical module controller 3626, moves the respective image sensors of the array of LNCIM 402 away from the working optical inspection region 102. According to certain embodiments, the LNCIM array 402 is stationary and the processor 3604 causes the moving transparent substrate 310 to move away from the LNCIM array 402. The processor 3604 then performs any additional required image processing and image stitching of adjacent pairs of LNCIM-captured images, and generates an overall working optical inspection region captured image 810.

Continuing with the operational sequence, the processor 3604, at step 3506, inspects the diffraction patterns in the overall working optical inspection region captured image 810 to compare with predefined models associated with known micro-objects and micro-LEDs. According to various embodiments, the comparing includes comparing irradiance levels of light signals in the diffraction pattern to irradiance levels of light signals in predefined models of diffraction patterns. The models are stored in the imaging database 3618. The processor 3604, based on the comparisons, identifies features of micro-objects and micro-LEDs 422 disposed on the planar working surface 312. Optionally, prior to the comparing, the processor 3604, interoperating with the image processing engine 3628, performs image processing, including optical image reconstruction, on the working inspection region captured image 810.

The processor 3604, interoperating with the imaging application 3630 at step 3508, identifies, based on the comparing, types of micro-objects and/or micro-LEDs 422 and their locations within the overall working optical inspection region captured image 810 (optionally within the reconstructed image of the captured image 810). The locations within the overall working optical inspection region captured image 810 can be translated to their physical locations on the planar working surface 312. The processor 3604 can also identify vertical orientation of individual micro-objects and/or micro-LEDs 422. The processor 3604 can also identify horizontal orientation of individual micro-objects and/or micro-LEDs 422.

The processor 3604, at step 3510 interoperating with the imaging application 3630, generates, based on the identifying in the previous step 3508, captured image data associated with the inspection of the overall working optical inspection region 810. The captured image data can include the identified types of micro-objects and/or micro-LEDs 422 and their locations in the overall working optical inspection region. The captured image data can include the horizontal orientation of individual micro-objects and/or micro-LEDs 422. The captured image data can include the vertical orientation of individual micro-objects and/or micro-LEDs 422.

The processor 3604 then sends the generated captured image data, via the network interface device 3621 and the networks 3622, to a microassembler system 3632 to provide inspection feedback to the microassembler system 3632 in support of a micro-assembly process for the assembly of micro-objects and/or micro-scale devices such as micro-LEDs 422 on the planar working surface 312 in the working area 102. For example, the processor 3604, according to various embodiments, can transmit captured image data to the microassembler system 3632, where the captured image data, for example, can include at least one of: a location, a horizontal orientation, a vertical orientation, or a type, of at least one micro-object (e.g., a micro-LED) disposed on the planar working surface of a microassembler backplane.

The processor 3604 then exits the operational sequence, at step 3512.

Non-Limiting Examples

The present invention may be implemented as a system and/or a method, at any possible technical detail level of integration. A computer program may include computer readable program instructions thereon for causing a processor to carry out aspects of the present invention.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on a user's computer, partly on a user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer programs, according to various embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special-purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer programs, according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for operating a machine vision system suitable for use with a microassembler system for inspection of assembly of micro-objects on a planar working surface, the method comprising:

arranging an array of lensless near-contact image-capture modules (LNCIM) vertically proximate to a working optical inspection region on a planar working surface of a transparent substrate, wherein each LNCIM having a high pixel-count large format image sensor (image sensor) vertically proximate and near-contact to and facing the planar working surface and being associated with a LNCIM field-of-view (FOV) region on the planar working surface;

arranging one or more illumination light sources, optically coupled to respective one or more source optical trains, located and directed to pass and emit illumination light, in a defined wavelength range in a near infrared wavelength range, from the one or more source optical trains toward the planar working surface of the transparent substrate, the one or more illumination light sources optically coupled to respective one or more source optical trains being located on one side of the transparent substrate and the array of lensless near-contact image-capture modules being located on an opposite side of the transparent substrate;

selectively turning ON the one or more illumination light sources optically coupled to the respective one or more source optical trains thereby preferentially passing and directing emitted electromagnetic radiation (light) in the defined wavelength range in the near infrared wavelength range to illuminate the working optical inspection region on the planar working surface;

receiving, by the image sensor of each LNCIM in the array while the illumination light source is ON, light signals from each LNCIM FOV region associated with each respective image sensor of an LNCIM in the array, wherein received light signals from a micro-object disposed in a LNCIM FOV region on the planar working surface comprise a diffraction pattern received by the associated image sensor of an LNCIM in the array;

capturing, by the image sensor of each LNCIM in the array, a LNCIM-captured image of the light signals received from the associated LNCIM FOV region on the planar working surface, wherein the LNCIM-captured image being associated with a LNCIM-captured image resolution;

adjusting the LNCIM-captured image of at least one LNCIM in the array;

detecting at least one diffraction pattern in the LNCIM-captured image associated with an LNCIM FOV region on the planar working surface, the at least one diffraction pattern corresponding to at least one micro-object disposed in the LNCIM FOV region;

utilizing image processing of the diffraction pattern to determine at least one of a type, location, centroid, horizontal orientation, or vertical orientation, of the at least one micro-object;

comparing the detected diffraction pattern in the LNCIM-captured image to models of diffraction patterns associated with features of known micro-objects;

identifying, based on the comparing, at least one of a location, a horizontal orientation, a vertical orientation, a centroid, or a type, of a micro-object in the LNCIM FOV region associated with the LNCIM-captured image; and generating, based on the identifying, captured-image data associated with the identified at least one of a location, horizontal orientation, vertical orientation, centroid, or type, of the at least one micro-object disposed in the LNCIM FOV region, for providing the captured-image data to a microassembler system.

2. The method of claim 1, wherein the comparing includes comparing irradiance levels of light signals in the at least one diffraction pattern in the LNCIM-captured image to irradiance levels of light signals in the models of diffraction patterns.

3. The method of claim 1, wherein the one or more illumination light sources are coherent illumination light sources that emit coherent illumination light, and wherein a plurality of LNCIM FOV regions on the planar working surface, respectively associated with the array of LNCIM, form a working FOV region on the planar working surface for the machine vision system, the method comprising:

adjusting the LNCIM-captured image of at least one LNCIM in the array, wherein the adjusting includes adjusting a LNCIM-captured image resolution; and stitching together a plurality of LNCIM-captured images of adjacent LNCIM in the array; and forming, based on the plurality of LNCIM-captured images stitched together, a working FOV image of the working FOV region associated with a working FOV image resolution for the machine vision system, wherein the working FOV region is larger than each LNCIM FOV region in the plurality and the working FOV image resolution is at least equal to or greater than each LNCIM-captured image resolution respectively associated with each LNCIM FOV region in the plurality.

4. The method of claim 3, wherein the stitching comprises side-by-side stitching of LNCIM-captured images of adjacent LNCIM FOV regions to form the working FOV image of the working FOV region.

5. The method of claim 3, wherein the stitching comprises feathered stitching of LNCIM-captured images of adjacent LNCIM FOV regions to form the working FOV image of the working FOV region.

6. The method of claim 3, wherein the stitching comprises staggered stitching of LNCIM-captured images of adjacent LNCIM FOV regions to form the working FOV image of the working FOV region.

7. The method of claim 6, wherein the staggered stitching comprises a stitching geometry based on a step-and-repeat assembly process to stitch LNCIM-captured images of adjacent LNCIM FOV regions.

8. The method of claim 7, wherein the step-and-repeat assembly process comprises:

a working FOV region arranged in rows and columns of LNCIM FOV regions, where the LNCIM in the array capture images of their respective LNCIM FOV regions according to:

a horizontal stagger pitch ($P_H$) of LNCIM FOV regions in a same row,
a vertical stagger pitch ($P_V$) of LNCIM FOV regions in separate rows, and
n is a total number of rows, and
s is a total number of steps, and
wherein the step-and-repeat assembly process achieves an efficiency of capturing LNCIM-captured images, and stitching adjacent LNCIM-captured images based on a formula:

=number of rows divided by number of steps $=n/(P_H(P_V+n))$.

9. The method of claim 8, wherein $P_H$ equals $P_V$ equals 1, n is a number greater than or equal to 100, and the efficiency is approximately 1, within a tolerance of plus or minus one tenth.

10. The method of claim 3, wherein the stitching comprises staggered stitching of LNCIM-captured images of adjacent LNCIM FOV regions, based on a step-and-repeat assembly process to stitch LNCIM-captured images of adjacent LNCIM FOV regions, thereby forming the working FOV image of the working FOV region; and
wherein the step-and-repeat assembly process comprises one of:
holding the transparent substrate stationary while moving the LNCIM array to a new position and an image sensor of at least one LNCIM of the LNCIM Array capturing from an associated LNCIM FOV region an LNCIM-captured image at the new position of the LNCIM Array; or
holding the LNCIM array stationary while moving the transparent substrate to a new position and an image sensor of at least one LNCIM of the LNCIM Array capturing from an associated LNCIM FOV region an LNCIM-captured image at the new position of the transparent substrate.

11. The method of claim 10, wherein the step-and-repeat assembly process comprises:
holding the transparent substrate stationary while moving, in a synchronized movement with each other, both the LNCIM array and the one or more illumination light sources, optically coupled to respective one or more source optical trains, thereby moving the LNCIM array to a new position and an image sensor of at least one LNCIM of the LNCIM Array capturing from an associated LNCIM FOV region an LNCIM-captured image at the new position of the LNCIM Array.

12. The method of claim 3, wherein the adjusting the LNCIM-captured image comprises performing grayscale imaging to detect a centroid of at least one micro-object in the LNCIM-captured image of the LNCIM FOV region on the planar working surface; and
wherein the identifying identifies a location of a micro-object in the LNCIM-captured image, where the location coincides with the centroid of the micro-object that was detected in the LNCIM-captured image.

13. The method of claim 12, wherein the generating includes generating captured-image data identifying the location of the centroid of the micro-object on the planar working surface for providing the captured-image data to a microassembler system to adjust a position of the micro-object on the planar working surface.

14. The method of claim 12, wherein the at least one micro-object comprises a plurality of micro-objects, and wherein the generating includes generating captured image data identifying the location of the centroid of each micro-object in the plurality on the planar working surface and providing the captured image data to a microassembler system to adjust a position of the plurality of micro-objects by performing rough alignment of the plurality of micro-objects to each other in a micro-assembly process.

15. The method of claim 1, wherein the adjusting the LNCIM-captured image comprises performing super-resolution imaging on sets of sub-pixels in the LNCIM-captured image to produce a higher resolution image of the LNCIM-captured image.

16. The method of claim 1, wherein the adjusting the LNCIM-captured image comprises performing super-resolution imaging on the LNCIM-captured image, detecting at least one micro-object in the LNCIM-captured image of the LNCIM FOV region, and adjusting a position of the at least one micro-object in the LNCIM-captured image corresponding to a physical position of the at least one micro-object on the planar working surface.

17. The method of claim 1, wherein the adjusting the LNCIM-captured image includes at least one operation selected from the following operations:
performing fine alignment of at least one micro-object detected in the LNCIM-captured image corresponding to a physical position on the planar working surface in a micro-assembly process;
performing alignment verification of at least one micro-object on the planar working surface in a micro-assembly process; or
performing right-side-up verification of at least one micro-object on the planar working surface in a micro-assembly process.

18. The method of claim 1, wherein a width of an overall working FOV region on the planar working surface is at least ten times larger than a width of each LNCIM FOV region on the planar working surface, and a resolution of a working FOV image of the overall working FOV region on the planar working surface is at least equal to or greater than a resolution of each LNCIM-captured image of an associated LNCIM FOV region on the planar working surface.

19. The method of claim 1, comprising:
transmitting the captured image data to the microassembler system, the captured image data comprising at least one of:
a location,
a horizontal orientation,
a vertical orientation, or
a type,
of at least one micro-object disposed on the planar working surface of the transparent substrate which is a microassembler backplane.

20. A method for operating a machine vision system suitable for use with a microassembler system for inspection of assembly of micro-objects on a planar working surface, the method comprising:
arranging an array of lensless near-contact image-capture modules (LNCIM) below a transparent substrate and vertically proximate to a working optical inspection region on a planar working surface of the transparent substrate, wherein each LNCIM having a high pixel-count large format image sensor (image sensor), with an optical filter interposed between the image sensor and the transparent substrate, vertically proximate and near-contact to and facing the planar working surface and being associated with a LNCIM field-of-view (FOV) region on the planar working surface;

arranging one or more visible light projectors, optically coupled to respective one or more source optical trains, located above the transparent substrate and directed to project visible light, in a defined wavelength range, toward the planar working surface of the transparent substrate;

arranging one or more coherent illumination light sources, optically coupled to respective one or more source optical trains, located above the transparent substrate and directed to pass and emit illumination light, in a defined wavelength range in a near infrared wavelength range, from the one or more source optical trains toward the planar working surface of the transparent substrate;

selectively turning ON the one or more illumination light sources optically coupled to the respective one or more source optical trains thereby preferentially passing and directing emitted electromagnetic radiation (coherent illumination light) in the defined wavelength range in the near infrared wavelength range to illuminate the working optical inspection region on the planar working surface;

selectively turning ON the one or more visible light projectors thereby projecting light signals and dynamic image patterns on the planar working surface, the optical filters reducing an intensity of the light signals, projected from the projectors, that are outside of the defined wavelength range in the near infrared wavelength range and that can be incident on the face of the image sensors of the respective LNCIM's in the LNCIM array;

receiving, by the image sensor of each LNCIM in the array while the coherent illumination light source is ON, light signals from each LNCIM FOV region associated with each respective image sensor of an LNCIM in the array, wherein received light signals from a micro-object disposed in a LNCIM FOV region on the planar working surface comprise a diffraction pattern received by the associated image sensor of an LNCIM in the array;

capturing, by the image sensor of each LNCIM in the array, a LNCIM-captured image of the light signals received from the associated LNCIM FOV region on the planar working surface, wherein the LNCIM-captured image being associated with a LNCIM-captured image resolution;

detecting at least one diffraction pattern in the LNCIM-captured image associated with an LNCIM FOV region on the planar working surface, the at least one diffraction pattern corresponding to at least one micro-object disposed in the LNCIM FOV region;

performing image processing of the diffraction pattern thereby determining and identifying at least one of a type, location, centroid, horizontal orientation, or vertical orientation, of the at least one micro-object; and generating, based on the determining and identifying, captured-image data associated with the identified at least one of a location, horizontal orientation, vertical orientation, centroid, or type, of the at least one micro-object disposed in the LNCIM FOV region, for providing feedback including the captured-image data to a microassembler system in a micro-assembly process.

* * * * *